United States Patent [19]

Anway

[11] 4,083,229
[45] Apr. 11, 1978

[54] METHOD AND APPARATUS FOR DETECTING AND LOCATING FLUID LEAKS

[75] Inventor: Allen R. Anway, Superior, Wis.

[73] Assignee: Plaunt & Anderson Company, Inc., Duluth, Minn.

[21] Appl. No.: 727,359

[22] Filed: Sep. 28, 1976

Related U.S. Application Data

[63] Continuation-in-part of Ser. No. 650,842, Jan. 20, 1976, abandoned.

[51] Int. Cl.² .............................................. G01M 3/00
[52] U.S. Cl. .................................... 73/40.5 A; 73/592
[58] Field of Search ............... 73/40.5 A, 40.5 R, 71.2

[56] References Cited

U.S. PATENT DOCUMENTS 3,851,521  12/1974  Ottenstein ........................ 73/40.5 R
3,903,729  9/1975   Covington ........................ 73/40.5 R

FOREIGN PATENT DOCUMENTS 1,065,678  9/1959  Germany .......................... 73/40.5 A Primary Examiner—Donald O. Woodiel
Attorney, Agent, or Firm—Strauch, Nolan, Neale, Nies & Kurz

[57] ABSTRACT

An apparatus and method for detecting and locating a fluid leak in an underground pipe or the like in which the vibration produced by the leak is intercepted at selected spaced apart points by microphones or other transducers, in which the vibration intercepted at each of the two points is converted into an electrical signal, and in which the extent of correlation of the two resulting signals is varied by variably time delaying one signal relative to the other to determine the leak's location from the occurrence of maximum correlation between the signals. In one embodiment, the variable time delay of one signal relative to the other is accomplished by a variable length time delay line and a means for progressively varying the length of the delay line. In another embodiment the variable time delay is accomplished by a recirculating delay line analyzer that does more data age comparisons with the same delays in the same time than the variable length delay line.

43 Claims, 18 Drawing Figures

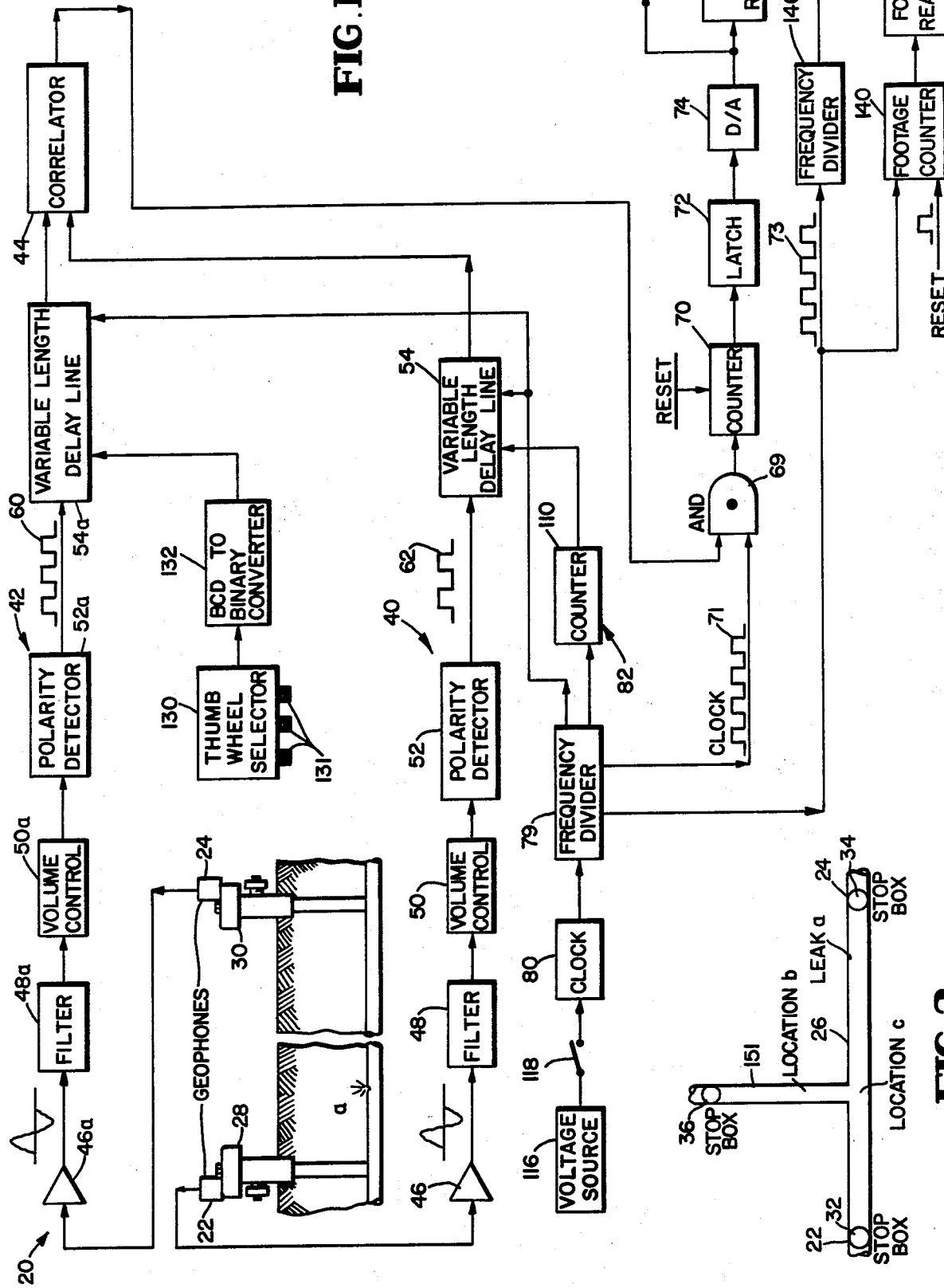

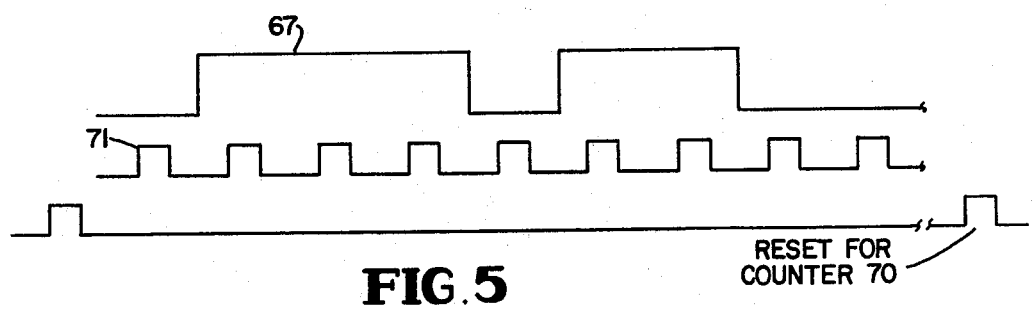
FIG. 5
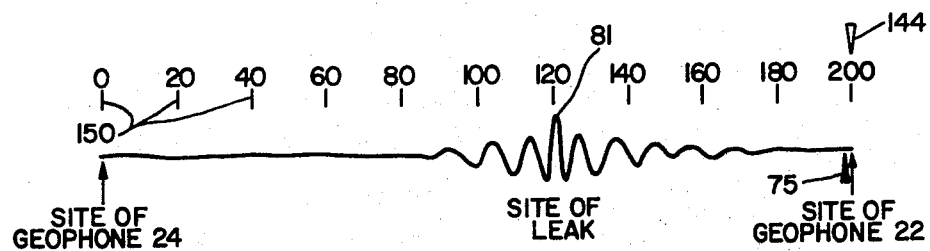
FIG. 6
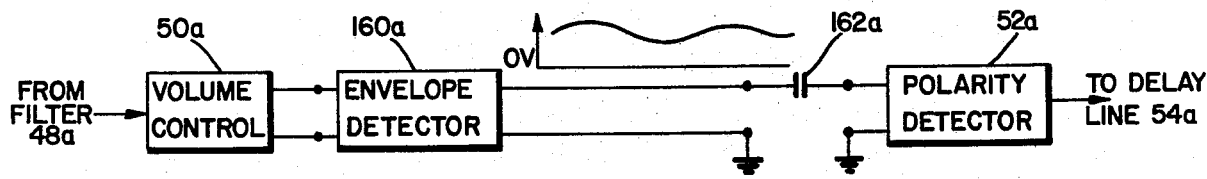
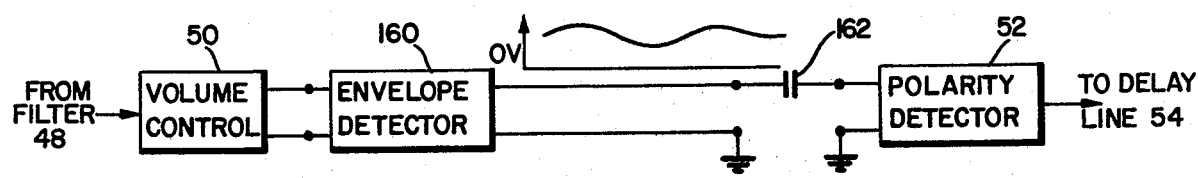
FIG. 7

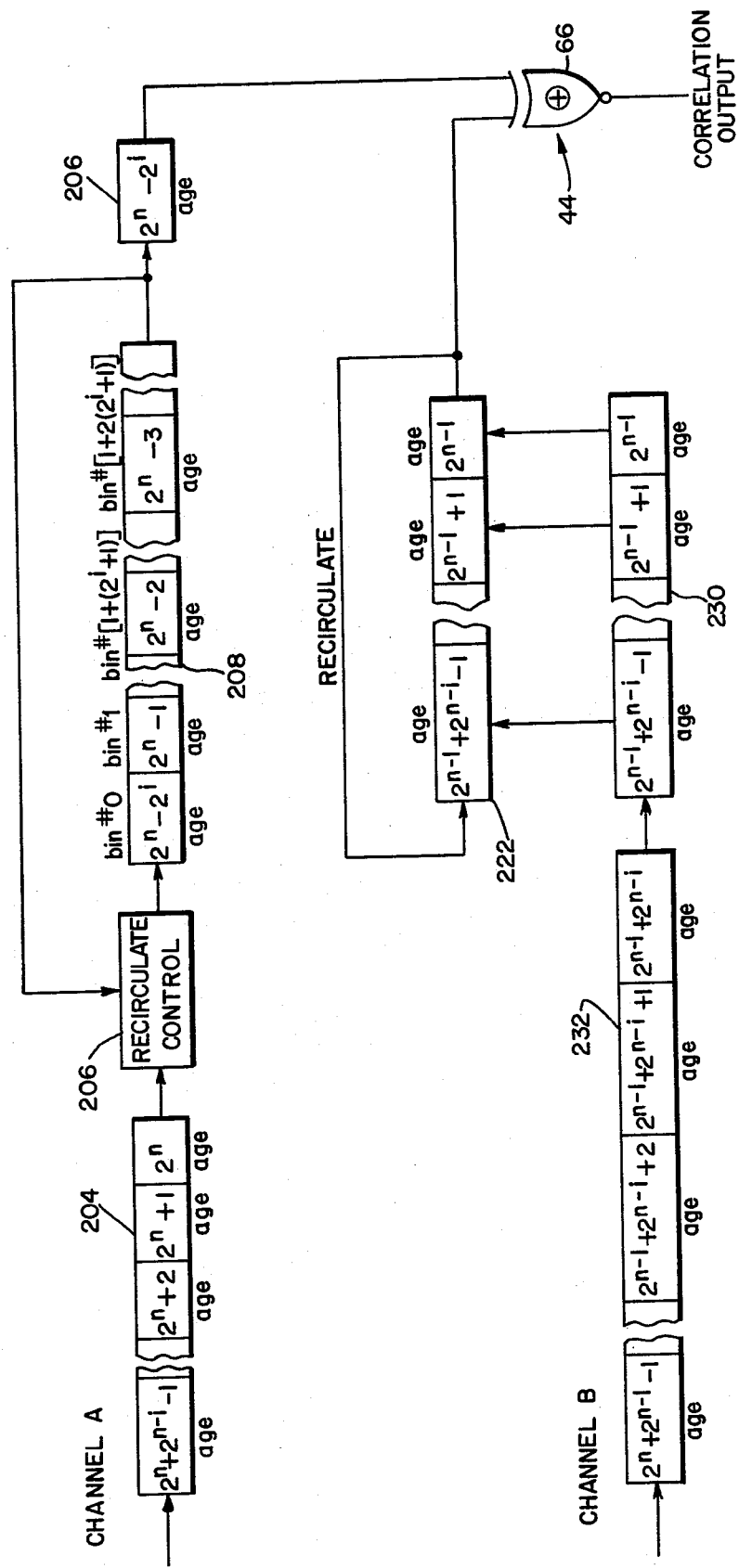

METHOD AND APPARATUS FOR DETECTING AND LOCATING FLUID LEAKS

RELATED APPLICATION

This application is a continuation-in-part of my co-pending application Ser. No. 650,842 filed Jan. 20, 1976 for Method and Apparatus For Detecting And Locating Fluid Leaks, now abandoned.

FIELD OF INVENTION

This invention relates to methods and apparatus for detecting and locating fluid leaks in fluid conveying conduits or pipes which are buried, underground, or otherwise unexposed or inaccessible for inspection.

BACKGROUND

Detection and location of fluid leaks in underground fluid-conveying pipes is frequently desirable to avoid unnecessary, time-consuming excavations and attendant costs. As a result, the need has arisen for a reliable system which can be employed on the surface above an underground pipe for accurately locating the site of a fluid leak in the pipe before making an excavation.

Numerous leak detecting systems have been proposed prior to this invention, some for merely detecting the presence of a leak, others for both detecting and locating a leak in a fluid-conveying pipeline. Examples of these prior systems are described in U.S. Pat. No. 3,814,207 issued on June 4, 1974 to T. Kusuda et al, U.S. Pat. No. 3,055,209 issued on Sept. 25, 1962 to J. M. Reid et al, U.S. Pat. No. 3,851,521 issued on Dec. 3, 1974 to S. A. Ottenstein, U.S. Pat. No. 3,478,576 issued on Nov. 18, 1969 to T. G. Boyle, U.S. Pat. No. 3,807,220 issued on Apr. 30, 1974 to S. A. Ottenstein et al, U.S. Pat. No. 3,800,217 issued Mar. 26, 1974 to D. A. Lowrance, U.S. Pat. No. 3,750,711 issued on Aug. 7, 1973 to J. T. Conklin et al, U.S. Pat. No. 3,744,298 issued on July 10, 1973 to N. E. Flournoy et al, U.S. Pat. No. 3,738,156 issued on June 12, 1973 to H. Bosselaar, U.S. Pat. No. 3,690,150 issued on Sept. 12, 1972 to J. S. Mullen, U.S. Pat. No. 3,575,040 issued on Apr. 13, 1971 to H. Bosselaar, U.S. Pat. No. 3,561,256 issued on Feb. 9, 1971 to W. M. Bustin et al, U.S. Pat. No. 3,531,264 issued on Sept. 29, 1970 to F. J. Greipel, U.S. Pat. No. 3,530,705 issued on Sept. 29, 1970 to F. M. Lathrop, U.S. Pat. No. 3,508,433 issued on Apr. 28, 1970, U.S. Pat. No. 3,500,676 issued on Mar. 17, 1970 to M. N. Palmer, U.S. Pat. No. 3,462,240 issued on Aug. 19, 1969 to H. Bosselaar et al, U.S. Pat. No. 3,409,897 issued on Nov. 5, 1968 to H. Bosselaar et al, U.S. Pat. No. 3,413,653 issued on Nov. 26, 1968 to F. M. Wood, U.S. Pat. No. 3,321,957 issued on May 30, 1967 to M. Blander et al, U.S. Pat. No. 3,308,424 issued on Mar. 7, 1967 to A. B. Simpkins et al, U.S. Pat. No. 3,261,200 issued on July 19, 1966 to F. V. Long, U.S. Pat. No. 3,192,516 issued on June 29, 1965 to A. B. Simpkins et al, U.S. Pat. No. 3,170,152 issued to F. V. Long on Feb. 16, 1965, U.S. Pat. No. 3,028,450 issued on Apr. 3, 1962 to D. J. Manning, U.S. Pat. No. 3,626,750 issued to C. A. Talman, and U.S. Pat. No. 3,008,934 issued on July 23, 1935 to A. C. Smith. Other prior patents know to applicant, though not describing to fluid leak detecting systems, are U.S. Pat. No. 3,295,362 issued to F. M. Wood et al on Jan. 3, 1967, U.S. Pat. No. 3,753,260 issued on Aug. 14, 1973 to A. Nelkin et al, U.S. Pat. No. 3,756,275 issued on Aug. 21, 1973 to N. G. Carter et al, U.S. Pat. No. 3,264,863 issued on Aug. 9, 1966 to N. Mapopis, and U.S. Pat. No. 3,253,457 issued to W. E. Parkala et al on May 31, 1966.

Of the foregoing prior disclosures, U.S. Pat. Nos. 3,814,207, 3,851,521, 3,478,576 and 3,055,209 are of particular interest. The leak detecting systems described in these patents, however, are disadvantageous for one reason or another.

In U.S. Pat. No. 3,814,207, for example, apparatus for measuring fluid velocity and complex circuitry for performing mathematical operations is required for locating the site of a leak in a pipeline. In U.S. Pat. No. 3,478,576, the apparatus is not capable of locating the site of a fluid leak and requires the insertion of a pig into the pipe to detect a leak. The system described in U.S. Pat. No. 3,055,209 while capable of locating a leak in an underground pipe requires a sound generator to artificially develop a sound for locating the leak. The apparatus in U.S. Pat. No. 3,851,521, on the other hand, is capable of detecting the location of the leak only at the moment of pipeline rupture.

SUMMARY AND OBJECTS OF INVENTION

This invention provides a novel leak detecting and locating method and apparatus which is subject to none of the foregoing disadvantages.

More particularly, this invention provides for a novel method and apparatus for reliably and accurately locating a fluid leak in an underground pipe or conduit.

In this invention, two transducers, such as geophones or other types of microphones, are adapted to be positioned at spaced apart regions over the underground pipe on opposite sides of the suspected site of the leak to intercept the sound wave or vibration emanating from the escaping fluid. Electrical circuits connected to the transducers produce separate electrical signals. These signals are a function of the frequency of the intercepted sound wave and are miscorrelated to an extent that is determined by the location of the leak from the points at which the leak's vibrations are intercepted by the microphones.

According to this invention the extent of correlation between the two electrical signals is varied to establish maximum correlation between the signals, and the varied extent of the correlations is recorded or indicated to enable the leak's location to be determined from the place where the maximum correlation occurs. In the illustrated embodiments the extent of correlation between the two signals is varied by variably time delaying one of the signals or at least samples thereof relative to the other of the signals or samples thereof.

The extent of correlation between the two signals is measured by a correlator which compares the two signals or their samples to determine if they are the same or different. A record of the resulting signal or correlation comparisons is accumulated, and these comparisons are displayed or graphed as a function of relative age between the signals that produced the comparisons to indicate the occurrence of maximum correlation.

In one embodiment the time delay of one signal relative to the other is accomplished by a variable length time delay line and a means for progressively varying the length of the delay line. In a second embodiment the time delay of one signal relative to the other is accomplished by a recirculating time delay line which delays samples of one signal relative to the other.

In the second embodiment mentioned above the samples of one signal are recirculated by the circulating delay line at a rate that is faster than the rate at which samples are periodically enter into the circulating delay line. This embodiment is faster in operation than the first embodiment mentioned above.

In the second embodiment the relative ages of the signal samples in the recirculating delay line will be in a scrambled but predetermined order. Unscrambling of the data obtained from these signal samples is accomplished by use of an addressable memory and by addressing the memory to write in the correlation comparisons at predetermined locations in the memory. The memory contents are then read out for displaying the stored data as a function of the relative age differences of the compared signals that produced the data.

The apparatus for delaying the signal samples in a scrambled order and then for unscrambling the data obtained from the samples may be employed for purposes other than locating the site of the leak in a pipeline.

According to another feature of this invention, an envelope detector may be employed in each of the two electrical circuits mentioned above so that waveshapes following the envelopes of the microphone-produced electric waves are developed to more accurately pin point the location of the leak.

This invention may be employed to detect and locate both gas and liquid leaks.

With the foregoing in mind, a major object of this invention is to provide a novel method and apparatus for accuratly and reliably locating the site of a fluid leak in an underground fluid-conveying conduit.

Another important object of this invention is to provide a novel method and apparatus for locating a fluid leak in an underground pipe by means of a correlation technique.

Still another important object of this invention is to provide a novel, leak-locating method and apparatus in which a vibration emanating from a fluid leak in a pipe in intercepted at two selected spaced apart points, in which the intercepted vibration at each of the interception points is converted into an electrical signal such that the miscorrelation between the two resulting signals is determined by the location of the leak from the interception points, in which the extent of correlation of the two signals or at least samples thereof is varied to establish maximum correlation between the signals by variably time delaying one of the signals or samples thereof relative to the other signal or samples thereof, and in which the varied extent of correlation is displayed or indicated to enable the leak's location to be determined from the occurrence of the maximum correlation.

Still another important object of this invention is to provide a novel leak-locating apparatus and method as in the immediately preceding object wherein the time delay of one signal relative to the other is accomplished by using either a recirculating time delay line or a variable length time delay line.

Yet another important object of this invention is to provide a novel data treatment apparatus in which digital data bits are time delayed in a scrambled relative age order in a recirculating time delay line, and in which data obtained from the delayed, scrambled data bits is unscrambled.

Still another object of this invention is to provide a novel method and apparatus for locating a fluid leak in a fluid-conveying pipe by intercepting the sound wave or vibration propagating in opposite directions along the pipe from the leak to produce two electrical signals having a time delay which is related to the location of the leak between the interception points, and by delaying at least one of the two electrical signal relative to the other to cause maximum phase correlation between the two electrical signals.

A more specific object of this invention is to provide a novel method and apparatus for locating the site of a fluid leak in a fluid-conveying pipe by intercepting the sound wave or vibration propagating in opposite directions along the pipe from the site of the leak to produce two electrical signals having a time difference which is determined by the location of the leak between the two intercept points, by time delaying at least one of the two electrical signals relative to the other to cause maximum phase correlation between the two signals, by indicating the occurrence of the maximum phase correlation, and by producing a distance measurement which is a function of the site of the leak from a known point at the time maximum correlation is produced between the two signals.

Further objects of this invention will appear as the description proceeds in connection with the below-described drawings and the appended claims.

DESCRIPTION OF DRAWINGS

FIG. 1 illustrates a schematic circuit diagram constructed in accordance with one embodiment of this invention and also one example (in elevation) of the manner in which the geophones or other microphones are adapted to be positioned for locating a fluid leak in an underground fluid-conveying pipe such as a water main or pipeline;

FIG. 2 is a plan view of a typical water pipe distribution system in which the locations of the geophones or other microphones are shown in phantom lines;

FIG. 5 is another wave form diagram illustrating the clock and correlated signals which are fed to one of the counters shown in FIG. 1 for developing an indication of the degree of phase correlation between the two previously mentioned electrical signals;

FIG. 6 is a wave shape diagram illustrating the recordation which is made by the strip chart recorder in FIG. 1;

FIG. 7 is a fragmentary schematic circuit diagram illustrating a modification in which envelope detectors are employed in conjunction with the circuitry of FIG. 1;

FIG. 14 is a partial schematic diagram showing the registers of FIG. 10 and the relative ages of data bits in the stages of the registers;

DETAILED DESCRIPTION OF THE DRAWINGS

Figure 3:
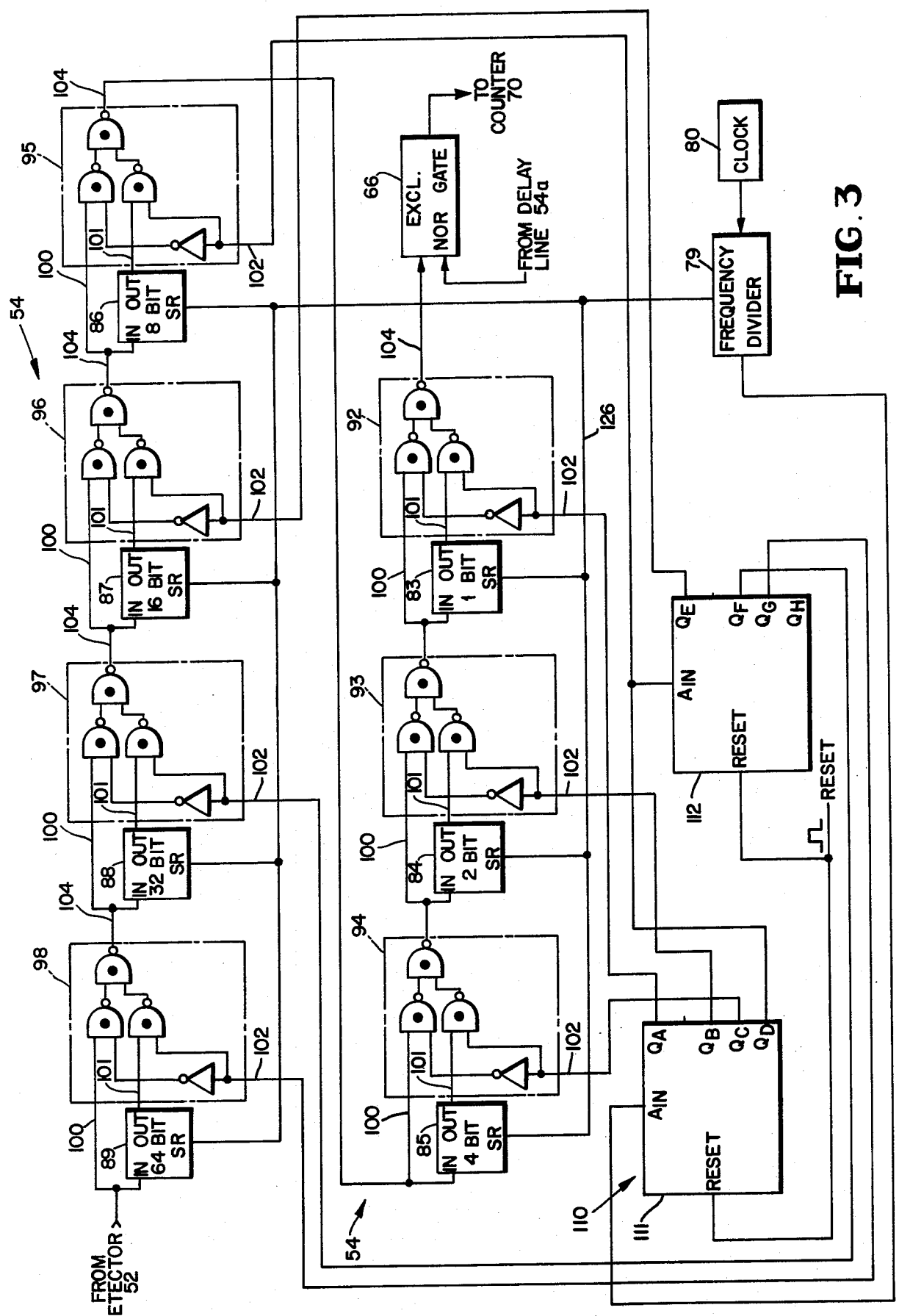
FIG. 3 is a schematic circuit diagram of one of the variable length delay lines and the automatic scanning equipment shown in FIG. 1.

Referring to FIG. 1, a fluid leak detecting and locating apparatus 20 incorporating the principles of this invention is shown to employ a pair of geophones 22 and 24. Geophones 22 and 24 are adapted to be positioned on the surface or other points at spaced apart regions which are over a buried or underground fluid-conveying pipe or pipeline 26 in which a leak has developed. The spacing of geophones 22 and 24 is selected so that the suspected location of the leak is between the two geophones.

In the case of a water main or pipeline, geophones 22 and 24 are preferably removably positioned on or attached to water hydrants 28 and 30 (see FIG. 1) or stop boxes 32 and 34 (see FIG. 2) on opposite sides of the suspected location of the leak. Alternatively, geophones 22 and 24 or other microphones may be attached to probes (not shown) for insertion into the ground to locate the geophones or microphones in contact with or in close proximity to the pipe in which the leak has developed.

Geophones 22 and 24 intercept sound or mechanical vibrations which are produced by the water or other fluid escaping from the pipeline and convert the vibrations into a.c. signals which are indicative of the amplitude and frequency of the vibrations. In place of geophones 22 and 24, it will be appreciated that any suitable type of microphone or transducer may be employed to convert the leak-producing sound waves or vibrations into an electrical signal.

The sound wave produced by the leak has an amplitude that is randomly varying and a frequency that is partially tuned and partially randomly varying.

Apparatus 20 is portable and is normally carried to the suspected site of the leak. Alternatively, apparatus 20 may, if desired, be permanently located at the site of a pipe or pipeline to continuously monitor the pipeline for leaks.

As shown in FIG. 1, geophones 22 and 24 are connected by separate signal processing circuits 40 and 42 to separate inputs of a correlator or parity detector 44 in a signal-analyzing portion of apparatus 20. Circuits 40 and 42 define separate signal channels for feeding correlator 44.

In the embodiment of FIG. 1, circuit 40 comprises an amplifier 46, a filter 48, a volume control 50, a polarity detector 52 and a variable length digital delay line 54. The a.c. signal voltage developed by geophone 22 is amplified by amplifier 46 and then fed to filter 48.

Filter 48 may be of the low pass or band pass type for eliminating or reducing background noise. The cutoff frequency or frequencies of filter 48 may optionally be operator adjustable for obtaining optimum filtering action.

The filtered signal at the output of filter 48 is fed by the volume control 50 to the polarity detector 52. Volume control 50 may be any suitable device, such as potentiometer (not shown), for selectively adjusting the amplitude of the a.c. signal voltage which is applied to the input of detector 52. In place of volume control 50, a suitable automatic gain control circuit (not shown) of response time approximately 1 second may be employed to control the gain of amplifier 46 in such a manner that the strength or amplitude of the amplified signal voltage at the output of amplifier 46 is stabilized within the correct operating range of the polarity detector 52 despite different leaks producing different sound intensities.

Polarity detector 52 may be of any suitable circuit design for detecting alternations of only one pre-selected polarity of the a.c. signal voltage. In this embodiment, detector 52 detects the positively going alternations of the incoming a.c. signal voltage to develop a pulse wave form in which the pulses are of constant amplitude. Thus for the full duration of each positively going alternation of the a.c. signal voltage, the output voltage of detector 42 will be positive at some suitable pre-selected value. For the full duration of each negatively going alternation of the a.c. signal voltage, the output voltage of detector 52 will be at zero volts.

Detector 52 therefore converts or modifies the a.c. signal voltage into a digital signal voltage in the form of a rectangular somewhat periodic wave as shown. It will be appreciated that any suitable circuit may be employed for effecting this conversion. Additionally, detector 52 may alternatively be designed to detect the negative going alternations rather than the positive going alternations of the a.c. signal voltage. The pulse signal developed by detector 50 is fed to delay line 54.

Circuit 42 is preferably of the same design as circuit 40. Accordingly, like reference numerals have been applied to designate like parts of circuits 40 and 42, with the reference numerals for circuit 42 being suffixed by the letter "a" to distinguish them from the reference numeral designations for circuit 40.

In circuit 42, the vibration-indicating a.c. signal produced by geophone 24 is amplified by amplifier 46a and then filtered by filter 48a in the same manner as described for circuit 40.

From filter 48a, the amplified and filtered a.c. signal voltage is fed by volume control 50a to polarity detector 52a. Polarity detector 52a, which is preferably the same as detector 52, detents the positive going alternations of the a.c. signal voltage to produce a pulse wave form in the same manner as described for detector 52. The pulse or digital signal voltage from detector 52s is fed to delay line 54a.

From the foregoing description it will be appreciated that detector 52 modifies the incoming a.c. signal from geophone 22 to a train of pulses (indicated at 60 in FIG. 1) having the same or substantially the same period and repetition frequency as the a.c. signal voltage. Additionally, the pulse signal voltage at the output of detector 52 will change states from one pre-selected value to another (which in this particular embodiment is from some suitable positive value to zero) at or substantially at zero cross-over of the a.c. wave form from geophone 22.

Hence, the period and repetition frequency of the pulse wave form at the output of detector 52 will be the same or substantially the same as the mechanical vibration or sound wave which is produced by the leak and received by geophone 22. In addition, the phase of the pulse wave form at the output of detector 52 will be fixed relative to that of the vibration picked up or intercepted by geophone 22.

Detector 52a likewise modifies the a.c. signal from geophone 24 into a train of pulses (indicated at 62 in FIG. 1) having the same period and repetition frequency as the a.c. signal voltage from geophone 24. Hence, the period and frequency of the pulse wave form fed by detector 52a to delay line 54a will be the same or substantially the same as that of the mechanical vibration produced by the leak and picked up or intercepted by geophone 24. Additionally, the phase of the pulse wave form at the output of detector 52a will be fixed relative to that of the vibration picked up by geophone 24.

Because the pulse wave forms developed by detectors 52 and 52a are indicative of the above-described characteristics of the vibration picked up by geophones 22 and 24, the phase difference between the two pulse wave forms will be a function of the location of the leak between the two geophones. Assume, for example, that the leak in pipe 26 is located at point $a$ (see FIGS. 1 and 2) which is some unknown distance $d_A$ from geophone 22 and some unknown distance $d_B$ from geophone 24. Since the velocity ($c$) of the propagated sound wave along pipe 26 is usually constant, the time ($t_A$) required for the sound wave to reach geophone 22 will be proportional to the distance $d_A$ ($d_A = c\ t_A$) and the time ($t_B$) required for the same sound wave to propagate to geophone 24 will be proportional to the distance $d_B$ ($d_B = c\ t_B$) The time difference between $t_A$ and $t_B$ will therefore be proportional to the phase difference between the two pulse wave forms 60 and 62 which are developed by detectors 52 and 52a.

In accordance with this invention, the phase difference between the two pulse wave forms supplied by detectors 52 and 52a is analyzed by progressively delaying one of the pulse signals 60 and 62 relative to other in such a manner to phase correlate the two pulse wave forms (i.e., to bring the two pulse wave forms into phase with each other as much as possible) and by determining or measuring the degree or extent of phase correlation during the operation of the delaying one signal relative to the other.

The desired relative signal delay may be accomplished in one of two ways with the apparatus shown in FIG. 1. First, it may be accomplished by selectively setting a zero delay into delay line 54a and by varying the delay in delay line 54. Alternatively, a fixed delay equal to the time required for the leak-produced sound wave to propagate the full length of pipe line 26 between geophones 22 and 24 may be entered into delay line 54a. Then, the delay in line 54 is varied relative to the fixed delay. This latter method of employing apparatus 20 has an advantage over the former method mentioned above because the latter method permits the full length of the pipe between the geophones to be scanned for the site of the leak without halt or interruption from one geophone to the other geophone.

As shown in FIG. 1, the relatively delayed pulse signal voltages from delay lines 54 and 54a are applied to separate inputs of correlator 44. Correlator 44 may be any suitable circuit design for detecting equality or parity of the two incoming pulse signal voltages. In this embodiment correlator 44 is an exclusive NOR gate as indicated at 66 in FIG. 3. Alternatively, an exclusive OR gate may be employed.

Thus, when there is equality or parity between the two incoming pulse wave forms at a given instant, the output of gate 66 will be high (a logic 1). Conversely, if there is unequality between the two incoming pulse wave forms at a given instant the output of gate 66 will be low (a logic 0).

Figure 4:
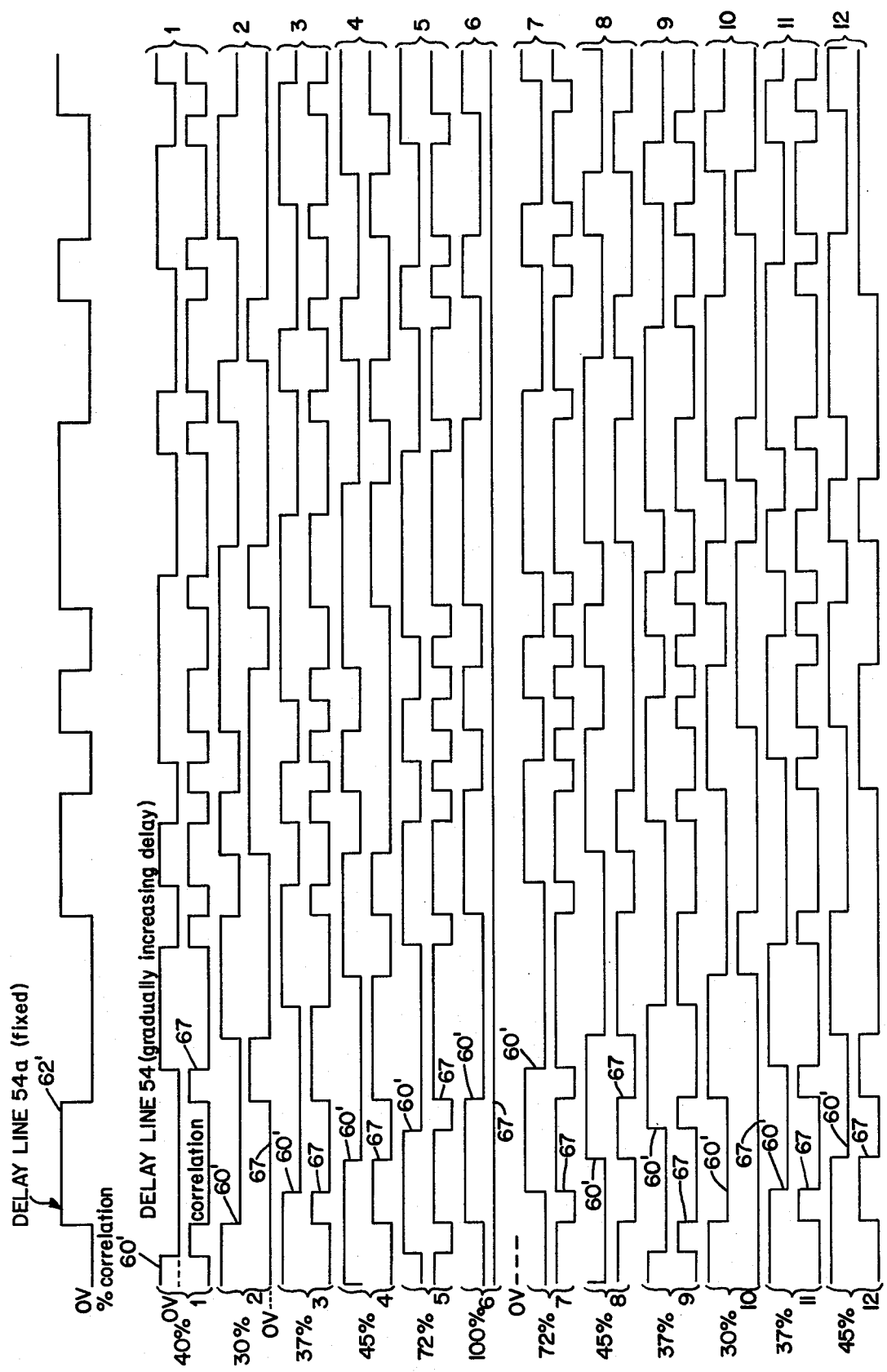
FIG. 4 is a wave form diagram illustrating the degree of phase correlation between the two electrical signals mentioned above at different time delay increments.

From the apparatus thus far described, it will be appreciated that when the phase difference between the two pulse wave forms 60 and 62 is beyond a critical minimum phase difference, the summation of the pulse or logic 1 state durations at the output of gate 66 will be roughly 50% of the summations of both logic 0 and logic 1 states, indicating that no correlation exists. As the phase difference between the pulse wave forms 60 and 62 is reduced and approaches zero by delaying one of the pulse wave forms 60 and 62 relative to the other, the above-mentioned percentage or ratio of the summation of the logic 1 state durations to the selected time interval increases as shown in FIG. 4. When, the delay is sufficient to place the two pulse wave forms 60 and 62 substantially in phase with each other, the correlation between the two pulse wave forms is maximized, and the percentage or ratio mentioned above will become a maximum as also shown in FIG. 4.

In FIG. 4, the delayed pulse wave form at the output of delay line 54 is indicated at 60', the delayed or undelayed pulse wave form at the output of delay line 54a is indicated at 62' and the output of gate 66 is indicated at 67.

In order to convert the digital signal produced by gate 66 into a meaningful analog read out the output of gate 66, a counter 70 is employed. In this embodiment counter 70 is preferably of the serial in/parallel out binary type having a suitable storage or bit capacity to count in a multiplicity of bits. The digital signal produced by gate 66 and clock pulses (indicated at 71 in FIGS. 1 and 5) of pre-selected constant repetition frequency are fed to separate inputs of an AND gate 69. The output of gate 69 is fed to the input of counter 70 to load the counter.

The frequency of clock pulses 71 is preferably selected to be significantly higher than the highest expected frequency of the pulse wave forms 60 and 62 so that at least one and frequently several clock pulses occur during each time interval of any significant duration in which the output of gate 66 is high and during each time interval of any significant duration in which the output of gate 66 is low as shown in FIG. 5. In this fashion the count loaded into counter 70 for a selected time period (which is equal to or less than the counter's bit capacity) will be proportional to the previously mentioned ratio of the summation of time intervals in which the output of gate 66 is high (a logic 1, to the total selected time period.

Whenever the output 67 from gate 66 is high (a logic 1) at the trailing edge of a clock pulse, the count in counter 70 will be advanced by one. Whenever the output 67 is low at a trailing clock pulse edge, the counter will not advance. Thus, for the example shown in FIG. 5, the count in counter 70 will be advanced by 5 for a total number of 9 input clock pulses. The total count loaded into counter 70 for the interval shown in FIG. 5 will therefore read out as 0101. Practical statistics require $2^{10}$ to $2^{16}$ counts to be stored in counter 70 at one time.

From the foregoing it will be appreciated that the pulse output wave form 67 is effectively recurrently sampled at a rate equal to the repetition rate of clock pulses 71. One example of a suitable clock pulse frequency is 1kHz.

The bits in the data word produced at the output pins of counter 70 are transferred in parallel to input pins of a storage latch or memory latch circuit 72. Latch 72 may be of any appropriate conventional form and has an adequate number of stages for latching in and thereby memorizing the binary data word fed from counter 70 upon receiving a latching signal of proper logic state.

When a latching signal or pulse is applied to latch 72, the multi-bit data word fed from counter 70 is transferred to and stored at output terminals of the latch. From here the stored data word is applied to a suitable digital to analog converter 74. Converter 74 converts the digital information into a d.c. signal voltage whose magnitude is proportional to the binary number which is represented by the data word.

The analog output signal voltage from converter 74 is applied to drive a graphic recorder 76 or a voltage meter 78, or both. Alternatively, other forms of read-out may be employed. Recorder 76 is advantageously of the strip chart type and is preferred because it permits the pipeline distance or footage being analyzed to be marked on the strip chart or to be displayed with or on the strip chart in a manner to indicate the distance of the detected leak from a known location or point.

Latching and reset pulses are respectively fed to latch 72 and counter 70 at the same pre-selected fixed repetition frequency. These latch and reset pulses may be developed by any suitable timing control or logic circuit. For example, a counter circuit may be employed to count the pulses 71 and to produce the latch and reset pulses each time the count reaches a pre-selected amount which is not greater than the bit storage capacity of counter 70. The clock pulses 71 of appropriate repetition frequency may be developed by a suitable frequency divider 79 which is fed by a master clock 80. Divider 79 may be of any suitable type for producing separate clock pulse trains at the various different repetition rates required by the circuitry. Master clock 80 may be an astable multivibrator for developing a square or rectangular pulse wave form.

From the foregoing it will be appreciated that the count in counter 70 is periodically transferred to and stored at the output of latch 72. With each latching pulse, the new count at the latch's input is transferred to the output to replace the existing count. Immediately upon storing a new count at the output of latch 72, counter 70 is reset to zero by a reset pulse.

Counter 70 now begins a new count in a new time interval. At the same time, the old count, which is at this time stored on the output pins of latch 72 will be converted by converter 74 into a d.c. signal voltage to operate an unshown pen motor or the like for driving a pen 75 (FIG. 6) in recorder 76. Recorder 76 therefore records on a visible scale the counts periodically read out of counter 70.

Thus, the record presented by recorder 76 will be a continuous curve (see FIG. 6, for example) which is indicative of the previously mentioned ratio of the sum of the time intervals in which the pulse output 67 is high to the total pre-selected time period which is set by the period or frequency of counter reset pulses (see FIG. 5). As previously described, this ratio will change as the delay in delay line 54 is automatically changed in the manner shown in FIG. 4.

As the phase difference between wave forms 60 and 62 is reduced and approaches a minimum by increasing the delay of one of the wave forms relative to the other, the magnitude of the measured value recorded by recorder 76 increases. When maximum phase correlation is achieved between the two pulse wave forms 60 and 62, the amplitude of the waveshape recorded by recorder 76 increases to a maximum as indicated at 81 in FIG. 6.

From the foregoing description it will be appreciated that the written record produced by recorder 76 is indicative of the extent or degree of phase correlation between the pulse wave forms which are fed from delay lines 54 and 54a to gate 66. The analog read-out supplied by recorder 76 may therefore be regarded as a correlation ratio. The oscillations shown in FIG. 6 occur because the leak sound frequency is partially tuned.

In this embodiment, the delay length in delay line 54 is automatically changed by progressive increments by a scanning apparatus 82 to progressively phase shift the pulse wave form 60 relative to the pulse wave form 62. Delay line 54 may be of any suitable circuit design for this purpose, one being illustrated in FIG. 3.

The delay line in FIG. 3 is of the variable length shift register type and comprises a multiplicity of shift registers and a corresponding number of multiplexers. Seven registers are shown for the purpose of illustration and are indicated at 83, 84, 85, 86, 87, 88 and 89. Registers 83–89 are of the serial-in/serial-out type in which data bit shifting takes place on a clock command. The bit storage capacity of registers 83–89 is in increasing order as shown, namely 1, 2, 4, 8, 16, 32 and 64, for registers 83–89 respectively. Additional shift registers having higher bit storage such as 128, 256 and 512 capacity may be added.

The multiplexers mentioned above are indicated at 92, 93, 94, 95, 96, 97, and 98 in FIG. 3 and may be of any suitable circuit design. Multiplexers 92–98 are serially connected as shown. In this embodiment each of the multiplexers 92–98 comprises three NAND gates and an inverter connected in the manner shown to provide a first data input 100, a second data input 101, a control or selector input 102, and an output 104. The logic state of a signal on the control input 102 determines which of the two signals at inputs 100 and 101 will be fed to the output 104.

For each multiplexer it will be appreciated from the illustrated logic that when a d.c. signal voltage having a logic 0 state is applied to the control input 102, the circuit path between the data input 100 and the output 104 is enabled and the circuit path between the data input 101 and output 104 is disabled. Thus, for this condition, the signal at input 100 will be fed to output 104, and the signal at input 101 will not be fed to output 104. When the signal applied to the control input 102 has a logic 1 state, the signal at input 101 will be fed to output 104, and the signal at input 100 will not.

As shown, the pulse wave form 60 from polarity detector 52 is fed to the serial input of shift register 89, which has the largest bit storage and also to input 100 of multiplexer 98. The serial output of register 89 is fed to input 101 of multiplexer 98, and the output 104 of multiplexer 98 is fed to the serial input of the next shift register 88 and also to input 100 of multiplexer 97.

The serial output of register 88 is applied to input 101 of multiplexer 97, and the output 104 of multiplexer 97 is fed to the serial input of register 87 and also to input 100 of multiplexer 96. The serial output of register 87 is applied to input 101 of multiplexer 96, and the output 104 of multiplexer 96 is fed to the serial input of the next shift register 86 and also to input 100 of multiplexer 95.

The serial output of register 86 is applied to input 101 of multiplexer 95, and the output 104 of multiplexer 95 is fed to the serial input of the next shift register 85 and also to input 100 of multiplexer 94. The serial output of register 85 is applied to input 101 of multiplexer 94, and the output 104 of multiplexer 94 is fed to the serial input of the next shift register 84 and also to input 100 of multiplexer 93.

The serial output of register 84 is applied to input 101 of multiplexer 93, and the output 104 of multiplexer 93 is fed to the serial input of the next shift register 83 and also to input 100 of multiplexer 92. The serial output of register 83 is applied to input 101 of multiplexer 92, and the output 104 of multiplexer 92 is fed to one of the inputs of gate 66 as shown.

To shift data through registers 83-89, clock pulses of suitable pre-selected repetition frequency are fed from frequency divider 79 to the clock or data shift inputs of registers 83-89. The repetition rate of these clock pulses applied may, for example, be on the order of 1kHz.

Scanning apparatus 82 is a clock-driven binary counter 110 having a sufficient number of stages to accommodate the number of shift registers in delay line 54. In this embodiment, counter 110 has two cascaded 4 bits stages 111 and 112 to develop an eight bit word. Only the first seven bits are employed for the illustrated circuit, however, inasmuch as there are only seven shift registers in the illustrated embodiment. Carry-over from stage 111 feeds stage 112.

The 4-bit binary output pins of counter stage 111 are indicated at QA, QB, QC, and QD, and the binary outputs of stage 112 are indicated at QE, QF, QG and QH. Outputs QA-H increase in binary order, starting with the least significant bit at output QA and progressing to the most significant bit at output QH.

Outputs QA – QG are separately connected to the control inputs 102 of multiplexers 92–98 respectively. Thus, the least significant bit at the output of counter 110 is fed to the control input 102 of multiplexer 92, the second least significant bit at the output of counter 110 is fed to the control input 102 of multiplexer 93, and so on to the connection feeding the most significant bit (in this case at QG) to the control input 102 of multiplexer 98.

Clock pulses supplied by way of generator 79 are fed to the clock or Ain input pin of counter stage 111 to advance the count in counter 110 when power is applied from a suitable source 116 to clock 80 through a switch 118. The repetition rate or frequency of clock pulses applied to the clock input of counter stage 111 is pre-selected and significantly less than the repetition frequency of clock pulses applied to the clock inputs of registers 83 – 89.

When the circuit shown in FIG. 3 is first activated, a reset pulse is supplied to the reset pins of counter stages 111 and 112 by any suitable means to reset counter 110 to zero. At the beginning of a scanning operation and before the first clock pulse is fed to counter stage 111, therefore, the starting state data word at output pins QA – QG will be 0000000 to provide zero time delay. Accordingly, the pulse wave form 60 from detector 52 will be fed without time delay directly and serially through multiplexers 98, 97, 96, 95, 94, 93 and 92 to gate 66.

After the elapse of a pre-selected time interval, following reset of counter 110, the first clock pulse is fed to counter stage 111 to advance the counter by one count. The output at pins QA – QG therefore changes to 0000001. With this counter output, multiplexer 92 will be conditioned to gate data only from its input 101, while the multiplexers 93 – 98 remain in condition to gate the data only from their inputs 100.

Thus, the pulse wave form 60 now must be clocked through the 1 bit shift register 83. The pulse wave form 60 will therefore be delayed one bit time which is the time required to fill up the 1 bit shift register 83 at the 1kHz clock rate on the line 126 (see FIG. 3) feeding the shift registers. At the 1kHz clock repetition frequency, the pulse wave form 60 will be delayed 1 msec.

When the second clock pulse is fed to counter stage 111 to advance counter 110 to the second count, the output on pins QA – QG will change to 0000010. As a result, multiplexer 93 will now be conditioned to gate data only from its input 101, while the remaining multiplexers will be conditioned to gate the data only from their inputs 100.

Now the pulse wave form 60 must fill up the two bit shift register 84 at the 1kHz clock rate before passing on. The pulse wave form 60 will therefore be delayed by 2 bit times or 2 msec.

When the third clock pulse is fed to counter stage 111 to advance the counter, the output states on pins QA – QG will change to 0000011. As a result, both of the multiplexers 92 and 93 will be conditioned to gate data only from their inputs 101, while the remaining multiplexers will be conditioned to gate data only from their inputs 100.

Thus, the pulse wave form 60 is now required to first fill up the 2 bit shift register 84 and then the 1 bit shift register 83 at the 1kHz clock rate before passing on. The pulse wave form 60 will therefore be delayed by 3 bit times or 3 msec.

When the sixty-fourth clock pulse is received to advance counter 70 by 64 counts, its output will be 1000000. Thus multiplexer 98 will be conditioned to gate data only from its input 101, while the remaining multiplexers will be conditioned to gate data only from their inputs 100. The pulse wave form 60 will therefore be required to fill up register 89 at the 1kHz clock rate before passing on. Wave form 60 will consequently be delayed by 64 msec.

From the foregoing description it will be appreciated that the delay entered into delay line 54 is incremently and periodicallly increased at a constant rate to delay wave form 60 by incrementally increasing times in which the increments of time delay are equal (i.e., 1 msec. for this example).

In this embodiment, the repetition frequency of clock pulses 71 is desirably much faster than the repetition frequency of clock pulses fed to counter 110. For example, where the repetition rate of clock pulses on line 126 is 1kHz, the repetition frequency of the clock pulses fed to counter 70 may be 1kHz, and the repetition frequency of clock pulses fed to counter 110 may be 1 Hz.

The reset pulses for counter 70 and the clock pulses for counter 110 are conveniently made the same.

It will be appreciated that operation of the apparatus thus far described could be initiated manually be manually feeding one clock pulse at a time to counter 110 and be selectively initiating the supply of the desired number of clock, reset and latch pulses for counter 70 and latch 72 for each clock pulse delivered to counter 110.

The circuit design for delay line 54a may be the same as that just described for delay line 54. The delay selectively entered into line 54a by the operator before initiating operation of apparatus 20 may be either zero or the time required for the leak-produced sound wave to propagate the selected spacing between geophones 22 and 24 as previously mentioned. Any suitable equipment may be employed to conveniently enter the selected delay into delay line 54a.

In this embodiment the manual entry of a selected delay into line 54a is accomplished by a conventional thumb wheel selector 130 (FIG. 1). Selector 130 has a multiplicity of manually manipulatable thumb wheels 131 for entering a multi-digit decimal number representative of a selected distance of footage. The electrical signals developed by the thumb wheel entries are transferred in parallel to a suitable BCD-to-binary converter 132 which has a multi-bit output similar to that of counter 110. Each of the bit outputs of converter 132 is fed to a different multiplexer control input (101) in the delay line 54a in the same manner as described for the connections of the outputs of counter 110 to multiplexers 92 – 98. Data shifting clock pulses are fed to the unshown shift registers in delay line 54a in the same manner described for delay line 54. The data-shifting clock pulses for delay line 54a are preferably taken from the output of generator 79 which feeds the clock pulses to shift registers 83 – 89.

For the purpose of the following analysis and operation of apparatus 20 the following designations are employed:

$t_A$ = the time required for the sound wave emanating from the leak to reach geophone 22.

$t_B$ = the time required for the sound wave emanating from the leak to reach geophone 24.

$t_{AA}$ = the time delay in delay line 54.

$t_{BB}$ = the time delay in delay line 54a.

The pulse wave forms 60' and 62' will be in phase with each other to provide maximum correlation when the following relationship is established:

$$t_A + t_{AA} = t_B + t_{BB} \quad (1)$$

If zero delay is entered in delay line 54a (i.e., $t_{BB}=0$) and $t_B$ is greater than $t_A$, then the time delay $t_{AA}$ required to bring wave form 60 in phase with wave form 62 will be:

$$t_{AA} = t_B - t_A \quad (2)$$

The effective point or location of pipe 26 being analyzed or scanned for maximum phase correlation at any given moment in the operation of apparatus 20 is determined by the difference between the delay times $t_{AA}$ and $t_{BB}$. For example, if $t_{AA}$ and $t_{BB}$ are zero or otherwise equal, then the location of the pipeline being analyzed or correlated is midway between the spaced apart geophones 22 and 24. This is substantiated by the fact that maximum correlation and, hence, maximum read-out on recorder 76 will occur for $t_{AA} = t_{BB}$ if the site of the leak is midway between geophones 22 and 24.

If the delay time $t_{AA}$ is increased to equal the time required for the sound wave to propagate one-half the pipeline length (1) between the two geophones and $t_{BB} = 0$, then the location of the pipe being analyzed or scanned for maximum correlation will be one-fourth of the pipeline length (i.e., the length between geophones 22 and 24) as measured from the midpoint of the pipeline length 1 in the direction of geophone 22. If the delay time $t_{AA}$ is further increased to equal the time required for the leak-produced sound wave to propagate the full length of pipe 26 between geophones 22 and 24 and if $t_{BB} = 0$, then the location of the pipe being analyzed or correlated will be at the location of geophone 22.

From the foregoing it will be appreciated that if the delay time in line 54a is set to zero ($t_{BB} = 0$), only the half of the pipeline length extending from the pipe's midpoint between the geophones to geophone 22 may be analyzed or scanned with the arrangement of geophones shown in FIG. 1. In order to analyze the remaining half of pipe 26 for the condition where $t_{BB}$ is set to zero, one can switch geophones 22 and 24 to locate geophone 22 to the right of the leak in the original position of geophone 24 and to locate geophone 24 to the left of the leak in the original position of geophone 22.

The switching of geophones 22 and 24 may be avoided simply by selectively setting the time delay $t_{BB}$ in delay line 54a to equal the time required for the sound wave emanating from the leak to propagate the length of pipe 26 between geophones 22 and 24. With this delay in line 54a then the pipe location being scanned or analyzed when $t_{AA} = 0$ will be at the location of geophone 24. As the delay time $t_{AA}$ is automatically incrementally increased with this setting of $t_{BB}$ the location of pipe 26 being analyzed or scanned is advanced toward geophone 22, and when $t_{AA}$ is increased to equal or approximately equal to the time required for the leak-produced sound wave to propagate twice the length of pipe 26 between geophones 22 and 24, then the pipe location being analyzed or scanned will be at the location of geophone 22.

Thus, by selectively setting the delay time in line 54a to equal the time required for the leak-produced sound wave to propagate the length of pipe 26 between geophones 22 and 24, the entire length of the pipe between the two geophones may be scanned by increasing $t_{AA}$ from zero to a delay equal to the time required for the leak-produced sound wave to propagate twice the length of the pipe between the geophones.

From the foregoing description it will be appreciated that the location of the pipeline being scanned at a given instant may be found from the following equation:

$$d = c (t_{AA} - t_{BB})/2 \quad (3)$$

where $d$ = distance measured from the midpoint of pipe 26 between the two geophones, and $c$ = speed of sound in water in the pipe If $d$ is computed to be a positive number from equation (3), then the pipe location being scanned is between the midpoint of the pipe and geophone 22. If $d$ is negative then the pipe location being scanned is between the midpoint of pipe 26 and geophone 24.

To fix the location of the leak, apparatus 20 includes a counter circuit 140 which drives a display unit 142 which is preferably, but not necessarily, of the digital type. For example, a digital LED display may be employed.

Counter circuit 140 is driven in step with counter 110 during a scanning operation to advance by a preselected number each time counter 110 is advanced by the count of 1 to incrementally increase or advance the time delay in delay line 54. For a predetermined speed of sound in a given medium (say, water essentially at rest in pipe, for example), counter 140, and more particularly display unit 142, will be advanced with each clock pulse by an amount approximately equal to $\Delta d/2$ where $\Delta d = \Delta t(c)$, and where:

$\Delta t$ = the incremental time delay entered into delay line 54 for each clock pulse 71 (namely 1 msec for this example);

$c$ = the speed of sound in the selected medium; and $\Delta d$ = the distance over which the sound propagates for the time $\Delta t$.

To advance counter 140 in a scanning operation a pulse train 73 having an appropriate repetition frequency may be supplied from frequency divider 79 to counter 140. Alternatively, the clock pulses 71 may be employed to advance counter 140 so that each time the delay in delay line 54 is incrementally shifted, or more specifically increased, by counter 110, the count in counter 140 will be advanced by the desired, predetermined amount.

From the foregoing it will be appreciated the display unit 142 provides a read-out of a distance measurement to continually indicate the location of the pipeline being scanned or analyzed during a scanning operation. The read-out provided by display unit 142 may be in any suitable units of length such as feet or meters.

Taking the particular operating mode in which the time delay entered into line 54a is the time required for the leak-produced sound wave to propagate the length of pipe 26 between geophones 22 and 24, the read-out furnished by display unit 142 will be zero when the output of counter 110 is zero (i.e., 0000000) at the start of the scanning operation when the delay $t_{AA}$ entered into line 54 is zero. It is now known that the pipe location being scanned and read-out on recorder 76 at this moment is zero feet from geophone 24. The operator may then write or record this distance measurement on the recorder's strip chart as shown in FIG. 6 to correlate the distance read-out with the correlation waveshape being made by recorder 76.

When counter 110 is advanced by one count to increase the time delay $t_{AA}$ by one-preselected increment $\Delta t$ (namely, 1 msec. in this example), display unit 142 will be advanced by counter 140 to indicate the distance of the pipeline location from geophone 24 which is currently being scanned at the 1 msec. delay. Thus, display unit 142 continues to read out the pipeline location being scanned for the entire scanning operation.

The operator advantageously periodically marks the distances indicated by display unit 142 on the strip chart in recorder 76 to thus provide a precise determination of the location of the leak in the manner shown in FIG. 6. To facilitate accurate marking of distances on the strip chart of recorder 76, the distance increase pulses 73 may advantageously be employed to operate an additional pen motor (not shown) which drives a second pen 144 in recorder 76. Distance pulses 73 before being applied to the additional pen motor are advantageously frequency divided by a frequency divider 146 (FIG. 1) to supply pulses at a reduced, pre-selected frequency. For example, frequency divider 146 may divide by ten so that one out of every ten successive distance pulses 73 is applied to cause pen 144 to place a mark or blip on the recorder strip chart as indicated at 150 in FIG. 6. The operator takes a reading of display unit 142 when each mark 150 is made and records the read-out or the mark as shown in FIG. 6.

To locate a leak with apparatus 20, the operator first places geophones 22 and 24 at appropriately spaced apart places on the surface above pipe 26 in the manner previously described so that they are on opposite sides of the suspected location of the leak and over spaced apart regions of the underground pipe. Preferably, geophones 22 and 24 are positioned on or removably attached to such structure as the fire hydrants 22 and 24 or the stop boxes 34 and 32 in the case of a water main supplying water to buildings. Power for the circuitry is then readied, and at this time reset signals are applied to each counter in the circuit to reset or clear the counters to zero in preparation for a scanning operation. The reset signals in preparation for a scanning operation may be produced by any suitable conventional means.

In addition to clearing all of the counters, the selected time delay $t_{BB}$ is entered into delay line 54a by manipulation of thumb wheels 131 is selector 130. For example, assume that the entered time delay $t_{BB}$ is equal to the time required for the sound wave emanating from the leak to propagate the length of pipe 26 between geophones 22 and 24.

Thereafter, the circuit is energized as by closure of switch 118 to start the automatic scanning operation which was previously described. The operator observes the reading on display unit 142 and the strip chart recording in recorder 76 and preferably marks the distances displayed by unit 142 for each of a selected number of the markers 150 made on the recorder's strip chart by pen 144 in the manner shown in FIG. 6.

Assume that the site of the leak is at location "a" between the two geophones at a distance of about 120 feet from geophone 24. The maximum amplitude 81 of the strip chart recording will therefore occur at or near the marker 150 which was made when the reading of display unit 142 is at or near 120 feet.

Having now determined the site of the leak, the distance of 120 feet may be measured along the path of the pipeline from geophone 24 to establish the location which is over the leak. Alternately, in the example shown in FIG. 6 in which the spacing between geophones was selected to be 200 feet, the distance of 80 feet may be measured from geophone 22 to locate the site of the leak. Excavation may now be made at the proper location to uncover the leaking portion of the pipeline for repair or replacement.

If the site of the leak happens to be vertically below geophone 24, then the maximum amplitude (81) on the recorder's strip chart will occur at a reading of zero feet from geophone 24. If the site of the leak happens to be vertically below geophone 22, then the maximum amplitude (81) will occur at the maximum length of the scanned distance which, in the example of FIG. 6, occurs at 200 feet from geophone 24 or zero feet from geophone 22.

If the actual site of the leak happens to be in an adjacent pipeline portion, say to the right of geophone 24 as viewed from FIG. 1, then the apparent site of the leak indicated by the strip chart's maximum amplitude (81) will occur at the zero foot marker (150) on the strip chart. To distinguish whether the leak is actually directly below geophone 24 or in the adjacent pipeline portion, geophones 22 and 24 are transferred to the adjacent portion as by locating geophone 22 at the original location of geophone 24 and locating geophone 24 farther to the right as viewed from FIG. 1. With these new geophone positions the adjacent pipeline portion is automatically scanned in the same manner as previously described. If the maximum amplitude 81 on the strip chart now occurs between the two geophones, then the true site of the leak is located in the adjacent pipeline portion. On the other hand, should the maximum amplitude 81 occur at the new position of geophone 22, then the actual site of the leak is established to be vertically below geophone 22. If the second scanning operation indicates the site of the leak to be vertically below geophone 24, then the next adjacent pipeline portion to the right of geophone must be checked. This procedure is repeated until the recorder 76 indicates that the site of the leak is between the two geophones. The same procedure can be applied to locate the actual site of a leak in the case where a first scan indicates that the apparent site of the leak is vertically below geophone 22.

An ambiguous location of a leak may also occur in a case where a further fluid-carrying pipe 151 is connected to pipeline 26 as shown, for example, in FIG. 2. Assume that the actual site of the leak is at location b in pipe 151, and pipeline 26 is first scanned with apparatus 20 by placing geophones 22 and 24 on opposite sides of the intersection at stop boxes 32 and 34 respectively. For this condition, the maximum amplitude 81 in the strip chart read-out will occur at the juncture of pipe 151 with pipe 26 (at location c).

To determine the actual location of the leak under these circumstances, geophone 24, for example, could be transferred to stop box 36. Apparatus 20 is then operated in the manner previously described to scan continuously the section of pipe 151 from stop box 36 to location c and the section of pipe 26 from location c to stop box 32. If the maximum amplitude (81) of the strip chart read-out falls at location b along pipe 151 then the actual site of the leak is at location b. If, contrary to the above assumption, the maximum amplitude (81) of the strip chart read-out occurs at location c then the actual location of the leak is truly at location c.

To move accurately determine the location of a pipeline leak, envelope detectors 160 and 160a may be added to circuits 40 and 42 respectively as shown in FIG. 7. Each of the detectors 160 and 160a comprises a full wave rectifier for rectifying the incoming a.c. signal in its associated circuit and also a filter (such as an RC filter) for smoothing the rectified waveform to produce the slowly varying envelope shown in FIG. 7. The rectifiers in detectors 160 and 160a may be of the semiconductor diode type.

As shown, detector 160 is connected between volume control 50 and polarity detector 52. Likewise, detector 160a is connected between volume control 50a and polarity detector 52a.

The output of envelope detector 160 is coupled to the input of polarity detector 162 by a capacitor 162 to remove the d.c. component from the detected waveform. Similarly, the output of envelope detector 160a is coupled by a capacitor 162a to the input of polarity detector 52a to remove the d.c. component from the detected waveform at the output of detector 160a.

The a.c. signal developed in each of the circuits 40 and 42 will vary in amplitude and frequency due to background or extraneous noise and variations in the pitch and volume of the sound emanating from the leak. Each of the detectors 160 and 160a is effective to produce a waveshape which follows the envelope of its associated incoming a.c. signal. These envelope waveshapes therefore have a frequency which is considerably less than that of the incoming a.c. signals which are fed to detectors 160 and 160a. Consequently, the positive alternations of the capacitively coupled envelope waveshapes will be many times longer in time than the positive alternations of the a.c. signals which are fed to detectors 160 and 160a. The durations of the positive and zero voltage levels at the output of polarity detectors 52 and 52a are therefore much longer as compared with those in the embodiment of FIG. 1. In other words, the periods of the pulses waveforms fed to gate 66, though varying, are much longer than those developed in the embodiment of FIG. 1. This plus the completely random nature of the amplitude variations has the effect of producing a strip chart recordation as shown in FIG. 8.

Figure 8:
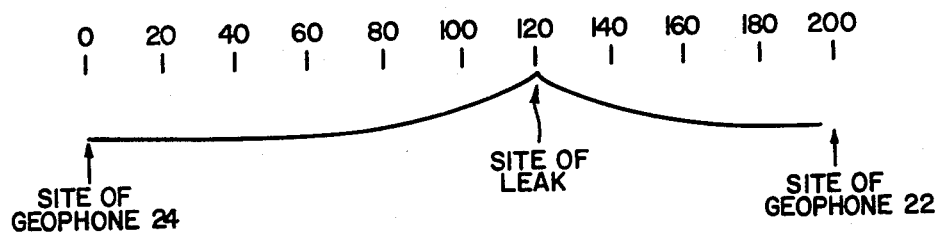
FIG. 8 is a wave shape diagram illustrating the recordation of the strip chart recorder for the modification shown in FIG. 7.

In FIG. 8, the strip chart curve is devoid of the oscillations which occur in the curve of FIG. 6 and rises to a peak 164 at the site of the leak.

The oscillations which occur at and near maximum correlation in the strip chart curve shown in FIG. 6 are due to the repetitive recurring correlation of the two waveforms 60' and 62' which are partially tuned with respect to each other.

Figure 9:
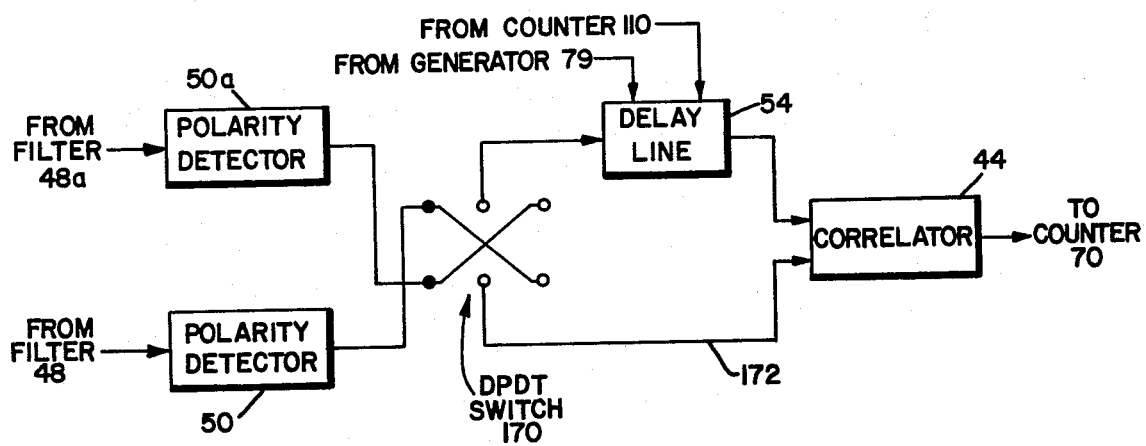
FIG. 9 is a fragmentary schematic circuit diagram illustrating a further embodiment of this invention in which only one delay line is employed.

If no delay is to be imparted to wave form 62 (i.e., $t_{BB}=0$), then the circuit of FIG. 1 may be simplified in the manner shown in FIG. 9 and yet facilitate the automatic scanning of the full pipeline length between geophones 22 and 24 without changing the positions of the geophones.

In the embodiment of FIG. 9, delay line 54a is replaced with a double pole double throw switch 170. The remainder of the circuit for FIG. 9 is the same as that shown in FIG. 1.

As shown in FIG. 9, polarity detectors 50 and 50a are connected to separate input terminals of switch 170 which provides switchable connections to delay line 54 and correlator 44. The output of delay line 54 is connected to one input of gate 66 as before. In this embodiment, however, the other input of gate 66 is connected by a wire 172 to an output terminal of switch 170.

In one position of switch 170, detectors 50 and 50a will be respectively connected to delay line 54 and through wire 172 to correlator 44. In the other position of switch 170, the connectors are reversed so that detector 50a is connected to delay line 54 and detector 50 is connected through wire 172 to correlator 44.

Considering operation in the first position of switch 170 mentioned above, the portion of pipe 26 scanned by apparatus 20 will extend from the midpoint of pipe 26 between the two geophones 22 and 24 to geophone 22 as previously described. In this first position of switch 170, wave form 62 will be fed without time delay to correlator 44 by way of wire 172, and wave form 60 will be fed to the other input of correlator 44 by way of delay line 54. Wave form 60 will therefore by delayed in progressively increasing increments as previously explained.

In the leak in pipe 26 is between geophone 22 and the midpoint of pipe 26 between the geophones, recorder 76 and display unit 142 will indicate the proper location of the leak. If the leak happens to be in the unscanned half of the pipe, then the maximum phase correlation indicated by recorder 76 will not appear in the scanned distance.

To scan the other half of pipe 26 extending from the midpoint of pipe 26 between the two geophones to geophone 24 switch 170 is thrown to its other position without moving the geophones from their original positions. Now, wave form 60 will be fed without any delay to correlator 44 by way of wire 172, and wave form 62 will be fed to correlator 44 by way of delay line 54. Wave form 62 will now be delayed in progressively increasing increments in the same manner as previously described for wave form 60.

Thus, the entire length of pipe 26 between geophones 22 and 24 may be automatically scanned in two stages without requiring a change in the positions of the geophones.

While display unit 142 provides a specific location of the leak, it is equally clear that the phase correlation record or waveshape produced by recorder 76 provides an indication of the location of the leak in that it will indicate whether or not the leak is between the selected locations of geophones 22 and 24. It also will be appreciated that instead of starting with zero or minimum delay in delay line 54 and progressing incrementally to a maximum delay, the scanning operation may initiate with a maximum delay in line 54 and progress to zero or some other minimum. Additionally, analog delay lines may be employed in lieu of the illustrated digital delay lines.

In the preceding embodiment the variable time delay line 54 is shown to be of the non-circulating variable length shift register type for variably time delaying the digital data 62 relative to the digital data 60. This type of variable delay line is of simplified construction, but relatively slow in operation. The slow operation mainly results from the need to accumulate samples of a large number correlation comparisons in counter 70 for each increment of delay in line 54 in order As compared with the preceding embodiment, the leak detecting apparatus shown in FIGS. 10–15 is considerably more rapid in operation, thus enabling greater pipe footage to be scanned for leaks in the course of a working day. The more rapid operation is accomplished in part by employing a circulating delay line 200 (also called a recirculating delay line) in place of the non-circulating variable length delay line 54.

Figure 10:
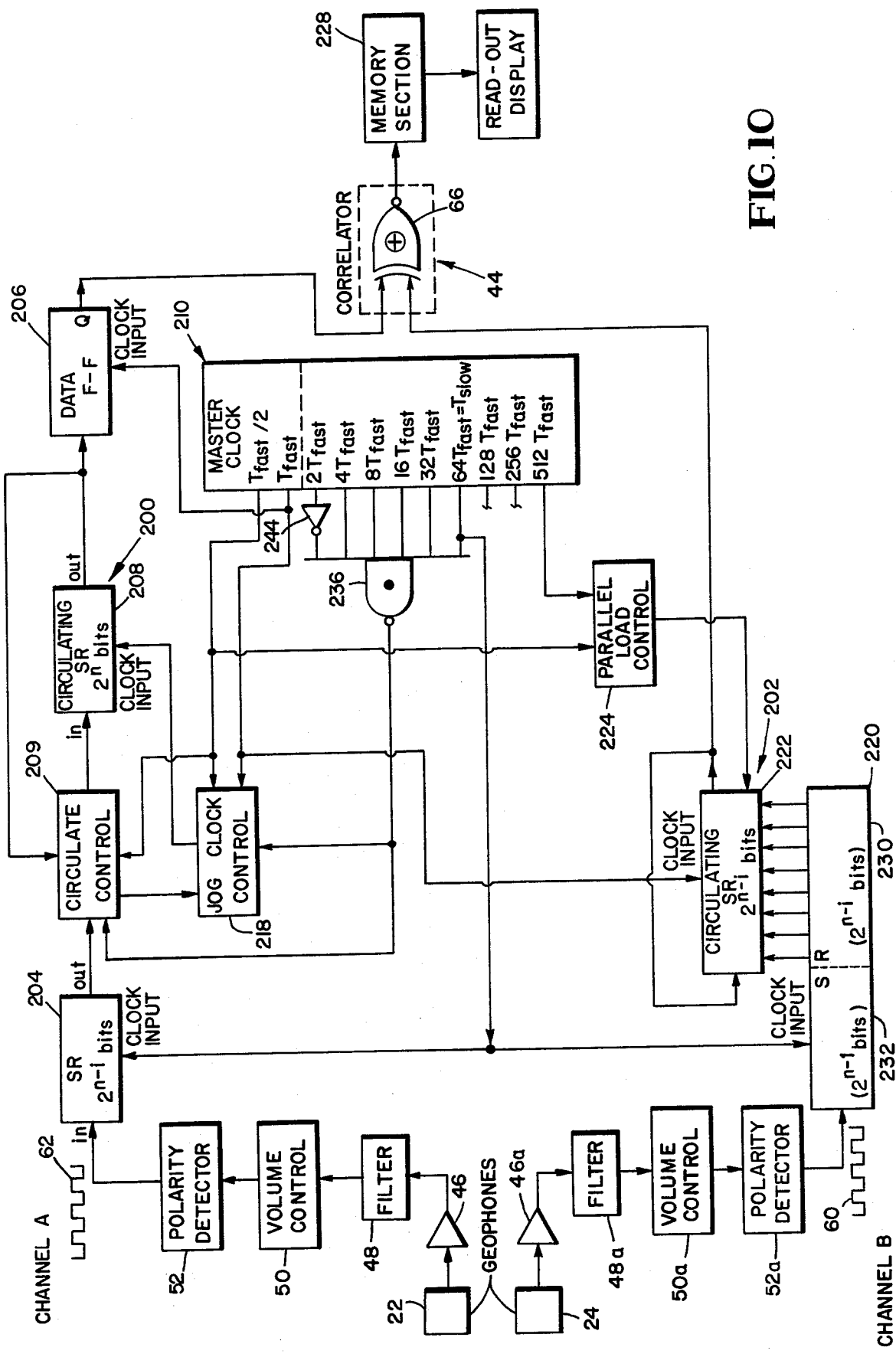
FIG. 10 is a schematic circuit diagram of another embodiment of this invention in which a recirculating delay line is used instead of a variable length delay line.

To the extent that the apparatus of FIG. 10 is the same as the apparatus in FIG. 1, like reference characters have been employed to designate corresponding circuits and parts.

As shown in FIG. 10, geophone 22 feeds data channel A, and geophone 24 feeds data channel B. Channel A, as previously described, includes amplifier 46, filter 48, volume control 50, and polarity detector 52. Channel B, as previously described, includes amplifier 46a, filter 48a, volume control 50a and polarity 52a. With this circuitry, the analog signal fed into each of the two data channels is conditioned and converted into a digital or binary signal in the same manner as described in the embodiment of FIG. 1.

As shown in FIG. 10, channel A further includes a non-circulating shift register 204, the circulating delay line 200, and a 1 bit shift register in the form of a clocked, type D flip-flop 206. Delay line 200 variably time delays the data signal in channel A relative to the data signal in channel B. For accomplishing this function, delay line 200 may be a recirculating shift register (also called a circulating shift register) as indicated at 208. The output of register 208 is tied around to its input to cause the data in the register to recirculate under the control of a circulating control circuit 209.

The length of recirculating register 208 is preselected and is identified by the character $n'$. In order to fill up the $n'$ length of register 208 with data at every location in the register, it is necessary to inject data into every successive $i'+1$ location, where $n'$ and $i'+1$ have no common factors. The apparatus to be described accomplishes this purpose.

The binary data (see signal 62) fed to the input of shift register 204 is serially clocked into and shifted through the shift register at a clock pulse rate of $1/T_{SLOW}$ where $T_{SLOW}$ is frequently referred to as the bit time period (or simply the bit time) and is the period of clock pulses fed from a counter output stage of a master clock 210.

Figure 11:
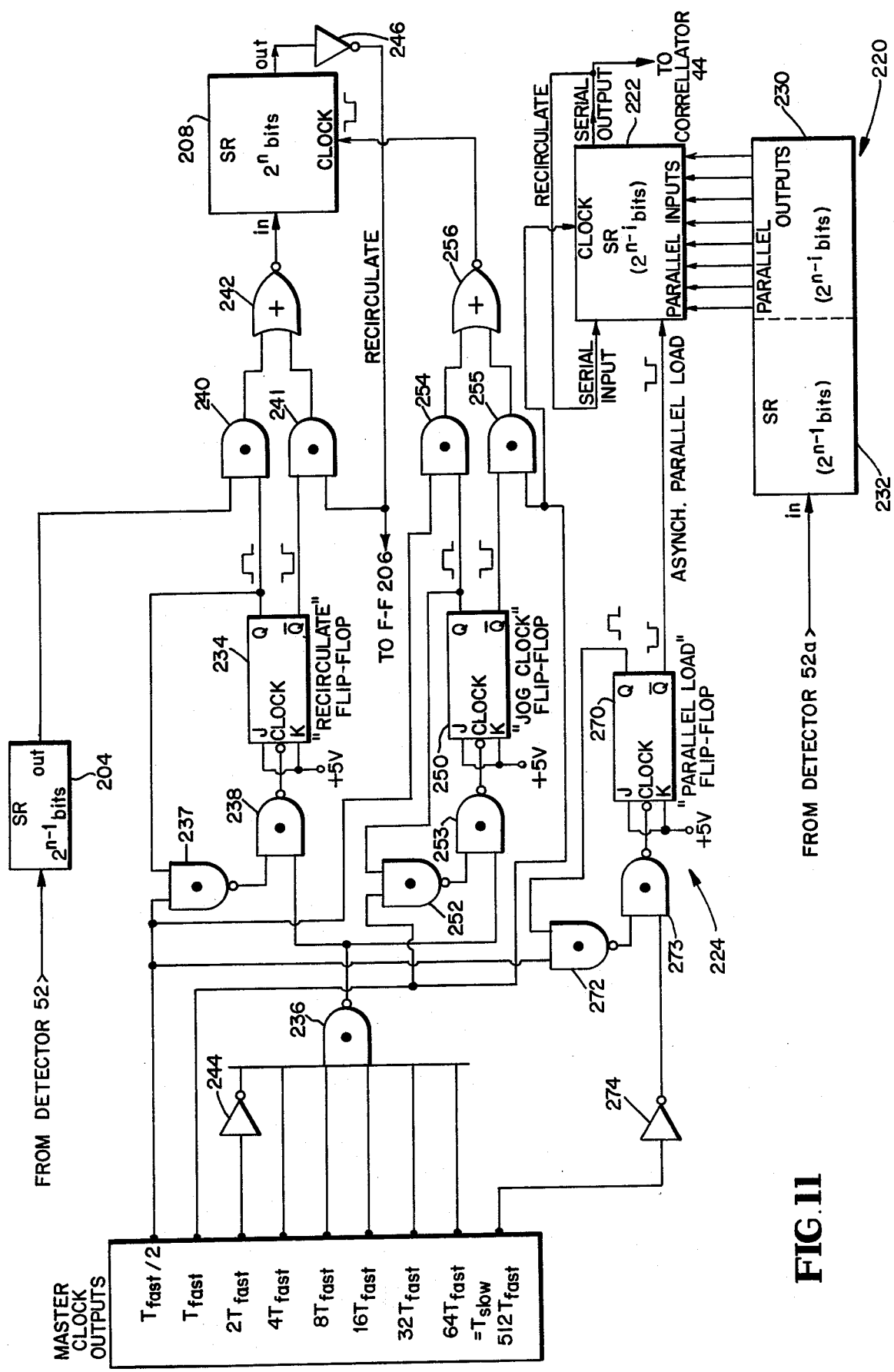
FIG. 11 is a schematic circuit diagram of the recirculating control circuit, the jog control circuit and the parallel load circuit shown in FIG. 10.

Clock 210 is made from a series of synchronous counters to provide separate clock pulse outputs of different preselected periods. In this embodiment, the fastest or smallest clock output period is $T_{FAST}/2$, followed by $T_{FAST}$, then by $2T_{FAST}$ and so on up to $2^n T_{FAST}$ as shown in FIGS. 10 and 11. The clock pulse period at the $T_{FAST}$ output is twice as great as the clock pulse period at the $T_{FAST}/2$ output. Likewise, the clock pulse period at the $2T_{FAST}$ output is twice as long as the clock pulse period at the $T_{FAST}$ output, the clock pulse period at the $4T_{FAST}$ output is four times as long as the clock pulse period at the $T_{FAST}$ output, and so on. Accordingly, the illustrated designations of clock pulse outputs indicated the periods of the different clock pulse outputs relative to the period $T_{FAST}$.

Data shifted through register 204 is gated through control circuit 209 and entered into register 208 at the end of each clock pulse period $T_{SLOW}$. In this embodiment, the $T_{SLOW}$ clock pulses are taken from the $64T_{FAST}$ output of clock 210. As will be described in detail presently, control circuit 209 operates to momentarily stop recirculation of data around register 208 at the end of each clock pulse period $T_{SLOW}$ in order to enter a new or fresh data bit into register 208 and to drop the oldest data bit from the register.

In addition to being recirculated, data the the output of register 208 is clocked through flip-flop 206 to one of the inputs of the exclusive NOR gate 66 which, as previously described, defines a correlator 44.

The contents in register 208 are shifted under the control of a jog control circuit 218. Throughout each recurring period of $T_{SLOW}$, circuit 218 normally shifts the contents in register 208 at a constant clock pulse frequency of $1/T_{FAST}$ except for one interval in which the shift frequency is doubled to $2/T_{FAST}$. The purpose of this increase will be explained later. Clock pulses for shifting the contents of register 208 at the rate of $1/T_{FAST}$ are supplied by the $T_{FAST}$ output of clock 210. The period of these clock pulses may be referred to as the $T_{FAST}$ bit time period or simply the $T_{FAST}$ bit time.

For reasons to be explained later, the clock period $T_{FAST}$ is much smaller than the clock period $T_{SLOW}$. Hence, the rate at which data is recirculated through register 208 is much faster than the rate at which fresh data is injected into register 208.

Register 208 is provided with a fixed length of $n'$ bits where $n'$ is an integer much greater than zero and conveniently equal to 2 raised to some pre-selected power (i.e., $n'=2^n$). For example, $n$ may conveniently be selected to be 9 so that register 208 will be $2^9$ or 512 bits long. The selected length of register 208 sets the number of delay line partitions in the scanning operation.

Still referring to FIG. 10, the data channel B further includes a non-recirculating serial input/parallel output type shift register 220 and a circulating delay line 202. Delay line 202 may be a recirculating shift register (also called a circulating shift register) as indicated at 222. The output of register 222 is tied around to tis input to cause the data loaded into the register to continuously recirculate.

In addition to clocking register 204, the $T_{SLOW}$ clock output is applied to the clock input of register 220. Thus, digital data (see signal 60) fed to the input of register 220 is serially clocked into and shifted through register 220 at the clock pulse rate of $1/T_{SLOW}$. As will be described in detail presently, a pre-selected number of bits in register 220 are periodically parallel loaded into register 222 under the control of a parallel load circuit 224.

In addition to being recirculated, the data at the output of register 222 is fed to the second input of gate 66 for comparison with the binary signal from flip-flop 206. The correlations detected by gate 66 are placed in memory in a memory section 228. The memory contents are read out after the completion of the scanning operation to establish the location of the leak. Memory section 228 and its operation will be described in detail later on.

The $T_{FAST}$ output of the master clock 210 is also used to clock register 222. Thus, the data in register 222 is recirculated at the same rate (namely $1/T_{FAST}$) as the data recirculates through register 208. Register 222, however, has a fixed bit length which is less than the bit length of register 208 and which bears a predetermined relationship to the length of register 208.

As shown, register 222 is $2^{n-i}$ bits long where $i$ is a selected integer greater than zero, but less than the selected value of $n$ (i.e., $0 < i < n$). For $n=9$, one satisfactory value of $i$ is 6. Thus, for this numerical example, the length of register 222 will be $2^{9-6}$ or 8 bits.

The total length of register 220 is the sum of $2^{n-i}$ and $2^{n-1}$ bits, where only the $2^{n-i}$ bits are used to periodically parallel load register 222. Register 220 may be regarded as having two sections 230 and 232, where sections 230 has a length and parallel output of $2^{n-i}$ bits and where section 232 has a serial output feeding section 230 and a length of $2^{n-i}$ bits. For the numerical example given above, section 230 will be 8 bits long, and section 232 will be 256 bits long.

Register section 232 is employed to delay the digital data in channel B by a fixed interval equal to $256T_{SLOW}$ or $256T_{SLOW}$ bit times. The purpose of this delay is the same as that described for delay line 54a in the first embodiment. Thus, delaying the channel B data by 256 bit times causes the apparatus of FIG. 10 to scan a length of pipe 26 between geophones 22 and 24. Without this delay the leak detecting apparatus will scan only from or to the midpoint between the two geophones.

The purpose of register 204 is to offset or cancel the time delay that is caused by register section 230. To accomplish this register 204 is provided with a length of $w^{n-i}$ bits and is clocked at the same rate (namely $1/T_{SLOW}$) as register 220. Accordingly, the net time delay that register 220 causes in channel B will be $2^{n-1}$ or $256T_{SLOW}$ bit times.

From the description thus far it will be appreciated that register 208 provides 512 presentations of data of different relative ages in $512T_{FAST}$ bit times. Register 222, on the other hand, recirculates the channel B data once in $8T_{FAST}$ bit times. For every complete 512 bit recirculating cycle made by register 208, register 222 completes $2^i$ or 64 complete 8 bit cycles. Each data bit in register 222 will thus be compared with one-eighth of the contents in register 208.

In this embodiment the clock pulse period ratio of $T_{SLOW}/T_{FAST}$ is set or determined by the selected value of $2^i$. That is, the values of $T_{SLOW}$ and $T_{FAST}$ are so selected that the ratio $T_{SLOW}/T_{FAST}$ equals $2^i$, which in the foregoing numerical example is 64.

Since the values of $T_{SLOW}$ and $T_{FAST}$ are so selected that $T_{slow}=2^i T_{FAST}$, it is apparent that a fresh data bit will be entered into register 208 at every recurring bit time interval of $2^i T_{FAST}$. For $i=6$, the new data will therefore be entered at every 64th bit time period of $T_{FAST}$. Two sequential operations actually take place on every 64th bit time period of $T_{FAST}$.

First, recirculation of data around register 208 is inhibited by circuit 209 and the contents in register 208 are shifted one bit to the right from the register's input to the register's output. This shift enters the new data in the leftmost stage of register 208 and drops the binary data bit in the register's rightmost stage. In the second operation, which follows the first operation, the recirculation of data around register 208 is enabled and the register contents are shifted right by one stage to recirculate one data bit.

To cause these two operations to sequentially occur at every 64th $T_{FAST}$ clock pulse (i.e., at $2^i T_{FAST}$), two shift pulses having a frequency of $2/T_{FAST}$ are applied to register 208 instead of a single $T_{FAST}$ clock pulse. The clock pulses of frequency $2/T_{FAST}$ are obtained from the master clock output which is indicated at $T_{FAST}/2$. The bit time period of $T_{FAST}/2$ is equal to one-half of the $T_{FAST}$ clock pulse period. It should be noted that counting from zero, the two $T_{FAST}/2$ clock pulses will be applied in the 63rd bit time period of $T_{FAST}$.

For performing the two operations described above, circuits 209 and 218 may be of any suitable design, one example being illustrated in FIG. 11.

Referring to FIG. 11, the recirculating control circuit 209 is shown to comprise a JK flip-flop 234, NAND gates 236, 237 and 238, AND gates 240 and 241 and a NOR gate 242. Gate 236 detects a master clock output of $111110_2$ or $62_{10}$. In this regard it will be observed that the outputs of the clock 210 represent a binary number or word in which the master clock's $2T_{FAST}$ output is taken as the least significant digit and the clock's $2^n T_{FAST}$ output is the most significant digit. This binary number is designated in the following description as $N_{CLOCK}$. $N_{CLOCK}$ increases by the binary count of 1 for each $T_{FAST}$ clock pulse. In other words, $N_{CLOCK}$ is a count of the number of $T_{FAST}$ clock pulses supplied by clock 210. At the beginning of a cycle, $N_{CLOCK}$ changes from $111111111_2$ to $000000000_2$ at the start of the first $T_{FAST}$ clock pulse. The state of $N_{CLOCK}$ thereupon changes to $000000001_2$ at the second $T_{FAST}$ clock pulse, then to $000000010_2$ at the third $T_{FAST}$ clock pulse, and so on.

In order to detect the 1 states in the five most significant digits of $111110_2$, the following master clock outputs are connected to and feed separate inputs of NAND 236: $4T_{FAST}$, $8T_{FAST}$, $16T_{FAST}$, $32T_{FAST}$ and $64T_{FAST}$. In order to detect the 0 state in the least significant digit of $111110_2$, a further input of gate 236 is connected by way of an inverter 244 to the $2T_{FAST}$ output of clock 210 as shown. The $2T_{FAST}$ output of clock 210 is the least significant digit in $N_{CLOCK}$ as previously mentioned. With this logic, the output of NAND gate will go low (to the 0 state) on the transition of $N_{CLOCK}$ (i.e., the binary number at the output of the master clock) to $XXX111110_2$ where the most significant digits of $N_{CLOCK}$, as indicated by the X's, may be of either binary state.

Gate 236 feeds one of the two inputs of NAND gate 238. The other input of NAND gate 237 are fed by NAND gate 237, and the two inputs of gate 237 are fed by the Q output of flip-flop 234 and the $T_{FAST}/2$ output of clock 210. The output of gate 238 is connected to the clock input of flip-flop 234 for triggering the flip-flop, and the flip-flop's JK inputs are connected to a suitable d.c. voltage source representing the 1 state. Flip-flop 234 is wired to respond to the falling edge of a clock pulse as indicated by the bubble at the clock input of the flip-flop. With these circuit connections, flip-flop 234 operates as a counter and will be set to its 1 state, causing its Q output to be high, on the falling or negative going edge of a pulse at its clock input.

As shown in FIG. 11, the $\overline{Q}$ output of flip-flop 234 is connected to one input of gate 241, and the serial output of register 208 is connected through an inverter 246 to the other input of gate 241 to undo the inversion of NOR 242. The Q output of flip flop 234 feeds one input of gate 240. The output of register 204 feeds the other input of gate 240. The outputs of gates 240 and 241 feed the inputs of NOR gate 242, and the output of NOR gate 242 feeds the serial data input of register 208.

With this logic, data is recirculated around register 208 when gate 241 is enabled. The states of gates 240 and 241 will be the complement of each other because one is connected to the Q output of flip-flop 234 and the other is connected to the $\overline{Q}$ output of the flip-flop.

With the foregoing logic it is apparent that up to and including $N_{CLOCK}=XXX11101_2$, the output of gate 236 will be high. During this time, flip-flop 234 is at its 0 state so that its Q output is low as shown in the timing diagram of FIG. 12. The output of gate 237 will therefore be high, allowing the signal from NAND 236 to propagate through NAND gate 238.

With flip-flop 234 in its 0 state, the low on its Q output inhibits gate 240 to block passage of new data to register 208, and the high on its $\overline{Q}$ output enables gate 241. Binary data from the output of register 208 will therefore be recirculated through gates 241 and 242 by pulsing the clock input of the register.

Figure 12:
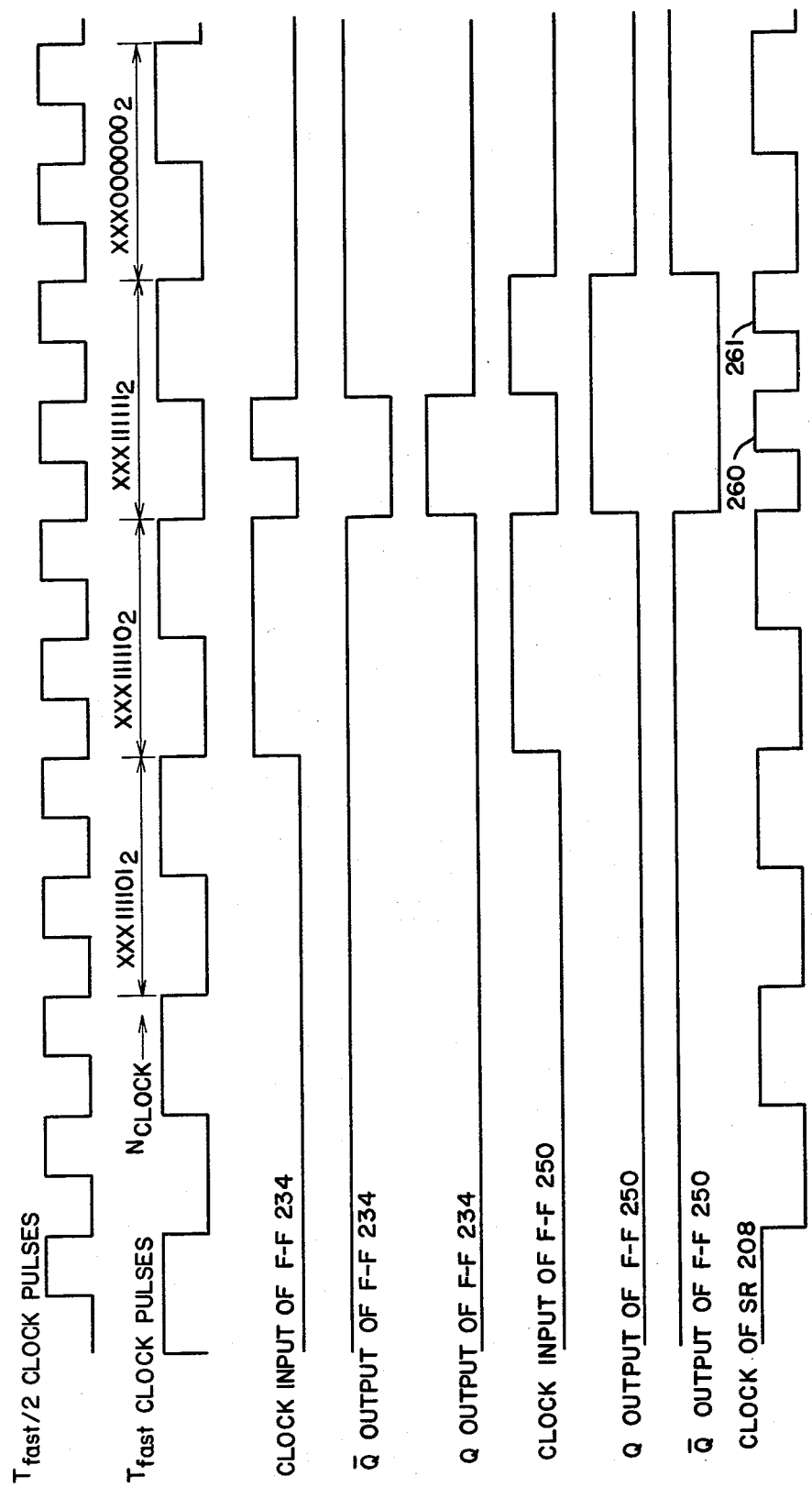
FIGS. 12 and 13 are timing diagrams of various signals associated with the circuits in FIG. 11.

When $N_{clock}$ advances one count to $XXX111110_2$, the output of gate 236 goes low. This causes the output of gate 238 to go high as shown in FIG. 12. However, flip-flop 234, will remain in its 0 state because the transition at its clock input was positive going rather than negative going.

When $N_{clock}$ is advances to $XXX111111_2$, the output of gate 236 again goes high. When this happens, the output of gate 238 goes low, thus setting flip-flop 234 to the 1 state. The Q and $\overline{Q}$ outputs of flip-flop 234 therefore change states to 1 and 0 respectively.

Now gates 240 will be enabled to pass new data from register 204 to register 208, and gates 241 will be inhibited to block recirculation of data around register 208. When the first shift pulse arrives at the clock input of register 208 after flip-flop 234 is set to its 1 state, the new data bit from register 204 will be entered in register 208, and the existing data in register 208 will be shifted right, thus causing the oldest data bit to be dropped or destroyed.

The arrival of the first $T_{FAST}/2$ master clock pulse after flip-flop 234 is set to its 1 state causes the output of gate 238 to go high as shown in FIG. 12. The termination of this $T_{FAST}/2$ clock pulse causes the output of gate 238 to change from the 1 state to the 0 state to change flip-flop 234 to its 0 state. Flip-flop 234 will remain in its 0 state until the next transition of $N_{CLOCK}$ from $XXX111101_2$ to $XXX111110_2$. With flip-flop 234 in its 0 state, gate 241 will be enabled to allow recirculation of data around register 208, and gate 240 will be inhibited to block application of new data to the input of register 208.

As shown in FIG. 11, the jog control circuit 218 includes a JK flip-flop 250, a pair of NAND gates 252 and 253, a pair of AND gates 254 and 255 and a NOR gate 256. Flip-flop 250 is wired to reverse state on each falling clock pulse at its clock input. The J and K inputs of flip-flop 250 are tied to a suitable source of positive d.c. voltage representing the logic 1 state. The Q and $\overline{Q}$ outputs of flip-flop 250 will therefore complement on the falling or negative going edge of each incoming clock pulse at the flip-flop's clock input.

The inputs of gate 252 are connected to the $T_{FAST}$ output of master clock 210 and the Q output of flip-flop 250. The inputs of gate 253 are connected to the output of gate 252 and to the output of gate 236. The inputs of gate 254 are connected to the Q output of flip-flop 250 and the $T_{FAST}/2$ output of master clock 210. The inputs of gate 255 are connected to the Q output of flip-flop 250 and the $T_{FAST}$ output of master clock 210.

When flip-flop 250 is set to its 1 state, making its Q output high and its $\overline{Q}$ output low, gate 254 will be enabled and gate 255 will be disabled. When flip-flop 250 is cleared to its 0 state, making its Q output low and its $\overline{Q}$ output high, gate 255 will be enabled and gate 254 will be disabled.

When gate 255 is enabled, master clock pulses having a period of $T_{FAST}$ are gated to the clock or shift input of register 208 to shift the register contents. When gate 254 is enabled master clock pulses having a period of $T_{FAST}/2$ are gated to the clock input of register 208 to shift the register contents.

Flip-flop 250 will be in its 0 state up to the transition of $N_{CLOCK}$ from $XXX111110_2$ to $XXX111111_2$. As a result, gate 255 will be enabled and gate 254 will be disabled as $N_{CLOCK}$ is advanced from $XXX000000_2$ to $XXX111110_2$. During this time, the $T_{FAST}$ clock pulses will be gated to the clock input of register 208 to shift the register contents. Throughout this interval it will be recalled that gate 241 is enabled and gate 240 is disabled. Thus, throughout this interval, data will be circulated around register 208 at the rate of $1/T_{FAST}$, and supply of fresh data to register 208 will be blocked.

Because of the previously described circuit connections to the inputs of gates 252 and 253, the clock input of flip-flop 250 (i.e., the output of gate 253) will remain low as $N_{CLOCK}$ is advanced from $XXX000000_2$ up to the transition of $N_{CLOCK}$ $XXX111110_2$ as shown in FIG. 12. At this transition the clock input of flip-flop 250 goes high to its 1 state and remains high until the transition of $N_{CLOCK}$ from $XXX111110_2$ to $XXX111111_2$. Then, the clock input of flip-flop 250 goes low, setting flip-flop 250 to its 1 state. When the $T_{FAST}$ clock output rises to its 1 state at $N_{CLOCK} = XXX111111_2$, the clock input of flip-flop 250 again goes high, but this action will not clear flip-flop 250 to its 0 state because the flip-flop will trigger only on the falling edge of a clock input pulse.

Flip-flop 250 therefore remains in its 1 state until the transition of $N_{CLOCK}$ from $XXX111111_2$ to $XXX000000_2$. At this time the clock input of flip-flop 250 goes low to reverse flip-flop 250 to its 0 state. Flip-flop 250 will now remain in its 0 state until the next transition of $N_{CLOCK}$ from $XXX111110_2$ to $XXX111111_2$.

For the interval in which flip-flop 250 is in its 1 state, gate 254 will be enabled and gate 255 will be disabled. During this interval two clock pulses having a period of $T_{FAST}/2$ will therefore be fed to the clock input of register 208 in place of the single $T_{FAST}$ clock pulse. Thus, for the interval in which flip-flop 250 is in its 1 state, the pulse frequency at the clock input of register 208 becomes twice the normal rate.

Since flip-flop 250 is put in its 1 state only for one period of $T_{FAST}$, only two clock pulses at the doubled frequency of $2/T_{FAST}$ will be gated to the clock input of register 208 to shift the register contents. These two $T_{FAST}/2$ clock pulses are indicated at 260 and 261 in FIG. 12.

From the foregoing description it is clear that the transition of $N_{CLOCK}$ from $XXX111110_2$ to $XXX111111_2$ causes both of the flip-flops 234 and 250 to concomitantly be set to their 1 states. At the time the first $T_{FAST}/2$ clock pulse 260 arrives at the clock input of register 208, therefore, gates 240 and 241 will respectively be enabled and disabled. Thus, at $N_{CLOCK} = XXX111111.0_2$ clock pulse 260 will shift the contents of register without recirculation to enter a fresh data bit into register 208 and to drop the oldest data bit which formally occupied the last stage in the register.

Before the occurrence of the second $T_{FAST}/2$ clock pulse 261, flip-flop 234 is reversed to its 0 state, thereby enabling the recirculating loop through gate 241 and blocking passage of new data from register 204 to register 208. Thus, when clock pulse 261 arrives at the clock input of register 208, the contents of the register 208 will shift right, recirculating one binary bit.

From the foregoing description it will be appreciated that each time the partial word represented by the six least significant digits of $N_{CLOCK}$ becomes equal to $2^{i-1}$ (where $i=6$ in the previous numerical example), a new data bit is injected into register 208 followed by the insertion of the extra register-shifting clock pulse 261.

The youngest data bit entered into register 208 by clock pulse 260 will therefore be shifted one stage to the right by clock pulse 261 so that at $N_{CLOCK=XXX000000_2}$, it will occupy the second register stage which is indicated at bin #1 in FIG. 14. The relative age of the youngest data in bin #1 will be $2^n-1$ (511 for $n=9$).

In FIG. 14, the numerical values assigned to the bits in register 204, 208, 220 and 222 are indicative of the relative ages of the bits at $N_{CLOCK}=000000000_2$, with the largest numerical value, $2^n+2^{n-1}-1$ representing the youngest bit, and the smallest numerical value, 0, (not shown), representing the oldest bit. In other words, the numerical values assigned to the bits in the registers in FIG. 14 are in inverse order of the relative ages of the bits. The formula that represents shift register 208 bin location according to data bit $k'$, where $0 \leq k' \leq 2^n - 1$ at $N_{CLOCK}=0$ is $[1+(2^n-1-k')(2^i+1)] \bmod 2^n$.

The second youngest bit in register 208 has a relative age of $2^n-2$ (510 for $n=9$) and occupies the register stage which is designated at bin #[1+($2^i$+1)]. For $i=6$, this will be bin #66. The third youngest bit in register 208 is $2^n-3$ (or 509 for $n=9$) and occupies the register stage indicated at bin #[1+2($2^i$+1)] at $N_{CLOCK}=000000000_2$. For $i=6$, this will be bin #131.

As shown in FIG. 10, flip-flop 206 is clocked by the $T_{FAST}$ master clock pulses to delay the supply of data to gate 66 by one $T_{FAST}$ bit time. This operation prevents the oldest data bit which is dropped from register 208 at the occurrence of pulse 260 from being fed to gate 66. The data bit dropped from register 208 by the application of pulse 260 to the register's clock input will therefore not be presented to correlator 44.

From the relative age designations shown in FIG. 14, the youngest data bit in register 208 (namely, $2^n-1$) is spaced $2^i+1$ bins from the second youngest data bit $2^n-2$ in the register because of the insertion of the extra clock pulse 261. Since $2^n$ has no common factor with $2^i+1$ and since the value of $i$ was selected to be greater than zero, but less than $n$, register 208 will eventually become completely loaded with data bits whose relative ages are not in serial order. Instead, the relative ages of data bits in register 208 will be in a scrambled, predetermined order.

In comparison, the relative ages of data bits in register 22 are in serial order. Accordingly, the difference between ages of the bits in the pairs successively fed to gate 66 will not vary progressively as in the preceding embodiment, but instead will be related to the scrambled order of bits in register 208.

The age difference of channel A and B bits presented to gate 66 is indicative of the variable time delay of the channel A data relative to the channel B at the input of gate 66. In other words, the age difference is indicative of the net variable delay produced by registers 208 and 222. The age difference between channel A and channel B bits at the input of gate 66 is therefore indicative of the location of pipe 26 being scanned. For example, when the age difference is zero the location of pipe 26 being scanned will be midway between geophones 22 and 24 and when the age difference is a maximum, the pipe location being scanned will be the farthest away from the midway location.

Although the age differences of channel A and channel B bits presented to gate 66 are in scrambled order, they bear a predetermined relationship to the values of $N_{CLOCK}$. This factor, as will be explained in detail later, enables the ordered readout of data to establish the location of the leak.

For the scrambled order of bit ages in register 208, the relative ages of data bits fed to gate 66 will recurrently repeat a pattern every $2^i$ counts of $T_{FAST}$ clock pulses if the data channel B is not recirculated but instead is advanced once every $2^i$ counts of $T_{FAST}$, that is, $T_{SLOW}$. However, by employing the recirculating register 222 in channel B and by making register 222 $2^{n-i}$ bits long, the pattern is advantageously repeated every $2^n$ counts of the $T_{FAST}$ clock pulses where $2^n$ is much greater than $2^i$. In this way data bits of $2^n$ relative ages will be compared at correlator 44 in time $2^nT_{FAST}$.

The parallel load circuit 224a synchronously parallel loads register 222 with the contents of register section 230 between the transition of $N_{CLOCK}$ from $111111111_2$ to $000000000_2$ and the transition of $N_{CLOCK}$ from $000000000_2$ to $000000001_2$. Circuit 224 may be of any suitable design for accomplishing the parallel loading function without interrupting circulation of data around register 222. One example of a suitable circuit design is shown in FIG. 11 where circuit 224 comprises a JK flip-flop 270, a pair of NAND gates 272 and 273 and an inverter 274.

Flip-flop 270 has its J and K inputs connected to a suitable course of d.c. voltage representing the 1 state. The Q and Q complement in response to the application of clock pulses at its clock input. Flip-flop 270 is wired to respond to the negative going or falling edge of the clock input as indicated by the bubble at the flip-flop's clock input.

As shown, the inputs of gate 272 are fed by the $T_{FAST}/2$ output of the master clock 210 and by the Q output of flip-flop 270. The output of gate 272 feeds one input of gate 273. The $512T_{FAST}$ output clock 210 is connected by way of inverter 274 to the other input of gate 273. This clock output, it will be recalled, represents the most significant digit in $N_{CLOCK}$.

The output of gate 273 is connected to the clock input of flip-flop 270 for triggering the flip-flop, and the Q output of flip-flop 270 feeds the parallel load control pin of register 222.

Figure 13:
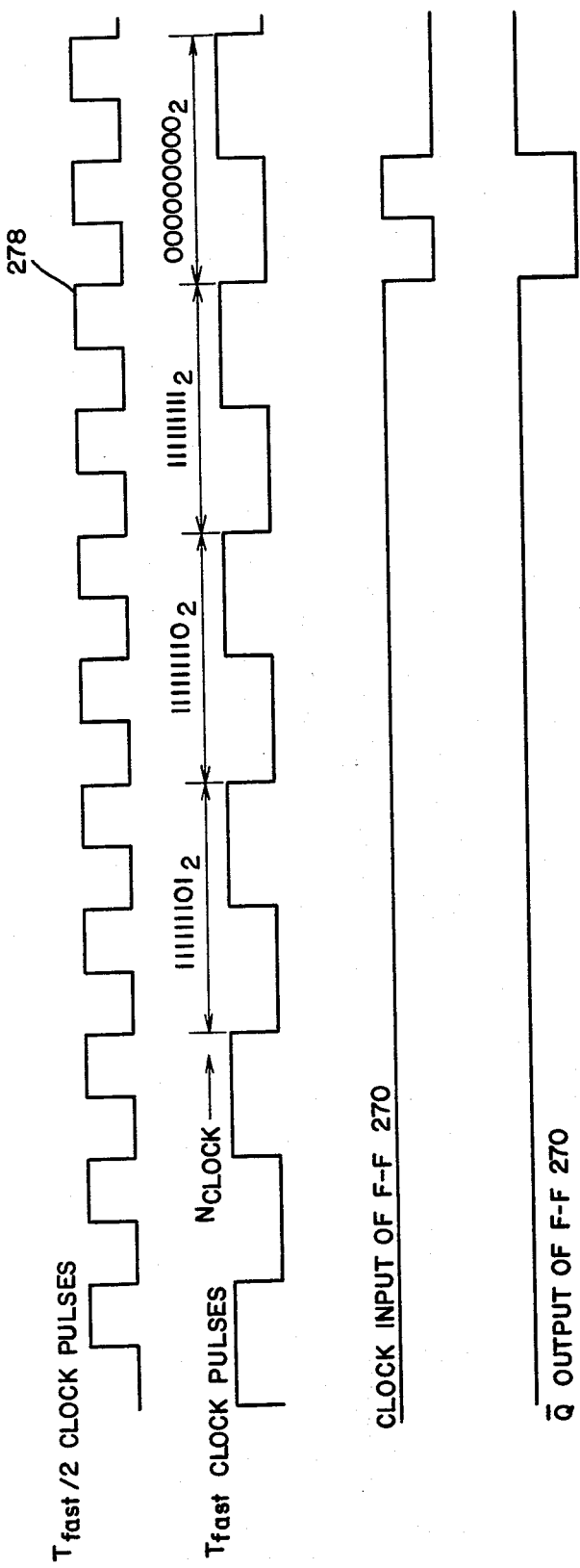

With the foregoing logic it will be appreciated that the output of inverter 274 changes from a logic 0 to a logic 1 only on the transition of $N_{CLOCK}$ from $111111111_2$ to $000000000_2$. Up to this transition flip-flop 270 will be set to its 0 state so that its Q output will be low. The output of gate 272 will therefore be in the 1 state which allows the 512 $T_{FAST}$ signal to propagate through the NAND 273 as shown in FIG. 13. When this happens flip-flop 270 will be set to its 1 state, making $\overline{Q}$ low and its Q output high.

The 0 state on the $\overline{Q}$ output of flip-flop 270 causes the contents of register section 230 to be parallel loaded into register 222, thus replacing the contents that were previously in register 222. The first $T_{FAST}/2$ clock pulse (indicated at 278 in FIG. 13) occurring after flip-flop 270 is set to its 1 state is gated through gates 272 and 273 to the clock input of flip-flop 270. At the falling edge of this clock pulse, flip-flop 270 will be switched to its 0 state. This occurs at the transition of $N_{CLOCK}$ from $000000000.0_2$ to $000000000.1_2$ as shown in FIG. 13.

Changing flip-flop 270 causes its $\overline{Q}$ output to once again go high, thus permitting data to be circulated around register 222 without interruption. Flip-flop 270 will remain in its 0 state until the next transition of $N_{CLOCK}$ from $111111111_2$ to $000000000_2$.

Since registers 208 and 222 and flip-flop 206 are all clocked at the same rate from the same output (namely $T_{FAST}$) of clock 210, the flow of data in channels A and B will be synchronized so that each pair of data bits to be compared at correlator 44 will arrive at the two inputs of gate 66 at the same time. As previously described the output of gate 66 will be high (a logic 1) if the channel A and channel B bits at the gate's inputs are either both high or both low. Conversely, the output of gate 66 will be low (a logic 0) when there is inequality between the two incoming data bits. That is, the output of gate 66 will be low if one of the incoming data bits of a given pair is high and the other data bit of the pair is low.

The output of gate 66 is employed to control the output of a write signal circuit 280 (see FIG. 15) in memory section 228 in a manner to be described in detail later on.

Figure 15:
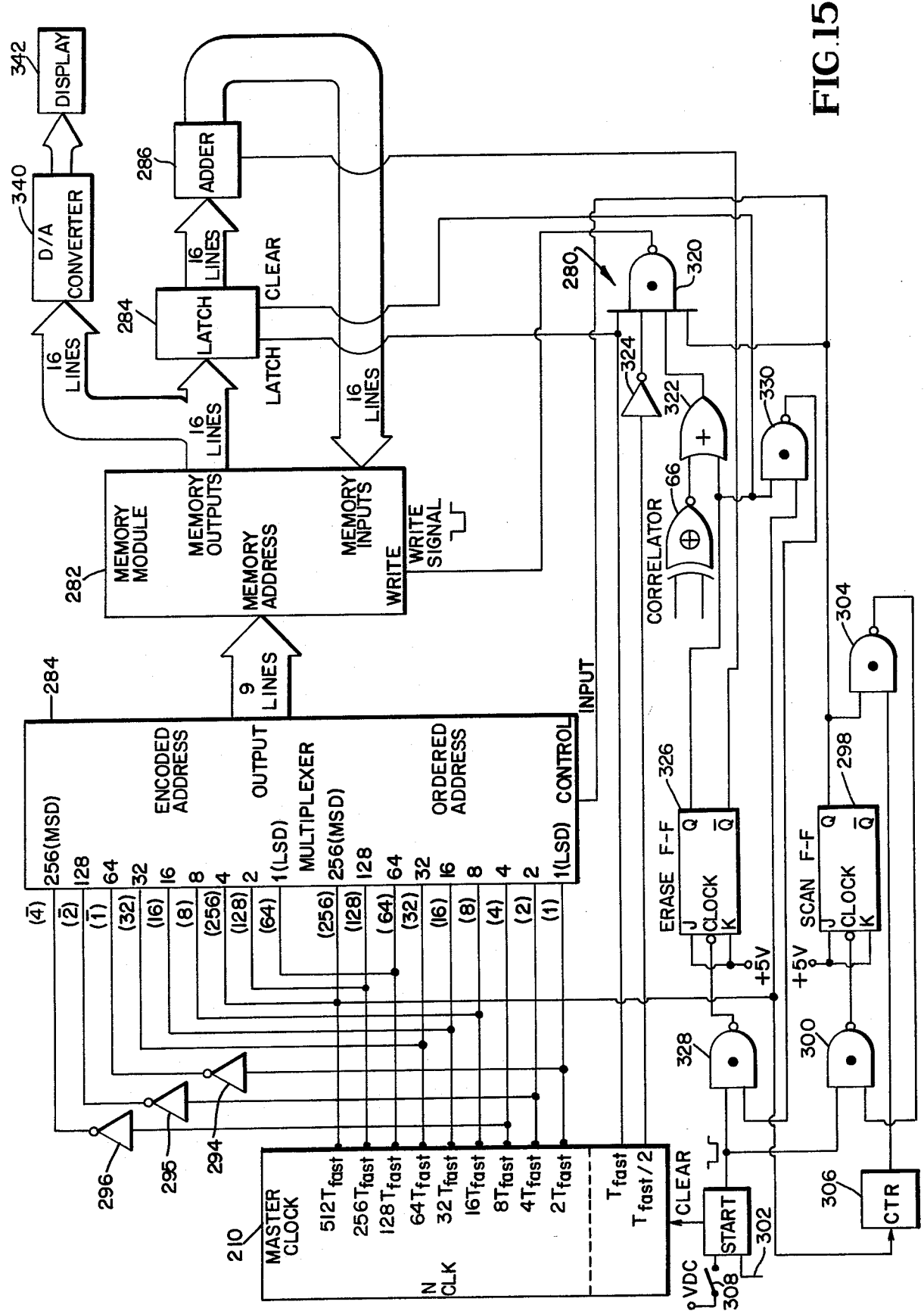
FIG. 15 is a schematic diagram of the memory section shown in FIG. 10.

In addition to the write control signal circuit 280, memory section 228 is shown in FIG. 15 to include a random access memory module 282, a multiplexer 284 for addressing the memory array in module 282 either with ordered memory addresses, or encoded memory addresses, a latch 284 connected to the memory output pins of module 282, and a binary adder 286 connected to the output of latch 284 and feeding the memory input pins of module 282.

Memory module 282 may be any suitable type having a non-destructive read that enables a stored binary word to be read out of memory without being destroyed and, consequently, without requiring the read-out word to be written back into the memory. A RAM (random access memory) semiconductor memory with non-destructive read is suitable for accomplishing the objectives of this invention. It will be understood that, in addition to the memory array (i.e., the memory storage devices), module 282 includes decoders, buffers and drivers that are customarily incorporated into the memory package.

The memory array in module 282 is selected to be large enough to store $2^n$ words or 512 words where 9 is selected as the value of $n$ in accordance with the previous numerical example. The memory word length (i.e., the number of bits in each word) is preferably selected to be large enough to insure accurate location of the leak. For example, a memory module having a word length of 16 bits is satisfactory.

As will be explained in detail shortly, a different preselected location is addressed in memory 282 for each of the 512 different bit time delays produced by register 208 as $N_{CLOCK}$ is advanced through one cycle. $512_{FAST}$ bit time periods constitute one cycle of $N_{CLOCK}$, starting with $N_{CLOCK}=000000000_2$ and ending with $N_{CLOCK}=111111111_2$.

As previously explained, a different predetermined location on the pipe (indicated at 26 in FIG. 1) is scanned for each of the 512 different bit time delays produced by register 208 in channel A. Accordingly, the different preselected address locations in memory 282 in one cycle of $N_{CLOCK}$ correspond to different predetermined locations on pipe 26 or, in other words, different pre-selected distances from one or the other of geophones 22 and 24, such as geohone 24.

The output of correlator 44 is determined for each of the 512 bit time delays, and if it is high, $1_2$ is added by adder 286 to the word at the address corresponding to the bit time delay that produced the correlator output. If the output of correlator 44 is low, there will be no addition to the word at the address corresponding to the bit time delay that produced the low.

After all 512 locations in memory 282 are addressed, the scanning or delay operation is repeated, using the same addresses for the 512 different bit time delays produced by register 208. In this second scanning or delay line operation, the output of correlator 44 is once again determined for each of the 512 different bit time delays, adding a binary 1 at the appropriate addresses only when the correlator output is high.

The foregoing scanning or delay line operation is preferably repeated a large number of times not exceeding the memory's word length. In this embodiment, the number of the repetitive scanning operations is selected to be equal to the memory's word length to utilize the full capacity of memory 282.

After the repetitive scanning operations are complemented the binary words stored in memory 282 are read out in such an order that, upon display in analog form, the indicate the location of the leak.

TABLE I

| $N_{Clock}$ | Rel.AGE($A_{AGE}$) OF DATA AT F/F 206 | Rel.AGE($B_{AGE}$) OF DATA AT OUTPUT OF SR 222 | $A_{AGE}-B_{AGE}$ | ENCODED ADDRESS (DECIMAL) | ENCODED ADDRESS (BINARY) |
|---|---|---|---|---|---|
| 000000000 | 448 | 256 | 192 | 448 | 111000000 |
| 000000001 | 385 | 257 | 128 | 384 | 110000000 |
| 10 | 322 | 258 | 64 | 320 | 101000000 |
| 11 | 259 | 259 | 0 | 256 | 100000000 |
| 100 | 196 | 260 | −64 | 192 | 011000000 |
| 101 | 133 | 261 | −128 | 128 | 010000000 |
| 110 | 70 | 262 | −192 | 64 | 001000000 |
| 111 | 7 | 263 | −256 | 0 | 000000000 |
| 1000 | 456 | 256 | 200 | 456 | 111001000 |
| 1001 | 393 | 257 | 136 | 392 | 110001000 |
| 1010 | 330 | 258 | 72 | 328 | 101001000 |
| 1011 | 267 | 259 | 8 | 264 | 100001000 |
| 1100 | 204 | 260 | −56 | 200 | 011001000 |
| 1101 | 141 | 261 | −120 | 136 | 010001000 |
| 1110 | 78 | 262 | −184 | 72 | 001001000 |
| 1111 | 15 | 263 | −248 | 8 | 000001000 |
| 10000 | 464 | 256 | 208 | 464 | 111010000 |
| 10001 | 401 | 257 | 144 | 400 | 110010000 |
| 10010 | 338 | 258 | 80 | 336 | 101010000 |
| 10011 | 275 | 259 | 16 | 272 | 100010000 |
| 10100 | 212 | 260 | −48 | 208 | 011010000 |
| 10101 | 149 | 261 | −112 | 144 | 010010000 |
| 10110 | 86 | 262 | −176 | 80 | 001010000 |
| 10111 | 23 | 263 | −240 | 16 | 000010000 |
| 11000 | 472 | 256 | 216 | 472 | 111011000 |
| 11001 | 409 | 257 | 152 | 408 | 110011000 |
| 11010 | 346 | 258 | 88 | 344 | 101011000 |
| 11011 | 283 | 259 | 24 | 280 | 100011000 |
| 11100 | 220 | 260 | −40 | 216 | 011011000 |
| 11101 | 157 | 261 | −104 | 152 | 010011000 |
| 11110 | 94 | 262 | −168 | 88 | 001011000 |
| 11111 | 31 | 263 | −232 | 24 | 000011000 |
| 100000 | 480 | 256 | 224 | 480 | 111100000 |
| 100001 | 417 | 257 | 160 | 416 | 110100000 |
| 111100 | 252 | 260 | −8 | 248 | 011111000 |
| 111101 | 189 | 261 | −72 | 184 | 010111000 |
| 111110 | 126 | 262 | −136 | 120 | 001111000 |
| 111111 | 63 | 263 | −200 | 56 | 000111000 |
| 1000000 | 449 | 256 | 193 | 449 | 111000001 |
| 1000001 | 386 | 257 | 129 | 385 | 110000001 |
| 1000010 | 323 | 258 | 65 | 321 | 101000001 |
| 1000011 | 260 | 259 | 1 | 257 | 100000001 |
| 1111100 | 253 | 260 | −7 | 249 | 011111001 |
| 1111101 | 190 | 261 | −71 | 185 | 010111001 |
| 1111110 | 127 | 262 | −135 | 121 | 001111001 |
| 1111111 | 64 | 263 | −19 | 57 | 000111001 |
| 10000000 | 450 | 256 | 194 | 450 | 111000010 |
| 10000001 | 387 | 257 | 130 | 386 | 110000010 |
| 10000010 | 324 | 258 | 66 | 322 | 101000010 |
| 10000011 | 261 | 259 | 2 | 258 | 100000010 |
| 11111100 | 255 | 260 | −5 | 251 | 011111011 |
| 11111101 | 192 | 261 | −69 | 187 | 010111011 |
| 11111110 | 129 | 262 | −133 | 123 | 001111011 |
| 11111111 | 66 | 263 | −197 | 59 | 000111011 |
| 100000000 | 452 | 256 | 196 | 452 | 111000100 |
| 100000001 | 389 | 257 | 132 | 388 | 110000010 |
| 100000010 | 326 | 258 | 68 | 324 | 101000010 |
| 100000011 | 263 | 259 | 4 | 260 | 100000010 |
| 111111100 | 259 | 260 | −1 | 255 | 011111111 |
| 111111101 | 196 | 261 | −65 | 191 | 010111111 |
| 111111110 | 133 | 262 | −129 | 127 | 001111111 |
| 111111111 | 70 | 263 | −195 | 63 | 000111111 |

Before explaining operation of memory section 228 in greater detail, the memory addresses and the manner in which they are obtained will first be considered. In this regard, it will be recalled that there is a different, unique, predetermined value of $N_{CLOCK}$ for each of the 512 different bit time delays produced by register 208. This factor enables $N_{CLOCK}$ to be used as the memory address register by encoding $N_{CLOCK}$. The manner in which $N_{CLOCK}$ is encoded is shown in Table I above.

In the first column of Table I consecutive, binary values of $N_{CLOCK}$ are listed in order of their occurrence. Some of the $N_{CLOCK}$ values have been omitted to shorten the length of the table.

The relative ages of channel A data bits appearing at the output of flip-flop 206 (and hence one input of gate 66) at the values of $N_{CLOCK}$ set forth in the first column of Table I are listed in the second column of the Table. The numbers 0 through $2^n-1$ (i.e., 511 where $n=9$) are used in numerical order to represent the 512 different bit ages, with 0 being assigned the designate the oldest data bit and 511 being assigned to designate the youngest data bit similar to the relative age designations used in FIG. 14. Thus, the relative age of the channel A data bit at $N_{CLOCK}=000000000_2$ is 448, the relative age of the channel A data bit at $N_{CLOCK}=000000001_2$ is 385 and so on.

In a similar fashion the relative ages of channel B data bits appearing at the output of register 222 (and hence at the second input of gate 66) for the listed values of $N_{CLOCK}$, are set forth in the third column of Table I. For this purpose, the numbers $2^{n-1}$ (i.e., 256 for $n=9$) through $2^{n-1}+2^{n-i}-1$ (i.e., 263 for $n=9$ and $i=6$) are used in numerical order to represent the different relative ages of the channel B data bits that are fed to gate 66 in each cycle of $N_{CLOCK}$. Reading this part of the Table it is apparent that the relative age of the channel B data bit at $N_{CLOCK}=000000000_2$ is 256, the relative age of the channel B data bit at $N_{CLOCK}=000000001_2$ is 257 and so on.

From the contents of the Table thus far described it will be appreciated that the relative ages of the channel A and channel B data bits which are applied at the same time to the inputs of gate 66 at $N_{CLOCK}=000000000_2$ will be 448 and 256, respectively. Likewise, the relative ages of the channel A and channel B data bits simultaneously at the inputs of gate 66 at $N_{CLOCK}=000000001$ will be 385 and 257 respectively.

Furthermore, it will be observed that at the beginning of an $N_{CLOCK}$ cycle where $N_{CLOCK}=000000000_2$, the relative age of the channel A data bit will be $(2^i)(2^{n-i}-1)$ or $2^n-2^i$, while the relative age of the channel B data bit will be $2^{n-1}$.

Listed in the fourth column of Table I is the difference between the channel A and channel B data bit ages (namely, the relative age of the channel B data bit subtracted from the channel A data bit) for each value of $N_{CLOCK}$. This difference, as previously mentioned, is a mathematical function of the net variable time delay that is imparted to the data in channel A, where the net variable time delay is the time delay imparted to channel A data by register 208 less the time delay imparted to channel B data by register 222.

The encoded memory address for each value of $N_{CLOCK}$ is obtained by subtracting the given relative age of the channel B data bit from the relative age of the coexisting channel A data bit and by adding $2^{n-1}$ in order to obtain only positive numbers from 0 to $2^n-1$ for convenience in decoding the scrambled relative age. Hence the encoded memory address is a mathematical function of the time delay of channel A data relative to the delay of channel B data and is equal to $A_{age}-\lambda B_{age}+256$. The encoded address for each value of $N_{CLOCK}$ is listed in decimal form in the fifth column of Table I and in binary form in the sixth column of Table I.

At $N_{CLOCK}=111111111_2$, for example, the encoded address is equal to $70-263+256$ which gives $63_{10}$ or $000111111_2$. Taking a second example at $N_{CLOCK}=000000000_2$, the encoded address will be $448-256+256$ which gives $448_{10}$ or $111000000_2$. The encoded addresses for the remaining values of $N_{CLOCK}$ are determined in the same way.

Examination of the first and last columns of Table I reveals a predetermined relationship between the values of $N_{CLOCK}$ and the encoded addresses. This relationship is demonstrated by using positional notations to represent the digit positions in $N_{CLOCK}$ and the encoded binary address number as shown in FIG. 15. In the binary system, it is understood that the least significant digit of a binary number has a positional notation of $2^0$ or 1, the second least significant digit of the binary number has a positional notation of $2^1$ or 2, the third least significant digit of the binary number has a positional notation of $2^2$ or 4, and so on.

From Table I it will be observed that inversions of binary values at the positional notations of 1, 2 and 4 in $N_{CLOCK}$ are respectively identical to the binary values at the positional notations 64, 128 and 256 in the encoded binary address number. Additionally it will be observed that the binary values at the positional notations 64, 128, 256, 8 16 and 32 in $N_{CLOCK}$ are respectively the same as the binary values at the positional notations 1, 2, 4, 8, 16 and 32 in the encoded binary address number.

Based upon the foregoing relaionship between $N_{CLOCK}$ and the encoded binary address number, $N_{CLOCK}$ may be encoded into the encoded binary address by employing three inverters 294, 295, and 296 and by making appropriate connections between the master clock's $N_{CLOCK}$ outputs and one set of input pins of multiplexer 284 in the manner shown in FIG. 15.

Referring to FIG. 15, multiplexer 284 has two sets of input pins, one for receiving the encoded binary address as mentioned above and the other for receiving an ordered binary address which is represented by $N_{CLOCK}$. Multiplexer 284 may be of any suitable type for connecting only one of its two sets of inputs to its output pins when the state of the signal at its control input is one binary value and for connecting only the other set of inputs to its output when the control input is in the other binary state.

In FIG. 15, the input pins making up one of the two sets of the multiplexer's inputs are represented by the positional notations of $N_{CLOCK}$. The inputs making up the other of the two input sets are represented by the positional notations of the encoded binary address.

The nine outputs of $N_{CLOCK}$ are fed in parallel and without change to the nine inputs of one input set of multiplexer 284 to furnish the ordered address for memory 282.

To furnish the encoded address, the following connections are made between $N_{CLOCK}$ and the second set of inputs of multiplexer 284; the $N_{CLOCK}$ outputs having the notational positions 1, 2 and 4 are respectively connected by way of inverters 294, 295 and 296 to the multiplexer inputs of representing the 64, 128 and 265 positional notations in the encoded binary address; and the $N_{CLOCK}$ outputs having the positional notations 64, 128, 256, 8, 16 and 32 are respectively connected directly to the multiplexer inputs representing the 1, 2, 4, 8, 16 and 32 positional notations in the encoded binary address.

When the signal state at the control input of multiplexer 284 is high, the encoded address, and not the ordered address (i.e., $N_{CLOCK}$), is fed to the multiplexer's output for addressing memory 282. When the signal state at the control input of multiplexer 284 is low, the ordered address (i.e., $N_{CLOCK}$), and not the encoded address, is fed to the multiplexer's output to address memory 282.

The encoded address is used during the scanning or time delay operation to store the digital information at the proper locations in memory 282. The ordered address is used in the ensuring read-out operation for reading the information out in the order needed to determine the location of the leak in pipe 26.

As shown in FIG. 15, the control input signal for multiplexer 284 is supplied by the Q output of a JK flip-flop 298. The J and K inputs of flip-flop 298 are connected to a positive d.c. voltage source representing the logic 1 state; thus the flip-flop is wired to complement itself on each falling pulse edge arriving at its clock input.

The clock input of flip-flop 298 is fed by a NAND gate 300. One input of gate 300 is fed by the output of a start circuit 302. The other input of gate 300 is fed by another NAND gate 304. The inputs of gate 304 are respectively connected to the Q output of flip-flop 298 and to an output of a counter 306.

Start circuit 302 may be of any suitable construction which is manually energized by closure of a switch 308 to start operation of the leak detector system. Circuit 302 responds to the closure of switch 308 by supplying a negative going pulse at an appropriate time that automatically puts all of the control or operating signals in synchronism to ensure fault-free operation of the system.

Figure 17:
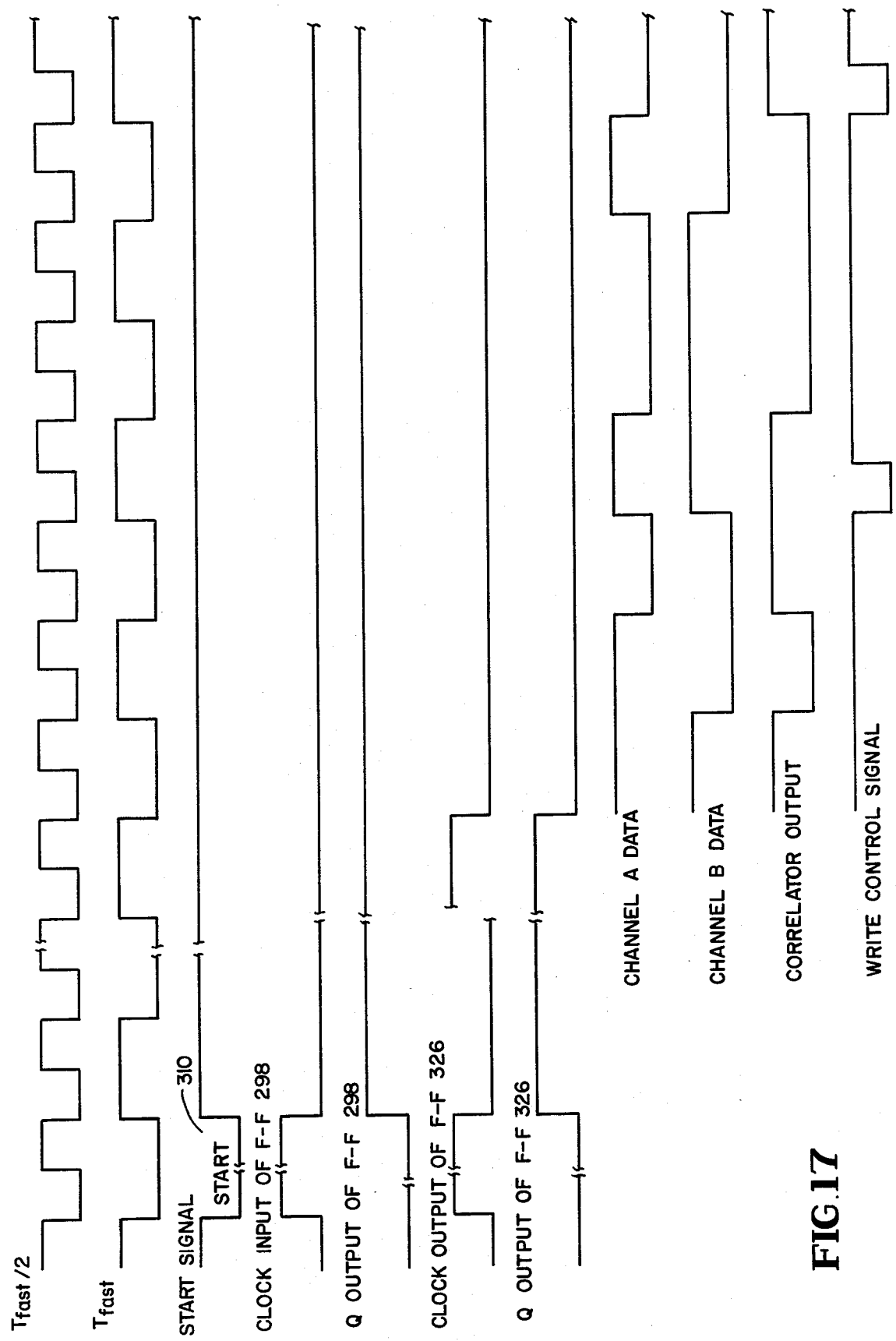
FIG. 17 is a timing diagram of various signals associated with the circuit shown in FIG. 15.

As soon as start circuit 302 is energized its output goes high to the logic 1 state as shown in the timing diagram of FIG. 17. Master clock 210 may be turned on concomitantly with or before start circuit 302 is energized. At the appropriate time after circuit 302 is energized, its output changes from the logic 1 state to a logic 0 and then returns to the logic 1 state to develop a negative going pulse (indicated at 310 in FIG. 17) which clears all counters, including clock 210, in the system.

The rising edge of pulse 310 causes the output of gate 300 to go from a logic 1 state to a logic 0 state, thus setting flip-flop 298 to its 1 state. As a result, the Q output of flip-flop 298 goes high to cause multiplexer 284 to connect the multiplexer's upper set of inputs of the multiplexer's output for feeding the encoded binary addresses to the memory input of memory 282. Thus, as long as flip-flop 298 remains in its 1 state, multiplexer 284 will be conditioned to feed the encoded binary address numbers to memory 282, and not the ordered addresses.

Flip-flop 298 will remain in its 1 state until $N_{CLOCK}$ has made $2^j$ cycles where $j$ is the number of bits in each memory word, here $j=16$. For the previously given numerical example, flip-flop 298 will remain in its 1 state for $2^{16}$ complete cycles of $N_{CLOCK}$. The first cycle is used to clear the memory contents. The $2^{16} - 1$ remaining cycles of $N_{CLOCK}$ make up the scanning operation in which new data is stored in memory. At the completion of the $2^{16}$th cycle of $N_{CLOCK}$, flip-flop 298 will be triggered to its 0 state by operation of counter 206 and NAND gate 304.

For accomplishing the foregoing operation, counter 306 may be a binary counter which is fed from $512T_{FAST}$ of clock to count the $2^j$ number of $N_{CLOCK}$ cycles.

With the foregoing logic it will be appreciated that as soon as flip-flop 298 is set to its 1 state, the output of gate 300 goes from low to high to condition the flip-flop's clock input for triggering at the completion of the $2^{16}$ cycle of $N_{CLOCK}$. Thus, when the output of counter 306 goes low at the completion of the $2^{16}$th cycle of $N_{CLOCK}$, the output of gate 304 will go high. When this happens the output of gate 300 changes from high to low (a logic 1 to a logic 0) to set flip-flop 298 to its 0 state. This marks the end of the scanning operation and, as will be explained in detail presently, automatically initiates the read-out operation in which the data stored in memory 282 is read out to establish the location of leak in pipe 26.

For each cycle of $N_{CLOCK}$ in the scanning operation the encoded addresses will successively be applied to the memory input of memory 282 in the order in which they are listed in the last column of Table I.

In the embodiment shown in FIG. 15, the control circuit 280 for writing information into memory 282 comprises a NAND gate 320, and OR gate 322, an inverter 324, and an erase flip-flop 326 of the JK type. The J and K inputs of flip-flop 326 are connected to a positive d.c. voltage source representing the logic 1 state; thus the flip-flop is wired to complement itself on each falling pulse edge arriving at its clock input.

The clock input of flip-flop 326 is fed by a NAND gate 328. The two inputs of NAND gate 328 are, in turn, fed by the start circuit 302 and by the output of a futher NAND gate 330. The inputs of gate 330 are fed by the Q output of flip-flop 326 and by the $512T_{FAST}$ output of master clock 210. As shown, the inputs of OR gate 322 are fed by the Q output of flip-flop 326 and by the output of gate 66.

NAND gate 320 has four inputs. Three of the gate's inputs are respectively fed by the output of OR gate 322, the Q output of the scan flip-flop 298, and by the $T_{FAST}$ output of master clock 210. The $T_{FAST}/2$ output of clock 210 feeds the fourth input of gate 320 by way of inverter 324.

The output of gate 320 feeds the write input of memory 282. Gate 320 therefore furnishes the write signal to memory 282.

If the output of gate 320 goes low (i.e., a logic 0) the data presented to the input pins of memory 282 will be written the memory at the addressed location in place of the original word stored at that location. On the other hand, if the output of gate 320 remains high, the binary word presented to the input pins of memory 282 will not be written into the memory, and the original word will remain stored in the memory.

In order for the output of gate 320 to go low to write data into the memory, either the output of gate 66 or the Q output of flip-flop 326 must be high (i.e., a logic 1). The output of gate 66 will be high only when the pair of data bits concomitantly presented to the inputs of gate 66 are both high or both low, establishing parity. The erase operation for erasing the contents in memory 282 now will be explained followed by an explanation of the write operation.

For each cycle of $N_{CLOCK}$ in the combined erase and scanning operations the encoded address in the last column of Table I will successively be applied to the address input of memory 282 in the order in which they are listed in Table I. The binary words at these addresses will therefore be non-destructively and successively read out and placed in latch 284 in the order in which they are addressed by the encoded addresses.

Latch 284 is conveniently of the type that allows data to pass right through when unlatched, but latches onto, and thus saves, the last data upon latching. In this embodiment, the latch signal is supplied by the $T_{FAST}$ output of master clock 210. In absence of a clear signal to the latch's clear pin latch 284 will latch onto and retain the binary data presented to its input on the rising edge of each $T_{FAST}$ pulse. Latch 284 will be cleared when the Q output of flip-flop 326 is high.

Adder 286 may be any suitable binary adder capable of adding whatever binary state exists at the $\overline{Q}$ output of the erase flip-flop 326 to the word that is presented from latch 284. If latch 284 is cleared, it presents $0_2$ or zero to adder 286. Thus, when flip-flop 326 is in its 1 state, making its $\overline{Q}$ output a binary 0, and when latch 284 is cleared, $0_2$ will be added to $0_2$ so that the binary value of the word fed back to the input pins of memory 282 will be zero.

Before the start circuit output pulse 310 occurs, flip-flop 326 will be in its 0 state. Then on the rising edge of the start circuit output pulse 310, the output of NAND gate 328 goes from high to low setting flip-flop 326 to its 1 state. As a result, the $\overline{Q}$ output of flip-flop 326 goes low to a logic 0, conditioning the circuitry for the erase operation.

Figure 16:
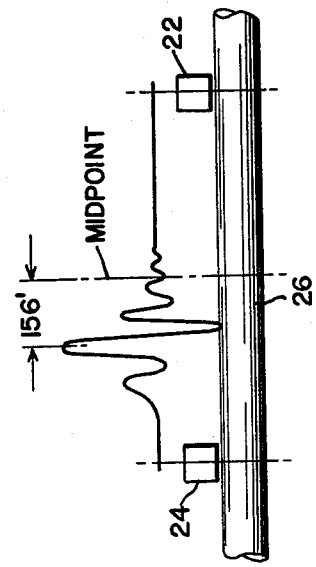
FIG. 16 illustrates an example of the wave form that the apparatus of FIG. 10 generates on an oscilloscope screen.

With flip-flop 326 in its 1 state, its Q output will be high, thus setting the output of OR 322 to a logic 1. Additionally, the rising edge of the start circuit output pulse causes the scan flip-flop 298 to be set to its 1 state at the same time that flip-flop 326 is set to its 1 state. The Q output of flip-flop 298 will therefore be high or a logic 1. Under these conditions the output of NAND gate 320 will change from high to low each time the $T_{FAST}/2$ output goes low and the $T_{FAST}$ output goes high. This occurs on the rising edge of the $T_{FAST}$ output pulse and the simultaneously occurring falling edge of the $T_{FAST}/2$ output pulse. The output of NAND gate 320 then remains in its 0 state for the duration of the time that $T_{FAST}/2$ is low and then goes high to the 1 state on the rising edge of the next $T_{FAST}/2$ output pulse to produce the write signal which, as shown in FIGS. 15 and 16, is in the form of a negative going pulse. It therefore is apparent that one write signal occurs for each state or value of $N_{CLOCK}$ if flip-flop 326 is in its 1 state or if the output of correlator 44 is high.

In addition to setting flip-flops 298 and 326 to their 1 states, the start circuit output pulse also clears the master clock counter stage so that the state of $N_{CLOCK}$ goes to $000000000_2$ to initiate a complete cycle of $N_{CLOCK}$ for the erase operation. As $N_{CLOCK}$ is advanced from $000000000_2$ to and including $111111111_2$, the 512 stored data words in memory 282 will successively be read out in the order of the addresses listed in the last column of Table I.

Thus, at $N_{CLOCK}=000000000_2$, the word at address $111000000_2$ will be read out of memory 282 and fed to latch 284. Latch 284, however, will be cleared by the 1 state on the Q output of flip-flop 326 so that $O_2$ will be presented to adder 286 regardless of the binary value of the word read out of memory.

Since flip-flop 326 is set to its 1 state, the output of adder 286 will also be zero. Thus, when the write signal is produced in the period of $N_{CLOCK}=000000000_2$, a binary zero will be written back into memory 282 at address $111000000_2$ in place of the original word at that location.

When $N_{CLOCK}$ advances to its next state, $000000001_2$, the word at address $110000000_2$ will be read out of memory 282 and fed to latch 284. Flip-flop 326, however, is still in its 1 state sot that binary zeros will be applied to the inputs of adder 286. The binary word fed back to the memory input pins of memory 282 is therefore zero. Thus at the occurrence of the write signal during the period in which $N_{CLOCK}=000000001_2$, the value of the word written into memory at address $110000000_2$ in place of the original word will be zero.

The remaining words will successively be read out of memory 282 in the order of the addresses in the last column of Table I, and on each occasion a binary zero will be written into the memory in the same manner as described above. Thus, when $N_{CLOCK}$ reaches the end of its cycle at $111111111_2$, the entire contents of memory 282 will be erased or dumped in preparation for the scanning operation in which new data is written into memory.

When the state of $N_{CLOCK}$ advances to $10000000_2$ during the erase cycle of $N_{CLOCK}$, the output of gate 330 goes low. As a result, the clock input of flip-flop 326 goes from the 0 state to the 1 state. Now, upon the transition of $N_{CLOCK}$ from $111111111_2$ to $000000000_2$, at the end of the erase operation, the output of gate 330 goes high again. This causes the output of gate 328 to go from high to low, and the falling pulse edge clears flip-flop 326 to its 0 state.

Thus, upon the completion of the single erase cycle of $N_{CLOCK}$, the Q output of flip-flop 326 will go low to the logic 0 state, and the $\overline{Q}$ output of flip-flop 326 will go high to the logic 1 state. The state of the signal at the clear input of latch 284 thus goes low to permit latch 284 to latch in a data word on the rising edge of the next occurring $T_{FAST}$ pulse. Additionally, a binary 1 will be presented to adder 286 for summing with whatever word is latched in latch 284. The circuit is now conditioned for writing new data into memory in a scanning operation which, as is apparent from the foregoing explanation, is automatically initiated upon the completion of the single erase cycle of $N_{CLOCK}$.

During the scanning operation adder 286 will add $1_2$ to each binary word non-destructively read out of memory, but the sum of these binary values will now be written into memory 282 only if the output of the correlator gate 66 is high.

When the output of gate 66 is a logic 1 during any of the $N_{CLOCK}$ states, the output of gate 320 will go low on the rising edge of the $T_{FAST}$ pulse and the coinciding falling edge of the $T_{FAST}/2$ pulse. The output of gate 320 then goes high again on the next occurring positive going $T_{FAST}/2$ pulse edge to produce the write signal for writing into memory 282 whatever binary word adder 286 presents to the memory input.

The state of $N_{CLOCK}$ starts with $000000000_2$ at the beginning of the scanning operation, will advance to $111111111_2$, and then will recycle as long as the scan flip-flop 298 remains in its 1 state. With $N_{CLOCK}=000000000_2$ at the start of each cycle, the binary word stored in memory 282 at address $111000000_2$ will non-destructively be read out and latched in latch 284. As an example, assume that the value of the word read out of memory at this address is $0_{10}$. Adder 286 adds $1_2$ to this binary word, making the value of the binary word fed back to the memory input of memory 282 $1_{10}$. If the output of the correlator gate 66 is high at $N_{CLOCK}=000000000_2$, the write signal occurs, causing $1_{10}$ to be written into memory 282 at address $111000000_2$ in place of the original word.

If instead of being high at $N_{CLOCK}=000000000_2$, the output of the correlator gate 66 is low, adder 286 will still add $1_2$ to the binary word read out of memory at address $111000000_2$. Now, however, a write signal will not be produced at $N_{CLOCK}=000000000_2$ with the result that the original word will remain in memory at address $111000000_2$.

When $N_{CLOCK}$ is advanced to its next state, $000000001_2$, the data word at address $110000000_2$ will be read out and latched in latch 284 in place of the preceding word. Assume, as an example, that the value of the word read out from this location of memory is $3_{10}$. Adder 286 adds the count of $1_2$ to this read-out number so that the value of the word presented to the memory input pins will be $4_{10}$.

If during $N_{CLOCK}=000000001_2$, the output of correlator 44 is high, the write control signal will cause $4_{10}$ to be written into memory 282 at address $110000000_2$ in place of the original word. If, on the other hand, the correlator output is low, the original word, namely $3_{10}$ will remain at address $110000000_2$.

This process is repeated for each state of $N_{CLOCK}$. Adder 286 will add a $1_2$ to each word read out of memory, but the resulting sum is written back into the memory only if the output of correlator 44 is high at the particular time in question.

When $N_{CLOCK}$ reaches the end of its first cycle, it will repeat, starting again with the state $000000000_2$ because at this time flip-flop 298 is still in its 1 state. When $N_{CLOCK}$ completes its $2^{16}$th cycle in the scanning operation, flip-flop 298 will be cleared to its 0 state, thus terminating the scanning operation and initiating the read-out operation. The manner in wich this is accomplished is as follows.

At the middle of the $2^{16}$ cycle of $N_{CLOCK}$ in the scanning operation, the output of counter 306 goes high, causing the output of gate 304 to go low. The output of gate 300 therefore goes high in preparation for clearing flip-flop 298. At the end of the $2^{16}$th cycle, signalling the end of the cycle, the output of counter 306 goes low. As a result, the output of gate 304 goes high, causing the output of gate 300 to change from a high to a low, thus producing the falling pulse edge that sets flip-flop 298 to its 0 state.

With flip-flop 298 in its 0 state, the output of gate 320 can no longer go low, thus preventing the writing of any further data into memory for the remainder of the overall operation. In addition to having this effect, the return of flip-flop 298 to its 0 state causes the control input of multiplexer 284 to go low.

As a result, multiplexer 284 will connect the ordered address at its lower set of input pins (see FIG. 15) to its output in place of the upper set of inputs. Now, the states of $N_{CLOCK}$ (i.e., the ordered addresses) will be applied in numerical order to the address input of memory 282. Thus, the words in memory 282 will be read out to a digital to analog converter 340 (see FIG. 15) in the numerical order of the $N_{CLOCK}$ addresses as listed in the first column of Table I, starting with $N_{CLOCK}=000000000_2$ and going to $111111111_2$.

Accordingly, at the start of the read-out operation, the data word at address $000000000_2$ will first be read out of memory 282 and fed to converter 340. Upon the transition of $N_{CLOCK}$ to $000000001_2$, the data word at address $000000001_2$ will be read out and fed to converter 340. Thus as $N_{CLOCK}$ advances in numerical order from $000000000_2$ to $111111111_2$, the data words at addresses $000000000_2$ to $111111111_2$ will successively be read out in the numerical order of the addresses.

Converter 340 may be any suitable type, such as the one shown in FIG. 1, for converting each read-out binary word into an analog value that is representative of the binary word's value. The analog output of converter 340 is fed to a display 342, such as an oscilloscope or a strip chart reader (such as the one shown in FIG. 1) which displays all of the analog values for the binary words that are read out of memory 282 in a continuous wave form or curve. If display 342 is an oscilloscope, it will be appreciated that the continuous wave form generated from the analog output of converter 340 will be retraced each time $N_{CLOCK}$ is recycled in the read-out operation. Recycling will continue to repeatedly read out the data stored in memory 282 until power is removed from the circuit.

From the foregoing description it is clear that the relative data ages (columns 2 and 3 of Table I) associated with the bits in any given word in memory will be the same. Accordingly, the age difference (column 4 or column 5 of Table I) associated with all the bits in any given words in memory will be identical. This signifies that all of the bits in any given word in memory will be the result of scanning the same location of pipe 26.

A comparison of the fourth and last columns in Table I establishes that the encoded addresses select the locations for storing data in memory 282 in such a way that the age differences (column 4 of Table I) associated with the stored data incremently decreases from a maximum in one direction to zero and then incrementally increase to a maximum in the opposite direction, all in numerical order of the addresses.

Accordingly, the figures in the fifth column of Table I represent the time delay of the channel A relative to channel B bits in each pair of bits that are concomitantly fed to the correlator gate 66. Thus, a zero delay is associated with each bit in the word at address $100000000_2$ to signify that the bits in this data word were obtained by scanning the location of pipe 26 exactly between geophones 22 and 24. As shown in the fifth column of Table I, the total net delays (i.e., fixed plus variable delays) associated with the memory's addresses progressively and numerically increase in the numerical order of the addresses, thus indicating the scanning of pipe 26 incrementally progresses from near geophone 24 to near geophone 22 in the numerical order of the addresses.

The read-out of the stored words in memory 282 in numerical order of the memory's address, as is done in the readout operation by the "ordered addresses", thus provides the display of a continuous curve that initiates from a point at geophone 24 and progresses along pipe 26 to a point at geophone 22. As the variable time delay between channel A and B data is incrementally, but non-progressively, changed by shift register 208 the extent of correlation between the channel A and B data will vary from some minimum value to a maximum. The value of each data word in memory 282 will be a function of and vary with the extent to correlation that is associated variable time delay established between the channel A and B data. Consequently, the stored data word associated with the variable time delay that produces maximum correlation between the channel A and channel B data will have the maximum value.

The maximum analog value at the output of converter 340 and, hence, the high point or region on the curve generated by display 342 will therefore be indicative of the pipe location where the maximum correlation occurs and hence of the location of the leak in a manner similar to the first embodiment.

FIG. 16 shows an example of the display curve or wave form that is generated on the screen of an oscilloscope in response to the outpus of converter 340. The location of the leak is established by reading off the distance from the midpoint between the extremities to the high point on the displayed curve. This distance can be converted into feet or other units of measurement knowing that $d=c(t_{AA}.t_{BB})/2$ (Formula 3).

In both of the embodiments shown in FIGS. 1 and 10, it will be appreciated that the vibration produced by the leak is intercepted at selected spaced apart points along the path of the pipe by microphones or other transducers, that the intercepted vibration at each of these points is converted into a digital signal to provide two digital signals that are miscorrelated to an extent determined by the location of the leak from the two interception points, and that the extent of correlation of the two signals is varied by variably time delaying one of the digital signals relative to the other to determine the leak's location from the occurrence of maximum correlation between the two signals. In the first embodiment, a variable length delay line is used and produces a progressively changing time delay. In the second embodiment variable time delay line is circulating and produces a time delay that changes in a non-progressive manner with respect to the relative age of the digital signal data. In both embodiments the results are the same in that both embodiments accumulate a record of data signal comparisons between the two data signals and then graph or display the comparisons as a function of relative age between the two data signals used to produce the signal comparisons.

In addition to being faster in operation than the first embodiment, the second embodiment also enhances the displayed output wave form because there is less variation due to noise; that is noise in the second embodiment affects all relative correlations the same way.

It will be appreciated that the modification shown in FIG. 7 of the drawings is applicable to the embodiment shown in FIG. 10 as well as the embodiment of FIG. 1.

The term "correlator" as used in the patent claims herein is intended to cover an exclusive NOR gate, an exclusive OR gate, or any other circuit that compares a pair of data bits and produces an output of one binary state when the binary values of the compared data bits are the same and an output of the other binary state when the binary values of the compared data bits are not the same.

It also will be appreciated that time delay, analyzing, memory storage and memory addressing circuitry shown in FIGS. 10 and 15 may be employed for purposes other than locating a leak in a pipeline. This part of the illustrated apparatus may be used for treating any data where it is desirable to variably time delay the data signals in one data channel relative to data in another channel and to store data relating to the signals at memory locations that have a predetermined relationship to the relative data ages. When this part of the circuitry is used for purposes other than locating a fluid leak gate 66 will not necessarily be an exclusive OR or an exclusive NOR gate, but may be any other type of logic gate (such as an AND gate, a NAND gate, an OR gate or a NOR gate) depending upon the particular requirements for a given application.

In the embodiment shown in FIG. 10, it will be appreciated that the time required to replace all old data in shift register 208 with all new data is $512T_{SLOW}$. In other words the time delay between adjacent bits in time is $T_{SLOW}$. Accordingly, it will be appreciated from the previously given formula (3) that $\Delta d = cT_{SLOW}/2$ where $\Delta d$ is the spacing between adjacent scanned locations along the pipe or, more generally, the distance over which the sound propagates in a time period equal to the period of the $T_{SLOW}$ pulse wave form; and $c$ is the speed of sound in the selected medium (e.g., water).

From this formula it is evident that $T_{SLOW}$ sets the resolution of pipe locations scanned by the apparatus of FIG. 10. If $1/T_{SLOW}$ is increased, then it is apparent from the formula that $\Delta d$ becomes smaller, thus increasing the resolution per unit length of pipe. For convenience, an adjustable resolution may be provided as shown in FIG. 18.

Figure 18:
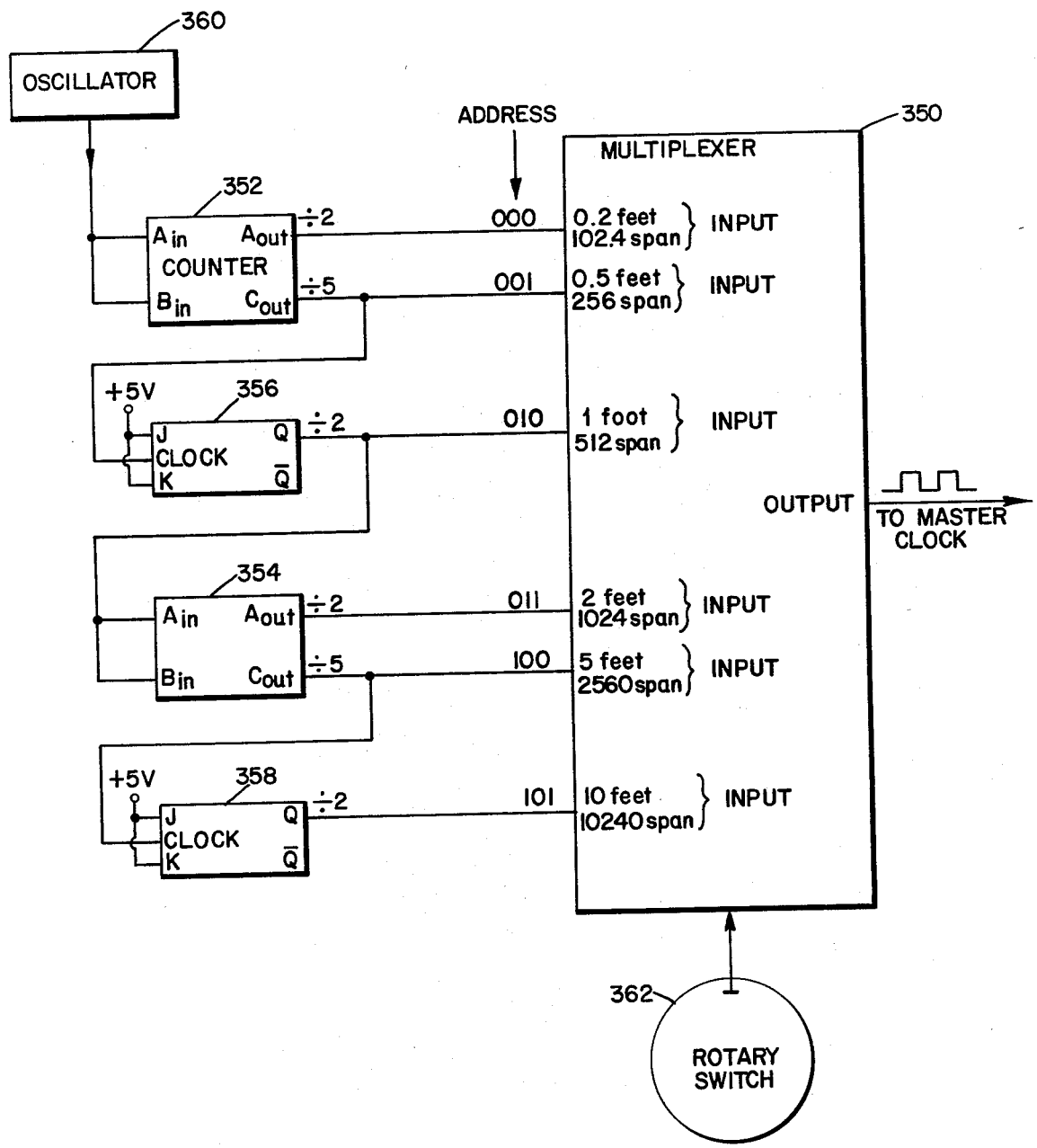
FIG. 18 is a schematic circuit diagram of the circuit for selectively adjusting the scanning resolution of the apparatus shown in FIG. 10.

Referring to FIG. 18, the circuit for adjusting the resolution comprises a multiplexer 350, a pair of tens counters 352 and 354 each having $\div 2$ and $\div 5$ outputs, a pair of JK flip-flops 356 and 358 and a square wave oscillator 360. In this embodiment, multiplexer 350 has six inputs and is operated by a suitable multiple position switch 362 to connect any selected one of the six inputs to the multiplexer's output.

The output of multiplexer 350 feeds the $T_{FAST}/2$ counter stage of master clock 210 which in turn feeds the $T_{FAST}$ counter stage, and so on. As shown, the $\div 2$ output of counter 352 is connected to the first input (000) of multiplexer 350, the $\div 5$ output of counter 352 is connected to the second input (001) of multiplexer 350, the Q output of flip-flop 356 is connected to the third input (010) of multiplexer 350, the $\div 2$ output of counter 354 is connected to the fourth input (011) of multiplexer 350, the $\div 5$ output of counter 354 is connected to the fifth input (100) multiplexer 352, and the Q output of flip-flop 358 is connected to the sixth input (101) of multiplexer 350.

Counters 352 and 354 may be of the 7490 type. As shown, oscillator 360 feeds the A and B inputs of counter 352, and the $\div 5$ output of counter 352 is used to feed the clock input of flip-flop 356. The Q output of flip-flop 356 is used to feed the A and B inputs of counter 354, and the $\div 5$ output of counter 354 feeds the clock input of flip-flop 358. The J and K inputs of each of the flip-flops 356 and 358 are connected to a positive d.c. voltage source representing the logic 1 state, and each flip-flop is wired to complement on each falling pulse edge at its clock input.

With these circuit connections it is apparent that the frequency of the pulse wave form at the multiplexer's input 000 is the oscillator frequency divided by two, that the frequency of the pulse wave form at the multiplexer's input 001 is the oscillator frequency divided by five, that the frequency of the pulse wave form at the multiplexer's input 010 is the oscillator frequency divided by 10 and so on. Hence, the periods of pulse wave forms at the inputs to multiplexers 350 increase in numerical order of the addresses shown for the multiplexer's six inputs. Operation of switch 362 selects any one of these pulse wave forms.

The periods of the pulse wave forms at the master clock's outputs $T_{FAST}/2$ through $512T_{FAST}$ will be determined by the period of the selected pulse wave form that is fed from one of the inputs of multiplexer 350 to the multiplexer's output. In this fashion the scanning resolution is adjustable to any selected one of six different values that are respectively determined by the frequencies of the pulse wave forms at the six inputs of multiplexer 350. The resolution for a given pipe span is shown in each of the multiplexer's six inputs in FIG. 18.

The invention may be embodied in other specific forms without departing from the spirit or essential characteristics thereof. The present embodiments are therefore to be considered in all respects as illustrative and not restrictive, the scope of the invention being indicated by the appended claims rathern than by the foregoing description, and all changes which come within the meaning and range of equivalency of the claims are therefore intended to be embraced therein.

What is claimed and desired to be secured by Letters Patent is:

1. In an apparatus for locating a fluid leak in an underground or unexposed pipe or conduit, first means effective upon receipt of a vibration caused by the leak for producing an electrical signal corresponding in phase and frequency to the received vibration, second means effective upon receipt of the vibration for producing a further electrical signal corresponding in phase and frequency to the received vibration, electrical time delay circuit means electrically connected to said first means for variably time delaying one of said electrical signals relative to the other to cause maximum mutual time correlation between the two signals, and means providing an indication of the time correlation between the time delayed one of said signals and the other of said electrical signals.

2. The apparatus defined in claim 1 wherein said electrical time delay circuit means comprises a recirculating time delay line.

3. The apparatus defined in claim 1 wherein said electrical time delay circuit means comprises a variable length, non-recirculating time delay line.

4. In an apparatus for locating a fluid leak in an underground or unexposed pipe, first means for intercepting a vibration produced by the leak at two spaced apart points and for converting the vibration intercepted at each of said points into an electrical signal to provide two electrical signals that are miscorrelated in time to an extent determined by the location of the leak from said points, an electrical circuit electrically connected to said first means and including time delay means for varying the extend of time correlation between at least samples of said two signals to cause maximum time correlation therebetween and means providing an indication of the variation of the extent of time correlation between the samples to enable the leak's location to be determined from the occurrence of the maximum time correlation.

5. The apparatus defined in claim 4 wherein said first means comprises a pair of stationarily positioned microphones adapted to be located one at each of said interception points to intercept said vibration.

6. The apparatus defined in claim 4 wherein said interception points are selectively located along the path of said pipe, and wherein said first means comprises a pair of microphones adapted to be located one at each of said interception points.

7. The apparatus defined in claim 4 wherein said time delay means comprises a time delay line for variably time delaying at least samples of one said signals relative to the other.

8. The apparatus defined in claim 4 wherein said time delay means comprises a recirculating time delay line for variably time delaying at least samples of one of said signals relative to the other.

9. The apparatus defined in claim 4 wherein said signals are digital signals and wherein said time delay means comprises a recirculating time delay line for variably time delaying samples of one of said signals relative to samples of the other of said signals, means for periodically entering samples of said one of said signals into said delay line at a first predetermined rate, and means for recirculating the samples in said delay line at a rate that is faster than said first predetermined rate.

10. The apparatus defined in claim 4 wherein said signals are digital signals, and wherein said time delay means comprises a first circulating shift register for variably time delaying samples of one of said signals relative to the other, means for periodically entering samples of said one of said signals into said first register at a first predetermined rate, means for circulating the contents in said first register at a second predetermined rate that is faster than said first predetermined rate, and a second circulating shift register for delaying samples of the other of said signals, said second shift register being clocked to circulate the samples of said other of said signals at said first predetermined rate, and said second register having a bit length that is shorter than that of said first register.

11. The apparatus defined in claim 4 wherein said time delay means comprises a variable length delay line for variably delaying at least samples of one of said signals relative to the other, and means for progressively varying the length of said delay line to cause the variation in the extent of correlation between the signals.

12. The apparatus defined in claim 11 wherein said electrical circuit comprises a further delay line of fixed, pre-selected length for delaying at least samples of the other of said signals.

13. In an apparatus for locating a fluid leak in an underground or unexposed pipe, first means for intercepting a sound wave produced by the leak at two separate points spaced apart along the path of the pipe and for producing two electrical signals having a phase difference which is related to the difference in time required for the wave to propagate to the interception points, said first means having a pair of microphones adapted to be positioned one at each of said interception points to intercept said sound wave, an electrical circuit connected to said first means and including time delay means for progressively phase shifting at least one of said signals to cause at least momentarily maximum mutual phase correlation between the two signals, means providing an indication which is a function of the degree of mutual phase correlation between the phase shifted signal and the other of said signals as said one of said signals is progressively phase shifted to indicate the occurrence of maximum mutual phase correlation between the two signals, and means providing a measurement which is a function of the distance of the leak from a known predetermined point at the time maximum mutual phase correlation occurs when the leak is located between the two microphones or at either one of the microphones.

14. The apparatus defined in claim 13 wherein said electrical circuit further includes selectively adjustable delay means for delaying the other of said signals by a fixed selected amount.

15. In an apparatus for locating fluid leak in an underground or unexposed pipe, first and second transducers adapted to be positioned at spaced apart regions along the path of the pipe to intercept a vibration produced by the leak and propagating along the pipe, each of said transducers being effective to convert the intercepted vibration into an electric wave, a circuit for modifying the electric waves produced by said transducers into first and second pulse signals having a phase difference which is related to the location of the leak from said transducers, means in said circuit for progressively phase shifting one of said pulse signals relative to the other pulse signal to cause at least momentarily maximum mutual phase correlation between said first and second pulse signals, means electrically connected to said circuit for producing a further pulse signal which is a measure of the degree of mutual phase correlation between the phase shifted pulse signal and other pulse signal, and means controlled by said further pulse signal for providing an indication which is a function of the degree of mutual phase correlation between the phase shifted pulse signal and said other pulse signal to indicate the occurrence of maximum mutual phase correlation between the phase shifted pulse signal and the other pulse signal.

16. The apparatus defined in claim 15 comprising means providing a distance measurement which is a function of the location of the leak from a known predetermined point at the time maximum mutual phase correlation occurs between the phase shifted pulse signal and the other of said first and second pulse signals.

17. In an apparatus for locating a fluid leak in an underground or unexposed pipe, first means for intercepting a vibration produced by the leak at two spaced apart points and for converting the intercepted vibration into first and second electrical signals having a phase difference which is function of the difference in time required for the vibration to propagate to said points, selectively operable switching means electrically connected to said first means, a variable time delay line electrically connected to said switching means, a phase correlation measuring means electrically connected to said time delay line and to said switching means, said switching means having a first switching position in which it feeds said first signal to said time delay line and in which it bypasses said second signal around said time delay line and feeds the second signal to said measuring means, said switching means having a second switching position in which it feeds said second signal to said time delay line and in which it bypasses said first signal around said delay line and feeds the first signal to said measuring means, means for varying the delay of said delay line to delay the signal fed to the delay line by said switching means, and said measuring means being effective to produce a further signal which is a function of the extent of phase correlation between the delayed signal from said delay line and the other signal which is bypassed around said delay line by said switching means.

18. In an apparatus for locating a fluid leak in an underground or unexposed pipe, first and second circuits each having (a) a microphone for intercepting the vibration produced by the leak to produce an a.c. signal, and (b) a polarity detector for detecting each alternation of one preselected polarity of said signal to produce a pulse wave form, at least one of said first and second circuits having a time delay line for delaying the pulse wave form developed by the polarity detector in one of said circuits relative to the pulse wave form developed by the polarity detector in the other of said first and second circuits, means for varying the delay of said delay line over a pre-selected range, and phase correlation measuring means electrically connected to said first and second circuits for producing a signal which is a function of the phase difference between the pulse wave form which is delayed by said delay line and the pulse wave form developed in said other of said first and second circuits.

19. In an apparatus for locating a fluid leak in an underground or unexposed pipe, means for intercepting a vibration produced by the leak at two selected points that are spaced apart along the path of said pipe and for converting the vibration intercepted at each of said points into an electrical digital signal to provide two signals that are miscorrelated to an extent determined by the location of the leak from said points, means variably time delaying one of the signals relative to the other of said signals for varying the extent of correlation between said signals to achieve maximum correlation between the signals, and means for displaying the variations of the extent of correlations between the time delayed signal and the other of said signals to enable the location of the leak to be determined from the place at which the maximum correlation occurs.

20. The apparatus defined in claim 19 wherein said means for time delaying said one of said signals comprises a recirculating delay line.

21. The apparatus defined in claim 19 wherein said means for time delaying said one of said signals comprises a variable length time delay line and means for incrementally and progressively varying the length of said delay line.

22. In an apparatus for locating a fluid leak in an underground or unexposed pipe, means for intercepting a vibration produced by said leak at two selected points that are spaced apart along the path of said pipe and for converting the vibration intercepted at each of said points into a digital signal to provide two digital signals that are related in phase to the location of the leak from said points, a circulating time delay line for time delaying samples of one of said signals relative to the other, a correlator for comparing the time delayed samples of said one of said signals with at least samples of the other of said signals, and means responsive to the output of said correlator for enabling the location of said leak to be established.

23. The apparatus defined in claim 22 wherein said time delay line comprises a circulating shift register, and means for periodically entering samples of said one of said signals into said shift register at a rate that is slower than the rate at which the samples are recirculated by said shift register.

24. The apparatus defined in claim 22 wherein said signal samples are in the form of binary bits and wherein said correlator comprises a logic gate that produces a binary output of one logic state when the compared signal samples have the same logic state and a binary output of the other logic state when the logic states of the compared signal samples are not the same.

25. The apparatus defined in claim 24 wherein said delay line non-progressively variably delays samples of said one of said signals in a scrambled, but predetermined order, and wherein said means responsive to the output of said correlator comprises a memory having a multiplicity of addresses for storing binary data, means for addressing said memory for storing data determined by the output of said logic gate at addresses in the memory that are determined by the time delays of the samples of said first signal relative to the samples of said second signal, and means for reading the data out of said memory in a predetermined order that is different from the order in which the data is written into the memory.

26. In an apparatus for locating a fluid leak in an underground or unexposed pipe, means for intercepting a vibration produced by the leak at two selected points that are spaced apart along the path of said pipe and for converting the vibration intercepted at said points into two digital signals that are related to the location of the leak from said interception points, means for variably time delaying one of said signals relative to the other to vary the extent of correlation between the two signals, and means for indicating the varied extent of correlation to provide an indication of the location of the leak.

27. The apparatus defined in claim 26 wherein said means for variably time delaying said one of said signals comprises a circulating time delay line and means for circulating samples of said one signal through said delay line at a rate that is faster than the rate at which samples of said one signal are entered into said delay line.

28. An apparatus for locating a fluid leak in an underground or unexposed pipe comprising means for intercepting a vibration produced by the leak at two selected points that are spaced apart along the path of the pipe and for converting the vibration intercepted at said points into two digital signals that are related in phase to the location of the leak from said points, and means for scanning at least a portion of said pipe between said points for the location of said leak by variably time delaying samples of one of said signals relative to samples of the other of said signals.

29. The apparatus defined in claim 28 wherein said scanning means scans spaced apart locations of said pipe portion for said leak, and wherein means are provided for selectively adjusting the scanning resolution of said scanning means.

30. A method of locating a fluid leak in an underground or unexposed pipe comprising the steps of intercepting the vibration produced by the leak at two spaced apart points and converting the vibration intercepted at each of said points into an electrical signal to provide two electrical signals that are miscorrelated in time to an extent determined by the location of the leak from said points, electrically processing at least one of said signals by varying the extent of time correlation between the two signals to cause maximum time correlation between the signals, and determining the location of the leak from the occurrence of said maximum correlation.

31. A method of locating a fluid leak in an underground or unexposed pipe comprising the steps of intercepting the vibration produced by the leak at two selected points spaced apart along the path of the pipe and converting the vibration intercepted at each of said points into an electrical signal to provide two electrical signals that are miscorrelated in time to an extent determined by the location of the leak from said points, electrically processing at least one of said two signals by variably time delaying one of said signals relative to the other without changing the selected points at which the vibration is intercepted to vary the extent of time correlation between the signals, and determining the location of the leak from the variation of the extent of time correlation between the signals.

32. The method defined in claim 31 comprising the step of locating said interception points on opposite sides of the suspected site of the leak.

33. The method defined in claim 32 comprising the step of time delaying the other of said signals by a fixed selected amount during the course of variably time delaying said one of said signals.

34. The method defined in claim 33 comprising the step of time delaying the other of said signals during the course of variably delaying by a fixed time equal to the time required for said vibration to propagate the length of the pipe between the two interception points.

35. The method defined in claim 32 comprising the step of imparting no delay to the other of said signals.

36. In an apparatus for locating a fluid leak in an underground or unexposed pipe, first means including a pair of transducers for intercepting a vibration produced by the leak at two selected points that are spaced apart along the path of said pipe and for converting the vibration intercepted at each of said points into a digital signal to provide two digital signals that are miscorrelated to an extent determined by the location of the leak from said points, a recirculating time delay line, means for electrically connecting said delay line to a part of said first means and for entering digital bits of one of said signals into said delay line at a first predetermined rate, means for circulating the digital bits entered into said delay line at a second predetermined rate to variably time delay the bits of said one of said signals relative to digital bits of the other of said signals and to thereby vary the extent of correlation between the bits of said one of said signals and the bits of the other of said signals to achieve maximum correlation between the bits of said one of said signals and the bits of the other of said signals, said second predetermined rate being faster than said first predetermined rate, and means providing a read-out of the variations of the extent of correlation between the bits of said one of said signals and the bits of said other of said signals to enable the location of the leak to be determined from the occurrence of the maximum correlation between the bits of said one of said signals and the bits of the other of said signals.

37. In an apparatus for locating a fluid leak in an underground or unexposed pipe, first means including a pair of transducers for intercepting a vibration produced by the leak at two selected points that are spaced apart along the path of said pipe and for converting the vibration intercepted at each of said points into a digital signal to provide two digital signals that are miscorrelated to an extent determined by the location of the leak from said points, a recirculating shift register having a pre-selected bit length, means electrically connecting said shift register to a part of said first means for entering digital bits of one of said signals into said shift register every time the shift register completes a pre-selected number of shifts, where said pre-selected number of shifts and said pre-selected bit length of said shift register have no common factors to enable said shift register to be filled up with digital signal bits of different relative ages, means for circulating the bits entered to said shift register at a predetermined rate to variably time delay the bits of said one of said signals relative to digital bits of the other of said signals and to thereby vary the extent of correlation between the bits of said one of said signals and the bits of the other of said signals to achieve maximum correlation between the bits of said one of said signals and the bits of the other of said signals, said predetermined rate being faster than the rate at which bits of said one of said signals is entered into said shift register, and means providing a read-out of the variations of the extent of correlation between the bits of said one of said signals and the bits of said other of said signals to enable the location of the leak to be determined from the occurrence of the maximum correlation between the bits of said one of said signals and the bits of the other of said signals.

38. In an apparatus for locating a fluid leak in an underground or unexposed pipe, first and second circuits each having (a) a microphone for intercepting the vibration produced by the leak to produce a first a.c. signal, (b) an envelope detector responsive to said first a.c. signal for developing a further a.c. signal which follows the envelope of said first a.c. signal and (c) a polarity detector for detecting each alternation of one pre-selected polarity of said further signal to produce a pulse wave form, at least one of said first and second circuits having a time delay line for variably time delaying the pulse wave form developed by the polarity detector in one of said circuits relative to the pulse wave form developed by the polarity detector in the other of said first and second circuits to vary the extent of correlation between the pulse wave forms and means for indicating the variation of the extent of correlation between the pulse wave forms to enable the location of the leak to be determined from the occurrence of maximum correlation between the two pulse wave forms.

39. A data analyzing and storage apparatus comprising a logic gate having an output and a plurality of inputs, means providing a first data channel for feeding binary data bits in order of their relative ages to a first input of said gate, means providing a second data channel for supplying binary data bits to a second input of said gate, means including a circulating delay line in said second channel for variably time delaying the data bits in second channel relative to the data bits fed through said first channel to scramble the relative ages of the data bits that are fed from said second channel to said second input of said gate, the binary state of the output of said gate being determined by the states of the binary bits fed to said first and second inputs, a memory having a multiplicity of addressable locations for storing binary data, and means for addressing said locations in a first predetermined order for writing in binary data that is determined by the output of said logic gate and further for addressing said locations in said second predetermined order for reading out the stored data, said second predetermined order being different from said first predetermined order and providing for a read-out of the stored data in an order than has pre-selected relationship to the age differences between the binary bits fed to the inputs of said gate.

40. The data analyzing and storage apparatus defined in claim 39 wherein said logic gate is a correlator.

41. An apparatus for locating a fluid leak in an underground or unexposed pipe or conduit, said apparatus comprising first means effective upon receipt of a vibration caused by the leak for producing an electrical digital signal corresponding in phase and frequency to the received vibration, second means effective upon receipt of the vibration for producing a further electrical digital signal corresponding in phase and frequency to the received vibration, electrical circuit means for variably time delaying one of said electrical signals relative to the other to cause maximum mutual correlation between the two signals, and means providing an indication of the correlation between the time delayed signal and the other signal, said electrical circuit means comprising a recirculating time delay line.

42. An apparatus for locating a fluid leak in an underground or unexposed pipe or conduit, said apparatus comprising first means effective upon receipt of a vibration caused by the leak and producing an electrical digital signal corresponding in phase and frequency to the received vibration, second means effective upon receipt of the vibration for producing a further electrical digital signal corresponding in phase and frequency to the received vibration, electrical circuit means for variably time delaying one of said electrical signals relative to the other to cause maximum mutual correlation between the two signals, and means providing an indication of the correlation between the time delayed signal and the other signal, said electrical circuit means comprising a variable length, nonrecirculating time delay line.

43. An apparatus for locating a fluid leak in an underground or unexposed pipe comprising first and second electrical circuits each having (a) a microphone for intercepting the vibration produced by the leak and (b) means connected to the microphone for producing an electrical digital signal related in phase and frequency to the vibration received by the microphone, said microphones being adapted to be located at two spaced apart points on opposite sides of the leak to cause said signals to be miscorrelated in time to an extent determined by the location of the leak between said points, at least one of said first and second circuits having a time delay line for variably time delaying one of said digital signals relative to the other to cause maximum mutual time correlation between the two signals, and means electrically connected to said first and second circuits and providing an indication of the extent of time correlation between said signals to enable the leak's location to be determined from the occurrence of the maximum mutual time correlation between the two signals.

* * * * *

UNITED STATES PATENT AND TRADEMARK OFFICE
CERTIFICATE OF CORRECTION

PATENT NO. : 4,083,229
DATED : April 11, 1978
INVENTOR(S) : Allen R. Anway

It is certified that error appears in the above-identified patent and that said Letters Patent are hereby corrected as shown below:

Column 6, line 25, change "42" to --52--.

Column 6, line 54, change "52s" to --52a--.

Column 8, line 56, after "logic 1," insert a --closed parenthesis--.

Column 14, line 55, after "pipe" insert a --period--.

Column 18, line 58, change "In" (first occurence) to --If--.

Column 21, line 44 after "256" insert --x--.

Column 22, line 7, change "$slow$" to --$SLOW$--.

Column 22, line 68, after "the" insert --three--.

Column 23, line 21, insert a hyphen between --flip flop--.

Column 24, line 24, insert a line over the --Q--.

Column 25, line 41, change "$CLOCK=xxx$" to --$\overline{CLOCK}=xxx$--.

Column 25, line 48, change "$2^m+2^{n-1}$" to --$2^n+2^{n-i}$--.

UNITED STATES PATENT AND TRADEMARK OFFICE
CERTIFICATE OF CORRECTION

PATENT NO. : 4,083,229
DATED : April 11, 1978
INVENTOR(S) : Allen R. Anway

It is certified that error appears in the above-identified patent and that said Letters Patent are hereby corrected as shown below:

Column 26, line 15, change "22" to --222--.

Column 28, line 28, after "512" insert --T--.

Column 28, line 41, change "geohone" second instant to --geophone--.

Column 28, line 66, change "mented" to --ted--.

Column 33, line 19, change "of" to --to--.

Signed and Sealed this

Twenty-sixth Day of September 1978

[SEAL]

Attest:

RUTH C. MASON
Attesting Officer

DONALD W. BANNER
Commissioner of Patents and Trademarks

REEXAMINATION CERTIFICATE (49th)

United States Patent [19]
Anway

[11] B1 4,083,229
[45] Certificate Issued Feb. 1, 1983

[54] METHOD AND APPARATUS FOR DETECTING AND LOCATING FLUID LEAKS

[75] Inventor: Allen R. Anway, Superior, Wis.

[73] Assignee: Plaunt & Anderson Company, Inc., Duluth, Minn.

Reexamination Request
No. 90/000,118, Dec. 2, 1981

Reexamination Certificate for:
Patent No.: 4,083,229
Issued: Apr. 11, 1978
Appl. No.: 727,359
Filed: Sep. 28, 1976

Certificate of Correction issued Sep. 26, 1978.

Related U.S. Application Data

[63] Continuation-in-part of Ser. No. 650,842, Jan. 20, 1976, abandoned.

[51] Int. Cl.$^3$ ............................................. G01M 3/00
[52] U.S. Cl. ................................... 73/40.5 A; 73/592
[58] Field of Search ............ 73/40.5 A, 40.5 R, 71.2, 73/59.2

[56] References Cited

U.S. PATENT DOCUMENTS

| | | | |
|---|---|---|---|
| 3,441,745 | 4/1969 | Reeves et al. ............... | 307/87 |
| 3,446,949 | 5/1969 | Trimble ....................... | 235/152 |
| 3,506,813 | 4/1970 | Trimble ....................... | 235/152 |
| 3,720,789 | 3/1973 | Clark ........................... | 179/15 BC |
| 3,903,729 | 9/1975 | Covington .................... | 73/40.5 R |

OTHER PUBLICATIONS

Hewlett-Packard Journal, vol. 21, No. 3 (pp. 1–20) Nov. 1969.

Hewlett-Packard Service Manual, vol. 1 and 2, 3721A Correlator.

Hewlett-Packard Operating Manual, 3721A Correlator.

The Institution of Water Engineers "Symposium on Waste Control: Its Importance in the Planning and Management of Water Supply Systems" (pp. 136–138) 1974.

*Primary Examiner*—Donald O. Woodiel

[57] ABSTRACT

An apparatus and method for detecting and locating a fluid leak in an underground pipe or the like in which the vibration produced by the leak is intercepted at selected spaced apart points by microphones or other transducers, in which the vibration intercepted at each of the two points is converted into an electrical signal, and in which the extent of correlation of the two resulting signals is varied by variably time delaying one signal relative to the other to determine the leak's location from the occurrence of maximum correlation between the signals. In one embodiment, the variable time delay of one signal relative to the other is accomplished by a variable length time delay line and a means for progressively varying the length of the delay line. In another embodiment the variable time delay is accomplished by a recirculating delay line analyzer that does more data age comparisons with the same delays in the same time than the variable length delay line.

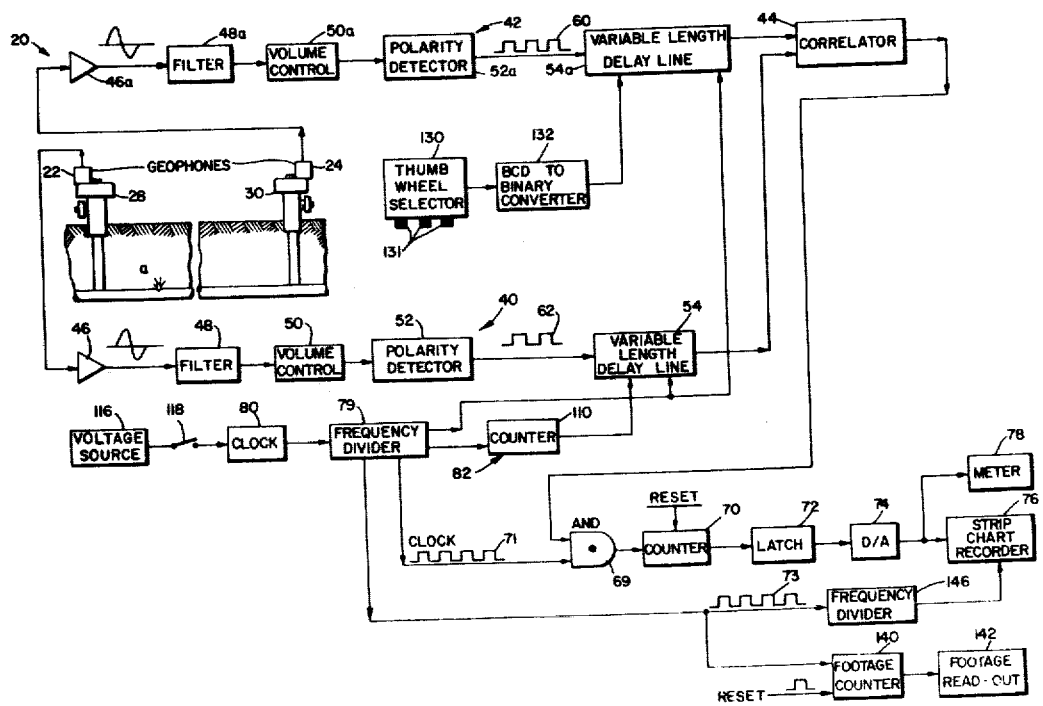

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 17, 18, and 36–40 is confirmed.

Claims 6, 7, 9, 10, 12, 14, 23, 24, 27, 32 and 34, having been finally determined to be unpatentable, are cancelled.

Claims 1, 4, 13, 15, 19, 22, 25, 26, 28, 30, 31, 33, 35, and 41–43 are determined to be patentable as amended:

1. In an apparatus for locating a fluid leak in an underground or unexposed pipe or conduit *in which said leak produces a noise vibration,* first means *for intercepting the leak-produced noise vibration at a point lying along the path of the pipe* and effective upon receipt of [a] *said* vibration [caused by the leak] for producing an electrical digital signal corresponding in phase and frequency to the received vibration, second means *for intercepting the leak-produced noise vibration at another point lying along the path of the pipe and* effective upon receipt of the vibration for producing a further electrical *digital* signal corresponding in phase and frequency to the received vibration, electrical time delay circuit means electrically connected to said first means for variably time delaying one of said electrical signals relative to the other to cause maximum mutual time correlation between the two signals, and means providing an indication of the time correlation between *just* the time delayed one of said signals and the other of said electrical signals.

4. In an apparatus for locating a fluid leak in an underground or unexposed pipe, first means for intercepting [a] *the noise* vibration produced by the leak at two spaced apart points *lying along said pipe on opposite sides of the suspected site of the leak* and for converting the vibration intercepted at each of said points into an electrical signal to provide *just two* electrical signals that are miscorrelated in time to an extent determined by the location of the leak from said points, an electrical circuit electrically connected to said first means and including time delay means for [varying] *variably time delaying at least samples of one of said signals relative to samples of the other of said signals to thereby vary* the extent of time correlation between at least samples of said two signals to cause maximum time correlation therebetween, *the extent of the variable time delay determining the point on said pipe being scanned for the site of the leak,* [and] means providing *a display* [an indication] of the variation of the extent of time correlation between the samples, *and means for indicating the location of the point being scanned on the pipe where said maximum time correlation occurs* to enable the leak's location to be determined from the occurrence of the maximum time correlation *without requiring the leak-produced vibration to be intercepted at any points other than said two spaced apart vibration interception points where the leak is in a pipe region lying between said two spaced apart vibration interception points at least the midpoint of the pipe and extending at least part of the distance between said two spaced apart vibration interception points.*

13. In an apparatus for locating a fluid leak in an underground or unexposed pipe, first means for intercepting a sound wave produced by the leak at two separate points spaced apart along the path of the pipe and for producing two electrical signals having a phase difference which is related to the difference in time required for the wave to propagate to the interception points, said first means having a pair of microphones adapted to be positioned one at each of said interception points to intercept said sound wave, an electrical circuit connected to said first means and including time delay means *for variably time delaying one of said signals relative to the other to* [for] progressively phase [shifting] *shift* at least one of said signals to cause at least momentarily maximum mutual phase correlation between the two signals, means providing an indication which is a function of the degree of mutual phase correlation between the phase shifted signal and the other of said signals as said one of said signals is progressively phase shifted to indicate the occurrence of maximum mutual phase correlation between the two signals, and means providing a measurement [which is a function] of the distance of the leak from a known predetermined point at the time maximum mutual phase correlation occurs when the leak is located between the two microphones or at either one of the microphones, *said predetermined point lying along the path of the pipe, and the leak-produced sound wave being intercepted for conversion into signals at no more than two points at any given time.*

15. In an apparatus for locating a fluid leak in an underground or unexposed pipe, first and second transducers adapted to be positioned at spaced apart regions along the path of the pipe to intercept [a] *the noise* vibration produced by the leak and propagating along the pipe, each of said transducers being effective to convert the intercepted vibration into an electric wave, a circuit for modifying the electric waves produced by said transducers into first and second *one-bit* pulse signals having a phase difference which is related to the location of the leak from said transducers, means in said circuit *for variably time delaying one of said first and second signals relative to the other* for progressively phase shifting one of said pulse signals relative to the other pulse signal to cause at least momentarily maximum mutual phase correlation between said first and second pulse signals, means electrically connected to said circuit for producing a further *one-bit* pulse signal which is a measure of the degree of mutual phase correlation between the phase shifted pulse signal and other pulse signal, and means controlled by said further pulse signal for providing an indication which is a function of the degree of mutual phase correlation between the phase shifted pulse signal and said other pulse signal to indicate the occurrence of maximum mutual phase correlation between the phase shifted pulse signal and the other pulse signal.

19. In an apparatus for locating a fluid leak in an underground or unexposed pipe, means for intercepting [a] *the noise* vibration produced by the leak at two selected points that are spaced apart along the path of said pipe and for converting the vibration intercepted at each of said points into an electrical digital signal to provide two signals that are miscorrelated to an extent determined by the location of the leak from said points, means variably time delaying one of the signals relative to the other of said signals for varying the extent of correlation between said signals to achieve maximum correlation between the signals, and means for displaying the variations of the extent of correlations *just* between the time delayed signal and the other of said signals to enable the location of the leak to be determined from the place at which maximum correlation occurs, *and means related to the point at which said maximum correlating occurs and for indicating the distance of the leak from a known predetermined point as measured along the path of the pipe, the leak-produced vibration being intercepted for conversion into said signals at no more than two points at any given time.*

22. In an apparatus for locating a fluid leak in an underground or unexposed pipe, means for intercepting [a] *the noise* vibration produced by said leak at *just* two selected points that are spaced apart along the path of said pipe *on opposite sides of the suspected site of the leak* and for converting the vibration intercepted at each of said points into a digital signal to provide two digital signals that are related in phase to the location of the leak from said points, a circulating time delay line for *variably* time delaying samples of one of said signals relative to the other, a correlator for comparing the time delayed samples of said one of said signals with at least samples of the other of said signals, and means responsive to the output of said correlator for enabling the location of said leak to be established *just from interception of the leak-produced vibration at said two points where the leak lies between said points.*

25. The apparatus defined in claim [24] *78* wherein said delay line non-progressively variably delays samples of said one of said signals in a scrambled, but predetermined order, and wherein said means responsive to the output of said correlator comprises a memory having a multiplicity of addresses for storing binary data, means for addressing said memory for storing data determined by the output of said logic gate at addresses in the memory that are determined by the time delays of the samples of said first signal relative to the samples of said second signal, and means for reading the data out of said memory in a predetermined order that is different from the order in which the data is written into the memory.

26. In an apparatus for locating a fluid leak in an underground or unexposed pipe, means for intercepting [a] *the noise* vibration produced by the leak at *just* two selected points that are spaced apart along the path of said pipe *on opposite sides of the suspected site of the leak* and for converting the vibration intercepted at said points into two digital signals that are related to the location of the leak from said interception points, means for variably time delaying one of said signals relative to the other to vary the extent of correlation between the two signals, and means for indicating the varied extent of correlation to provide an indication of the location of the leak *just from the interception of the leak-produced vibration at said two points where the leak lies between said two selected points.*

28. An apparatus for locating a fluid leak in an underground or unexposed pipe comprising means for intercepting [a] *the noise* vibration produced by the leak at two selected points that are spaced apart along the path of the pipe *on opposite sides of the leak* and for converting the vibration intercepted at said points into two digital signals that are related in phase to the location of the leak from said points, and means for scanning at least a portion of said pipe between said points for the location of said leak by variably time delaying samples of one of said signals relative to samples of the other of said signals *to provide an indication of the distance of the leak from a known predetermined point as measured along the path of the pipe.*

30. A method of locating a fluid leak in an underground or unexposed pipe comprising the steps of selecting two spaced apart points which lie along said pipe and which are on opposite sides of the suspected site of the leak, intercepting the *noise* vibration produced by the leak at *said* two spaced apart points and converting the vibration intercepted at each of said points into an electrical signal to provide two electrical signals that are miscorrelated in time to an extent determined by the location of the leak from said points, electrically processing at least one of said signals by varying the extent of time correlation between [the] *said* two signals to cause maximum *mutual* time correlation between the *two* signals, *the extent of time correlation between said two signals being varied by variably time delaying one of said signals relative to the other,* and determining the location of the leak from the occurrence of said maximum correlation *without requiring the leak-produced noise vibration to be intercepted at any points other than said two spaced apart points where the leak is in a pipe region lying between said spaced apart points and extending at least part of the distance between said two spaced apart vibration interception points.*

31. A method of locating a fluid leak in an underground or unexposed pipe comprising the steps of intercepting the *noise* vibration produced by the leak at *just* two selected points *at any given time, said points being,* spaced apart *and lying* along the path of the pipe [and], converting the vibration intercepted at each of said points into an electrical signal to provide two electrical signals that are miscorrelated in time to an extent determined by the location of the leak from said points, electrically processing at least one of said two signals by variably time delaying one of said signals relative to the other without changing the selected points at which the vibration is intercepted to vary the extent of time correlation between the signals, and determining the location of the leak from the variation of the extent of time correlation between the signals *regardless of the location of the leak and without requiring the leak-produced vibration to be intercepted at any point other than said two selected points where the leak is located between said two selected points.*

33. The method defined in claim [32] *31* comprising the step of time delaying the other of said signals by a fixed selected amount during the course of variably time delaying said one of said signals.

35. The method defined in claim [32] *31* comprising the step of imparting no delay to the other of said signals.

41. An apparatus for locating a fluid leak in an underground or unexposed pipe or conduit *where the leak produces a noise vibration,* said apparatus comprising first means *for intercepting said noise vibration at a point lying along the path of the pipe and* effective upon receipt of [a] *said* vibration [caused by the leak] for producing an electrical digital signal corresponding in phase and frequency to the received vibration, second means *for intercepting said noise vibration at another point lying along the path of said pipe and* effective upon receipt of [the] *said* vibration for producing a further electrical digital signal corresponding in phase and frequency to the received vibration, electrical circuit means for variably time delaying one of said electrical signals relative to the other to cause maximum mutual correlation between the two signals, and means providing an indication of the correlation between the time delayed signal and the other signal, said electrical circuit means comprising a recirculating time delay line.

42. An apparatus for locating a fluid leak in an underground or unexposed pipe or conduit *where the leak produces a noise vibration,* said apparatus comprising first means *for intercepting the leak-produced vibration at a point lying along the path of the pipe and* effective upon receipt of [a] *the* vibration caused by the leak [and] *for* producing an electrical digital signal corresponding in phase and frequency to the received vibration, second means *for intercepting the leak-produced vibration at another point lying along the path of the pipe and* effective upon receipt of the vibration for producing a further electrical digital signal corresponding in phase and frequency to the received vibration, electrical circuit means for variably time delaying one of said electrical signals relative to the other to cause maximum mutual correlation between the two signals, and means providing an indication of the correlation between the time delayed signal and the other signal, said electrical circuit means comprising a variable length, nonrecirculating time delay line.

43. An apparatus for locating a fluid leak in an underground or unexposed pipe comprising first and second electrical circuits each having (a) a microphone for intercepting the vibration produced by the leak and (b) means connected to the microphone for producing an electrical digital signal related in phase and frequency to the vibration received by the microphone, said microphones being adapted to be located at two spaced apart points *lying along the path of the pipe* on opposite sides of the leak to cause said signals to be miscorrelated in time to an extent determined by the location of the leak between said points, at least one of said first and second circuits having a time delay line for variably time delaying one of said digital signals relative to the other to cause maximum mutual time correlation between the two signals, and means electrically connected to said first and second circuits and providing an indication of the extent of time correlation between said signals to enable the leak's location to be determined from the *time delay required to establish said* [occurrence of the] maximum [mutual] time correlation between the two signals *and without requiring the leak-produced vibration to be intercepted on any point other than said two points where the site of the leak is actually between said spaced apart points.*

44. The apparatus defined in claim 13 wherein each of the two electrical signals is a digital signal which corresponds in phase and frequency to the intercepted sound wave and wherein said indication providing means indicates the extent of mutual correlation between just the phase shifted one of said electrical signals and the other of said electrical signals.

45. The apparatus defined in claim 18 wherein each pulse waveform is a one bit digital signal.

46. The apparatus defined in claim 19 wherein each of the two digital signals corresponds in phase and frequency to the intercepted vibration, and wherein said displaying means indicates the extent of correlation between just the time delayed one of said electrical signals and the other of said electrical signals.

47. The apparatus defined in claim 19 wherein each of the two digital signals corresponds in phase and frequency to the intercepted vibration, and wherein said vibration intercepting means comprises a pair of transducers which are selectively positionable to contact parts of a pipeline system containing said pipe for picking up the leak-produced vibrations at just two spaced apart locations which lie along the path of the pipe and which are on opposite sides of the suspected site of the leak, said displaying means providing a graphical display of a measurable distance which extends from a pre-selected point to the point where said maximum correlation occurs, said measurable distance being a function of the distance of the leak from one of said spaced apart locations to enable the leak to be located by making a measurement from one of said spaced apart locations.

48. The apparatus defined in claim 46 wherein said means for intercepting the leak-produced vibration at said points and for converting the vibration intercepted at said points into said digital signals comprises first and second transducers and first and second polarity detectors, said first and second transducers being selectively positionable to contact parts of a pipeline system containing said pipe for picking up the leak-produced vibrations at spaced apart locations which lie on opposite sides of the suspected location of the leak, said first transducer converting the picked-up vibration into a first analog signal having positive and negative going alternations, said second transducer converting the picked-up vibration into a second analog signal having positive and negative going alternations, said first detector being electrically connected to detect polarity of said first analog signal for producing one of the two digital signals, for providing said one of said digital signals with one pre-selected binary state whenever the polarity of said first analog signal is positive and for providing said one of said digital signals with the other of the binary states whenever the polarity of said first analog signal is negative, said second detector being electrically connected to detect the polarity of said second analog signal for producing the other of the two digital signals, for providing the other of said digital signals with one pre-selected binary state whenever the polarity of said second analog signal is positive and for providing the other of said digital signals with the other of the binary states whenever the polarity of said second analog signal is negative.

49. The apparatus defined in claim 26 wherein each of the two digital signals corresponds in phase and frequency to the intercepted vibration.

50. The apparatus defined in claim 49 wherein said means for intercepting the leak-produced vibration at said points comprises first and second transducers which are selectively positionable to contact parts of a pipeline system containing said pipe for picking up the leak-produced vibrations at just two spaced apart locations which lie along the path of said pipe and which are on opposite sides of the suspected site of the leak, and wherein said means for indicating the extent of correlation comprises a device which provides a graphical display of said extent of correlation between just the two digital signals, there being a determinable, measurable distance on said display, which measurable distance is related to the distance of the leak from one of said spaced apart locations to enable the leak to be located by making a measurement from one of said spaced apart locations.

51. The apparatus defined in claim 49 wherein said means for intercepting the leak-produced vibration at said points and for converting the vibration intercepted at said points into two digital signals comprises first and second transducers and first and second polarity detectors, said first and second transducers being selectively positionable to contact parts of a pipeline system containing said pipe for picking up the leak-produced vibrations at spaced apart locations which lie along the path of said pipe, said first transducer converting the picked-up vibration into a first analog signal having positive and negative going alternations, said second transducer converting the picked-up vibration into a second analog signal having positive and negative going alternations, said first detector being electrically connected to detect the polarity of said first analog signal for producing one of the two digital signals, for providing said one of said digital signals with one pre-selected binary state whenever the polarity of said first analog signal is positive and for providing said one of said digital signals with the other of the binary states whenever the polarity of said first analog signal is negative, said second detector being electrically connected to detect the polarity of said second analog signal for producing the other of the two digital signals, for providing the other of said digital signals with one pre-selected binary state whenever the polarity of said second analog signal is positive and for providing the other of said digital signals with the other of the binary states whenever the polarity of said second analog signal is negative.

52. The apparatus defined in claim 28 wherein each of the two digital signals is a one bit digital signal which corresponds in phase and frequency to the associated intercepted vibration.

53. The method defined in claim 30 wherein each of the two electrical signals is a one bit digital signal which corresponds in phase and frequency to the intercepted vibration.

54. The method defined in claim 31 wherein each of the two electrical signals is a one-bit binary digital signal which corresponds in phase and frequency to the intercepted vibration.

55. The method defined in claim 54 wherein the leak-produced vibration is intercepted at said spaced apart points by placing a pair of transducers in contact with the pipeline system containing said pipe at positions where they lie along the path of said pipe and are on opposite sides of the suspected site of said leak, wherein the site of said leak is determined by graphically displaying said extent of time correlation between just the two signals to show a distance between a pre-determined point and the occurrence of maximum mutual time correlation between the two signals, and utilizing said distance on said display to compute a number which is indicative of the distance of said leak from one of said transducers positions as measured along the path of said pipe.

56. The method defined in claim 31 wherein each of the two electrical signals is a digital signal which corresponds in phase and frequency to the intercepted vibration, wherein the vibration is intercepted at said spaced apart points by placing a pair of transducers in contact with the pipeline system containing said pipe at spaced apart positions where they are located on opposite sides of the suspected location of the leak.

57. The apparatus defined in claim 43 wherein each of the two signals is a one-bit binary digital signal.

58. The apparatus defined in claim 43 wherein said means providing an indication of the extent of time correlation between the two signals comprises a device responsive to the delayed one of said electrical digital signals and to the other of said electrical digital signals to provide a further digital signal in which the extent of time correlation between just the time delayed one of said electrical signals and the other of said electrical signals is indicated by the total time said further signal is at one pre-selected binary state during a pre-selected time interval of said further signal.

59. The apparatus defined in claim 26 wherein each of the two digital signals corresponds in phase and frequency to the intercepted vibration, and wherein said indicating means indicates the extent of correlation between just the time delayed one of said digital signals and the other of said digital signals.

60. The apparatus defined in claim 59 wherein each of the two digital signals is a one-bit signal.

61. In an apparatus for locating a fluid leak in an underground or unexposed pipe or conduit, first means effective upon receipt of a vibration caused by the leak for producing a first electrial one-bit digital signal corresponding in phase and frequency to the received vibration, second means effective upon receipt of a vibration caused by the vibration caused by the leak for producing a second electrical one-bit digital signal corresponding in phase and frequency to the received vibration, said first means comprising a first signal-producing transducer, and said second means comprising a second signal-producing transducer, said first and second transducers being selectively positionable to contact portions of a pipeline system containing said pipe for receiving the leak-line produced vibration at spaced apart locations which lie along the path of the pipe such that the extent of correlation between said first and second signals is dependent on the time required for the leak-produced vibration to reach said locations, electrical time delay circuit means electrically connected to said first means for variably time delaying said first signal relative to said second signal to cause maximum mutual time correlation between the two signals, and third means providings an indication of the extent of time correlation between just the time delayed one of said signals and the other of said signals and for enabling the location of the leak to be determind from the time delay required to achieve said maximum mutual time correlation between just the time delayed one of said signals and the other of said signals.

62. The apparatus defined in claim 61 wherein said third means comprises a device which provides a graphical display of the extent of correlation between the time delayed one of said digital signals and the other of said digital signals, there being a measurable distance on said display, which measurable distance extends from a predetermined point to the point where maximum mutual correlation occurs, and said measurable distance being a function of the distance of said leak from one of the locations of said transducers to enable the leak to be located by making a measurement from said one of said locations.

63. The apparatus defined in claim 61 wherein said third means includes a correlator, there being means for feeding the time delayed one of said signals and the other of said signals to said correlator, said correlator comparing the time delayed one of said signals with the other of said first and second signals for producing a further one-bit digital signal which is indicative of the extent of correlation between just the time delayed one of said first and second signals and the other of said first and second signals.

64. The apparatus defined in claim 63 wherein said third means further includes a device which provides a graphical display of the extent of correlation which is indicated by said further signal, there being a measurable distance on said display, which measurable distance extends from a pre-determined point to the point where said maximum correlation occurs, and said measurable distance being a function of the distance of said leak from one of said locations of said transducers and being indicative of the time delay required to achieve maximum correlation between said first and second signals to enable the leak to be located by making a measurement from said one of said locations.

65. In an apparatus for locating a fluid leak in an underground or unexposed pipe or conduit, first means effective upon receipt of a noise vibration caused by the leak for producing a first electrical analog signal corresponding in phase and frequency to the received vibration, second means effective upon receipt of the vibration for producing a second electrical analog signal corresponding in phase and frequency to the received vibration, said first means comprising a first transducer for intercepting said vibration and for converting said vibration into said first analog signal, and said second means comprising a second transducer for intercepting said vibration and for converting the intercepted vibration into said second analog signal, third means electrically connected to said first means for detecting the polarity of said first analog signal to produce a first electrical digital signal which is indicative of the polarity of said first analog signal, fourth means electrically connected to said second means for detecting the polarity of said second analog signal to produce a second electrical digital signal which is indicative of the polarity of said second analog signal, electrical time delay circuit means electrically connected to said third means for variably time delaying one of said digital signals relative to the other of said digital signals to cause maximum mutual time correlation between the two digital signals, and further means providing an indication of the time correlation between just the time delayed one of said digital signals and the other of said digital signals to enable the location of the leak to be determined from the occurrence of the maximum mutual time correlation between the two digital signals when said first and second transducers are located along the path of said pipe on opposite sides of said leak.

66. The apparatus defined in claim 65 wherein each of said digital signals is a one-bit signal.

67. In an apparatus for locating a fluid leak in an underground or unexposed pipe, first means for intercepting a vibration produced by the leak at two spaced apart points and for converting the vibration intercepted at each of said points into an electrical signal to provide two electrical signals that are miscorrelated in time to an extent determined by the location of the leak from said points, an electrical circuit electrically connected to said first means and including time delay means for varying the extent of time correlation between at least samples of said two signals to cause maximum time correlation therebetween, means providing an indication of the variation of the extent of time correlation between said samples to enable the leak's location to be determined from the occurrence of the maximum time correlation, said signals being digital signals and said time delay means comprising a recirculating time delay line for variably time delaying samples of one of said signals relative to samples of the other of said signals, means for periodically entering samples of said one of said signals into said delay line at a first predetermined rate, and means for recirculating the samples in said delay line at a rate that is faster than said first predetermined rate.

68. In an apparatus for locating a fluid leak in an underground or unexposed pipe, first means for intercepting a vibration produced by the leak at two spaced apart points and for converting the vibration intercepted at each of said points into an electrical signal to provide two electrical signals that are miscorrelated in time to an extent determined by the location of the leak from said points, an electrical circuit electrically connected to said first means and including time delay means for varying the extent of time correlation between at least samples of said two signals to cause maximum time correlation therebetween, means providing an indication of the variation of the extent of time correlation between the samples to enable the leak's location to be determined from the occurrence of the maximum time correlation, said signals being digital signals, and said time delay means comprising a first circulating shift register for variably time delaying samples of one of said signals relative to the other, means for periodically entering samples of said one of said signals into said first register at a first predetermined rate, means for circulating the contents in said first register at a second predetermined rate that is faster than said first predetermined rate, and a second circulating shift register for delaying samples of the other of said signals, said second shift register being clocked to circulate the samples of said other of said signals at said first predetermined rate, and said second register having a bit length that is shorter than that of said first register.

69. In an apparatus for locating a fluid leak in an underground or unexposed pipe, first means for intercepting a vibration produced by the leak at two spaced apart points and for converting the vibration intercepted at each of said points into an electrical signal to provide two electrical signals that are miscorrelated in time to an extent determined by the location of the leak from said points, an electrical circuit electrically connected to said first means and including time delay means for varying the extent of time correlation between at least samples of said two signals to cause maximum time correlation therebetween, and means providing an indication of the variation of the extent of time correlation between the samples to enable the leak's location to be determined from the occurrence of the maximum time correlation, said time delay means comprising a variable length delay line for variably delaying at least samples of one of said signals relative to the other, and means for progressively varying the length of said delay line to cause the variation in the extent of correlation between the signals, and said electrical circuit comprising a further delay line of fixed, pre-selected length for delaying at least samples of the other of said signals.

70. In an apparatus for locating a fluid leak in an underground or unexposed pipe, first means for intercepting a sound wave produced by the leak at two separate points spaced apart along the path of the pipe and for producing two electrical signals having a phase difference which is related to the difference in time required for the wave to propagate to the interception points, said first means having a pair of microphones adapted to be positioned one at each of said interception points to intercept said sound wave, an electrical circuit connected to said first means and including time delay means for progressively phase shifting at least one of said signals to cause at least momentarily maximum mutual phase correlation between the two signals, means providing an indication which is a function of the degree of mutual phase correlation between the phase shifted signal and the other of said signals as said one of said signals is progressively phase shifted to indicate the occurrence of maximum mutual phase correlation between the two signals, and means providing a measurement which is a function of the distance of the leak from a known predetermined point at the time maximum mutual phase correlation occurs when the leak is located between the two microphones or at either one of the microphones, said electrical circuit further including selectively adjustable delay means for delaying the other of said signals by a fixed selected amount.

71. In an apparatus for locating a fluid leak in an underground or unexposed pipe, means for intercepting a vibration produced by said leak at two selected points that are spaced apart along the path of said pipe and for converting the vibration intercepted at each of said points into a digital signal to provide two digital signals that are related in phase to the location of the leak from said points, a circulating time delay line for time delaying samples of one of said signals relative to the other, a correlator for comparing the time delayed samples of said one of said signals with at least samples of the other of said signals, and means responsive to the output of said correlator for enabling the location of said leak to be established, said time delay line comprising a circulating shift register, and means for periodically entering samples of said one of said signals into said shift register at a rate that is slower than the rate at which the samples are recirculated by said shift register.

72. In an apparatus for locating a fluid leak in an underground or unexposed pipe, means for intercepting a vibration produced by said leak at two selected points that are spaced apart along the path of said pipe and for converting the vibration intercepted at each of said points into a digital signal to provide two digital signals that are related in phase to the location of the leak from said points, a circulating time delay line for time delaying samples of one of said signals relative to the other, a correlator for comparing the time delayed samples of said one of said signals with at least samples of the other of said signals, and means responsive to the output of said correlator for enabling the location of said leak to be established, said signal samples being in the form of binary bits and said correlator comprising a logic gate that produces a binary output of one logic state when the compared signal samples have the same logic state and a binary output of the other logic state when the logic states or the compared signal samples are not the same.

73. In an apparatus for locating a fluid leak in an underground or unexposed pipe, means for intercepting a vibration produced by the leak at two selected points that are spaced apart along the path of said pipe and for converting the vibration intercepted at said points into two digital signals that are related to the location of the leak from said interception points, means for variably time delaying one of said signals relative to the other to vary the extent of correlation between the two signals, and means for indicating the varied extent of correlation to provide an indication of the location of the leak, said means for variably time delaying said one of said signals comprising a circulating time delay line and means for circulating samples of said one signal through said delay line at a rate that is faster than the rate at which samples said one signal are enttered into said delay line.

74. The apparatus defined in claim 42 wherein each of said two electrical digital signals is a one-bit digital signal, and wherein said indicating means indicates the extent of correlation between just the time delayed one of said signals and the other of said signals.

75. The apparatus defined in claim 43 wherein said microphones are selectively positionable to contact parts of a pipeline system containing said pipe for picking up the leak-produced vibrations at said spaced apart points, said time correlation indication means including a device which provides a graphical display of said extent of correlation between just the delayed one of said signals and the other of said signals, there being a measurable distance on said display, which measurable distance extends from a known predetermined point to the point where said maximum mutual correlation occurs, and said measurable distance being a function of the distance of said leak from one of said spaced apart points to enable the leak to be located by making a measurement from one of said spaced apart points.

76. The method defined in claim 30 wherein the extent of the variable time delay of one of said signals relative to the other of said signals determines the location of the pipe being scanned for the site of the leak, and said method comprising the additional step of time delaying a pre-selected one of said signals by a fixed pre-selected amount to increase the length of the pipe which is capable of being scanned by variably time delaying one of the signals relative to the other to a distance exceeding one-half the length of the pipe lying between the two spaced apart vibration interception points.

77. The method defined in claim 76 wherein the fixed time delay of said pre-selected one of said signals is sufficient to enable the entire length of the pipe between said two spaced apart points to be scanned for said leak just by variably time delaying only one of said signals and without changing the points at which the leak-produced vibration is intercepted.

78. The method defined in claim 30 comprising the steps of variably time delaying a pre-selected one of said signals without time delaying the other of said signals to scan a first predetermined portion of the pipe for the leak, and then variably time delaying the other of said signals without time delaying said pre-selected one of said signals to scan a second predetermined portion of the pipe for the leak, said first predetermined portion extending from the midpoint of the pipe between the two vibration-interception points to one of the two vibration-interception points, and said second predetermined portion extending from said midpoint to the other of the two vibration-interception points.

79. The method defined in claim 30 wherein the extent of the variable time delay of one of the signals relative to the other determines the location of the pipe being scanned for the site of the leak, and wherein said signals are electrically processed to enable the entire length of the pipe between said two spaced apart interception points to be scanned for the site of said leak without changing the points at which the leak-produced noise is intercepted.

80. A method of locating a fluid leak in an underground or unexposed pipe comprising the steps of intercepting the noise vibration produced by the leak at just two spaced apart points at any given time where the locations of said points are selected to lie along the path of the pipe on opposite sides of the suspected site of the leak, converting the vibration intercepted at each of said points into an electrical signal to provide two electrical signals that are miscorrelated in time to an extent determined by the location of the leak from said points, electrically processing at least one of said signals by varying the extent of time correlation between the two signals to cause maximum mutual time correlation between the two signals, the extent of time correlation between said two signals being varied by variably time delaying one of said signals relative to the other, and determining the location of the leak from the signal time delay required to establish said maximum correlation where the leak is in a region of said pipe lying between said two spaced apart vibration-interception points and extending at least part of the distance between said two spaced apart vibration-interception points.

81. The method defined in claim 80 wherein the leak-produced noise vibration is intercepted at said two spaced apart points by contacting the pipeline system containing said pipe.

82. The method defined in claim 80 wherein the extent of the variable time delay of one of said signals relative to the other of said signals determines the location of the pipe being scanned for the site of the leak, and said method comprising the additional step of time delaying a pre-selected one of said signals by a fixed pre-selected amount to increase the length of the pipe which is capable of being scanned by variably time delaying either one of the signals relative to the other to a distance exceeding one-half the length of the pipe lying between the two spaced apart vibration interception points.

83. The method defined in claim 82 wherein the fixed time delay of said pre-selected one of said signals is sufficient to enable the entire length of the pipe between said two spaced apart points to be scanned for said leak just by variably time delaying only one of said signals and without changing the points at which the leak-produced vibration is intercepted.

84. The method defined in claim 80 comprising the steps of variably time delaying a pre-selected one of said signals without time delaying the other of said signals to scan a first predetermined portion of the pipe for the leak, and then variably time delaying the other of said signals without time delaying said pre-selected one of said signals to scan a second predetermined portion of the pipe for the leak, said first predetermined portion extending from the midpoint of the pipe between the two spaced apart vibration-interception points to one of the two vibration-interception points, and said second predetermined portion extending from said midpoint to the other of the two vibration-interception points.

85. The method defined in claim 80 wherein the extent of the variable time delay of one of the signals relative to the other determines the location of the pipe being scanned for the site of the leak, and wherein said signals are electrically processed to enable the entire length of the pipe between said two spaced apart interception points to be scanned for the site of said leak without changing the points at which the leak-produced noise is intercepted.

86. A method of locating a fluid leak in an underground or unexposed pipe comprising the steps of intercepting the noise vibration produced by the leak at just two spaced apart points at any given time where the locations of said points are selected to lie along the path of the pipe on opposite sides of the suspected site of the leak, converting the vibration intercepted at each of said points into an electrical signal to provide two electrical signals that are miscorrelated in time to an extent determined by the location of the leak from said points, electrically processing at least one of said signals by varying the extent of time correlation between the two signals to cause maximum mutual time correlation between the two signals, the extent of time correlation between said two signals being varied by variably time delaying one of said signals relative to the other, and locating the leak from the signal time delay required to establish said maximum correlation by computing a value from the speed of sound in a medium and from the signal time delay required to establish said maximum correlation, where said value is the distance of the leak from a known point lying on the path of pipe.

87. A method of locating a fluid leak in an underground or unexposed pipe comprising the steps of intercepting the noise vibration produced by the leak at just two spaced apart points at any given time where the locations of said points are selected to lie along the path of the pipe on opposite sides of the suspected site of the leak, converting the vibration intercepted at each of said points into an electrical signal to provide two electrical signals that are miscorrelated in time to an extent determined by the location of the leak from said points, electrically processing at least one of said signals by varying the extent of time correlation between the two signals to cause maximum mutual time correlation between the two signals, the extent of time correlation between said two signals being varied by variably time delaying one of said signals relative to the other, and locating the leak from the signal time delay required to establish said maximum correlation by computing a value from the signal time delay required to establish said maximum correlation, said value being the distance of the leak from a known point lying on the path of the pipe.

88. A method of locating a fluid leak in an underground or unexposed pipe comprising the steps of intercepting the noise vibration produced by the leak at just two spaced apart points at any given time where the locations of said points are selected to lie along the path of the pipe on opposite sides of the suspected site of the leak, converting the vibration intercepted at each of said points into an electrical signal to provide two electrical signals that are miscorrelated in time to an extent determined by the location of the leak from said points, electrically processing at least one of said signals by varying the extent of time correlation between the two signals to cause maximum mutual time correlation between the two signals, the extent of time correlation between said two signals being varied by variably time delaying one of said signals relative to the other, and locating the leak from the signal time delay required to establish said maximum correlation where the actual site of the leak lies anywhere between the two spaced apart vibration-interception points by computing a value from the signal time delay required to establish said maximum correlation, said value being the distance of the leak from a known point lying on the path of the pipe.

89. A method of locating a fluid leak in an underground or unexposed pipe comprising the steps of intercepting the noise vibration produced by the leak at just two spaced apart points at any given time, said two spaced apart points being selected to lie along the path of the pipe on opposite sides of the suspected site of the leak, converting the vibration intercepted at each of said points into an electrical signal to provide two electrical signals that are miscorrelated in time to an extent determined by the location of the leak from said points, electrically processing at least one of said signals by varying the extent of time correlation between just said two signals to cause maximum mutual time correlation between the two signals, the extent of time correlation between said two signals being varied by variably time delaying one of said signals relative to the other and, without requiring the leak-produced vibration to be intercepted at any points other than said two spaced apart points, locating of the leak from the time delay required to establish said maximum correlation where the leak actually lies between said points by converting the time delay required to establish said maximum correlation into a measurement which indicates the distance of the leak from a preselected location along the path of said pipe.

90. The apparatus defined in claim 4 comprising means for time delaying one of said signals by a fixed preselected amount for enabling more than one-half the length of the pipe between said two spaced apart vibration interception points to be scanned for the site of the leak by variably time delaying just one of said signals and without intercepting the leak-produced vibration at any points other than said two spaced apart vibration interception points.

91. The apparatus defined in claim 4 comprising means separate from said time delay means for time delaying one of said signals by a fixed pre-selected amount.

92. The apparatus defined in claim 4 comprising means for selectively enabling a pre-selected one of said signals to be variably time delayed by said time delay means without variably time delaying the other of said signals and for selectively enabling said other of said signals to be variably time delayed by said time delay means without variably time delaying said pre-selected one of said signals.

93. In an apparatus for locating a fluid leak in an underground or unexposed pipe, first means for intercepting the noise vibration produced by the leak at two spaced apart points lying along said pipe on opposite sides of the suspected site of the leak and for converting the vibration intercepted at each of said points into an electrical signal to provide two electrical signals that are miscorrelated in time to an extent determined by the location of the leak from said points, an electrical circuit electrically connected to said first means and including time delay means for variably time delaying at least samples of one of said signals relative to samples of the other of said signals to thereby vary the extent of time correlation between at least samples of said two signals to cause maximum time correlation, therebetween, means providing an indication of the variation of the extent of time correlation between the samples to enable the leak's location to be determined from the time delay required to establish said maximum time correlation.

94. The apparatus defined in claim 93 wherein the variable extent of time delay of one of said signals relative to the other is indicative of the point on said pipe being scanned for the site of the leak, and there being means separate from said time delay means for time delaying a pre-selected one of said signals by a fixed pre-selected amount to increase the length of the pipe capable of being scanned by variably time delaying just one of said signals.

95. The apparatus defined in claim 93 comprising means for selectively enabling a pre-selected one of said signals to be variably time delayed by said time delay means without variably time delaying the other of said signals and for selectively enabling said other of said signals to be variably time delayed by said time delay means without variably time delaying said pre-selected one of said signals.

96. The apparatus defined in claim 93 wherein the extent of the time delay imparted to at least samples of one of said signals by said time delay means determines the point being scanned on the pipe for the site of the leak, there being means for enabling the entire length of the pipe between said two spaced apart points to be scanned for the site of the leak without changing the points at which the leak-produced vibration is intercepted.

97. The apparatus defined in claim 93 including means for indicating a value which is a function of the time delay required to establish said maximum correlation, said value being the distance of the leak from a known point as measured along the path of said pipe.

98. In an apparatus for locating a fluid leak in an underground or unexposed pipe, first means for intercepting the noise vibration produced by the leak at two spaced apart points lying along said pipe on opposite sides of the suspected site of the leak and for converting the vibration intercepted at each of said points into an electrical signal to provide two electrical signals that are miscorrelated in time to an extent determined by the location of the leak from said points, an electrical circuit electrically connected to said first means and including them delay means for variably time delaying one of said signals relative to the other of said signals to thereby vary the extent of time correlation between said two signals to cause maximum time correlation there between, the extent of the variable time delay determining the point on said pipe being scanned for the site of the leak, means providing an indication of the variation of the extent of time correlation between the signals to enable the leak's location to be determined from the time delay required to establish said maximum time correlation without requiring the leak-produced vibration to be intercepted at any points other than said two spaced apart vibration-interception points where the leak in a region of said pipe lying between said two spaced apart vibration-interception points and extending at least part of the distance between said two spaced apart vibration-interception points.

99. The apparatus defined in claim 98 there being means separate from said time delay means for time delaying a pre-selected one of said signals by a fixed pre-selected amount to increase the length of the pipe capable of being scanned by variably time delaying just one of said signals.

100. The apparatus defined in claim 98 comprising means for selectively enabling a pre-selected one of said signals to be variably time delayed by said time delay means without variably time delaying the other of said signals and for selectively enabling said other of said signals to be variably time delayed by said time delay means without variably time delaying said pre-selected one of the signals.

101. The apparatus defined in claim 98 including means indicating a value which is a function of the time delay required to establish said maximum correlation, said value being the distance of the leak from a known point as measured along the path of said pipe.

102. In an apparatus for locating a fluid leak in an underground or unexposed pipe or conduit where said leak produces a noise vibration, first means for intercepting the leak-produced noise vibration at a first point lying along the path of the pipe and effective upon receipt of said vibration for producing a first electrical analog signal corresponding in phase and frequency to the received vibration, second means for intercepting the leak-produced noise vibration at a second point lying along the path of the pipe in spaced relation to said first point and effective upon receipt of the vibration for producing a second electrical analog signal corresponding in phase and frequency to the received vibration, said first means including a circuit for converting said first signal into a digital form, said second means including a circuit for converting said second signal into a digital form, electrical time delay circuit means electrically connected to said first means for variably time delaying the digital form of said first electrical signal relative to the digital form of said second electrical signal to cause maximum mutual time correlation between the digital forms of the two signals, means providing an indication of the time correlation between the time delayed one of said digital forms and the other of said digital forms, and means providing an indication of the location of the leak from the time delay required to establish said maximum correlation without requiring the leak-produced vibration to be intercepted at any points other than said first and second points where the site of the leak is in a region of the pipe lying between said first and second points and extending at least part of the distance between said first and second points.

103. The apparatus defined in claim 102 wherein the variable extent of time delay of one of said digital forms relative to the other determines the point on said pipe being scanned for the site of the leak, and there being means separate from said time delay circuit means for time delaying a pre-selected one of said digital forms by a fixed pre-selected amount to increase the length of the pipe capable of being scanned by variably time delaying just one of said digital forms.

104. The apparatus defined in claim 102 wherein the extent of time delay imparted to one of the digital forms of said signals by said time delay circuit means determines the point being scanned on the pipe for the site of the leak, there being means for enabling the entire length of the pipe between said first and second points to be scanned for the site of the leak without changing the points at which the leak-produced vibration is intercepted.

105. The apparatus defined in claim 102 wherein said means providing an indication of the location of the leak comprises means for indicating a value which is a function of the time delay required to establish said maximum correlation, said value being the distance of the leak from a known point as measured along the path of said pipe, said known point lying on the path of said pipe.

106. In an apparatus for locating a fluid leak in an underground or unexposed pipe or conduit where said leak produces noise vibration, first means for intercepting the leak-produced noise vibration at a first point lying along the path of the pipe and effective upon receipt of said vibration for producing a first electrical analog signal corresponding in phase and frequency to the received vibration, second means for intercepting the leak-produced noise vibration at a second point lying along the path of the pipe in spaced relation to said first point and effective upon receipt of the vibration for producing a second electrical analog signal corresponding in phase and frequency to the received vibration, said first means including a circuit for converting said first signal into a digital form, said second means including a circuit for converting said second signal into a digital form, electrical time delay circuit means electrically connected to said first means for variably time delaying the digital form of said first electrical signal relative to the digital form of said second electrical signal to cause maximum mutual time correlation between the digital forms of the two signals, means providing an indication of the time correlation between the time delayed one of said digital forms and the other of said digital forms, and means for indicating a value which is a function of the time delay required to establish said maximum correlation, said value being the distance of the leak from a known point as measured along the path of the pipe.

107. In an apparatus for locating a fluid leak in an underground or unexposed pipe or conduit where said leak produces a noise vibration, first means for intercepting the leak-produced noise vibration at a first point lying along the path of the pipe and effective upon receipt of said vibration for producing a first electrical signal corresponding in phase and frequency to the received vibration, second means for intercepting the leak-produced noise vibration, at a second point lying along the path of the pipe in spaced relation to said first point and effective upon receipt of the vibration for producing a second electrical signal corresponding in phase and frequency to the received vibration, electrical time delay circuit means electrically connected to said first means for variably time delaying said first electrical signal relative to said second electrical signal to cause maximum mutual time correlation between the two signals, means providing an indication of the time correlation between the time delayed one of said signals and the other of said signals, and means providing an indication of the location of the leak from the time delay required to establish said maximum correlation without requiring the leak-produced vibration to be intercepted at any points other than said first and second points where the leak is in a region of the pipe lying between said first and second points.

108. The apparatus defined in claim 107 wherein said means providing an indication of the location of the leak comprises a device for indicating a value which is a function of the time delay required to establish said maximum correlation, said value being the distance of the leak from a known point as measured along the path of said pipe, where said known point lies on the path of said pipe.

Claims 2, 3, 5, 8, 11, 16, 20, 21 and 29, dependent on amended claims, are determined to be patentable.

New claims 44–108 are added and determined to be patentable.

* * * * *

REEXAMINATION CERTIFICATE (245th)

United States Patent [19]

Anway

[11] B2 4,083,229

[45] Certificate Issued Sep. 11, 1984

[54] METHOD AND APPARATUS FOR DETECTING AND LOCATING FLUID LEAKS

[75] Inventor: Allen R. Anway, Superior, Wis.

[73] Assignee: Plaunt & Anderson Company, Inc., Duluth, Minn.

Reexamination Request:
No. 90/000,348, Mar. 23, 1983

Reexamination Certificate for:
Patent No.: 4,083,229
Issued: Apr. 11, 1978
Appl. No.: 727,359
Filed: Sep. 28, 1976

Reexamination Certificate B1 4,083,229 issued Feb. 1, 1983.

Certificate of Correction issued Sep. 26, 1978.

Related U.S. Application Data

[63] Continuation-in-part of Ser. No. 650,842, Jan. 20, 1976, abandoned.

[51] Int. Cl.³ .................................. G01M 3/00
[52] U.S. Cl. .......................... 73/40.5 A; 73/592
[58] Field of Search ........... 73/40.5 A, 71.2, 40.5 R, 73/592; 340/242

[56] References Cited

U.S. PATENT DOCUMENTS

| | | | |
|---|---|---|---|
| 3,249,911 | 5/1966 | Gustafsson | 340/6 |
| 3,441,745 | 4/1969 | Reeves et al. | 307/87 |
| 3,446,949 | 5/1969 | Trimble | 235/152 |
| 3,660,647 | 5/1972 | Pryor, Jr. | 235/181 |
| 3,720,789 | 3/1973 | Clark | 179/15 BC |
| 3,814,207 | 6/1974 | Kusuda et al. | 181/0.5 LD |
| 3,851,521 | 12/1974 | Ottenstein | 73/40.5 R |
| 3,878,381 | 4/1975 | Broder et al. | 235/181 |
| 3,903,729 | 9/1975 | Covington | 73/40.5 R |
| 3,947,803 | 5/1976 | Brown | 340/6 R |
| 4,289,019 | 9/1981 | Clayton | 73/40.5 A |
| 4,327,576 | 5/1982 | Dickey et al. | 73/40.5 A |

FOREIGN PATENT DOCUMENTS 1065678 9/1959 Fed. Rep. of Germany ... 73/40.5 R

OTHER PUBLICATIONS

Angell, R. K., "A Two Level, Real Time Correlator", Master's Thesis, Massachusetts Institute of Technology, Jun. 1957.
"Time Delay Correlator", Honeywell Instrumentation Handbook, Honeywell Inc., Test Instruments Division, Denver, Colorado, 1968, pp. 232-234.
Schwartz, M., Information Transmission, Modulation, and Noise, McGraw-Hill, New York, 1959, p. 108.
Hewlett-Packard Journal, vol. 21, No. 3, Nov. 1969, The Hewlett-Packard Co., Palo Alto, California.
"Symposium on Waste Control", The Institution of Water Engineers (Proceedings), England, 1974, pp. 136-138.
Hewlett-Packard Service Manual, vols. 1 and 2, 3721A Correlator.
Hewlett-Packard Operating Manual, 3721A Correlator.

*Primary Examiner*—Gerald Goldberg

[57] ABSTRACT

An apparatus and method for detecting and locating a fluid leak in an underground pipe or the like in which the vibration produced by the leak is intercepted at selected spaced apart points by microphones or other transducers, in which the vibration intercepted at each of the two points is converted into an electrical signal, and in which the extent of correlation of the two resulting signals is varied by variably time delaying one signal relative to the other to determine the leak's location from the occurrence of maximum correlation between the signals. In one embodiment, the variable time delay of one signal relative to the other is accomplished by a variable length time delay line and a means for progressively varying the length of the delay line. In another embodiment the variable time delay is accomplished by a recirculating delay line analyzer that does more data age comparisons with the same delays in the same time than the variable length delay line.

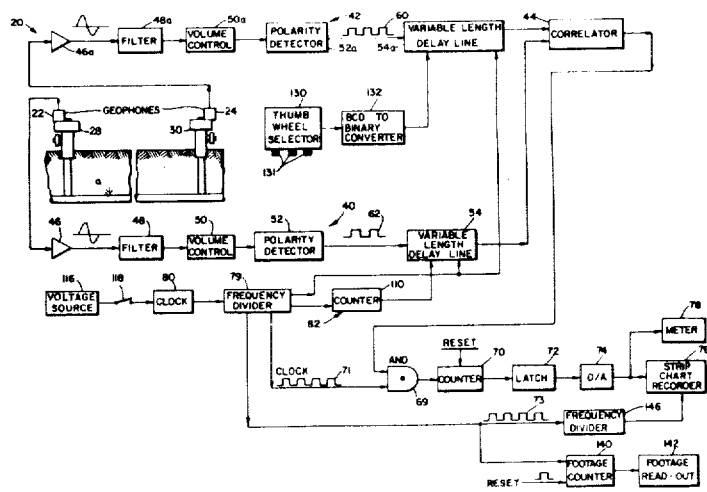

REEXAMINATION CERTIFICATE ISSUED UNDER 35 U.S.C. 307.

THE PATENT AS AMENDED IN THE LAST PRIOR REEXAMINATION CERTIFICATE IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 22, 36–41, 61–64, 67, 68, and 71–73 is confirmed.

Claims 6, 7, 9, 10, 12, 14, 23, 24, 27, 32, and 34 were previously cancelled.

Claims 1, 2, 4, 5, 8, 13, 15, 16, 19, 20, 25, 26, 28, 30, 31, 33, 35, 42–44, 46–60, 65, 66, 69, 70, and 74–108 are cancelled.

Claims 3, 11, 17, 18, 21, and 29 are determined to be patentable as amended.

Claim 45, dependent on an amended claim, is determined to be patentable.

New claims 109–178 are added and determined to be patentable.

3. The apparatus defined in claim [1] *109* wherein said electrical time delay circuit means comprises a variable length, non-recirculating time delay line.

11. The apparatus defined in claim [4] *110* wherein said time delay means comprises a variable length delay line for variably delaying at least samples of one of said signals relative to the other, and means for progressively varying the length of said delay line to cause the variation in the extent of correlation between the signals.

17. In an apparatus for locating a [fluid] leak *of a liquid, such as water, from a buried* [in an underground or unexposed] pipe *lying in contact with the earth in which it is buried*, first means for intercepting a vibration produced by the leak at two spaced apart points and for converting the intercepted vibration into first and second electrical signals having a phase difference which *is* a function of the difference in time required for the vibration to propagate to said points, *said first means comprising a pair of selectively positionable microphones located in contact with different portions of a pipeline system containing said pipe to pick up the leak-produced vibration transmitted through said liquid, means for scanning the full length of the pipe between said microphones for said leak, said scanning means including* selectively operable switching means electrically connected to said first means, a variable time delay line electrically connected to said switching means, a phase correlation measuring means electrically connected to said time delay line and to said switching means, said switching means having a first switching position in which it feeds said first signal to said time delay line and in which it bypasses said second signal around said time delay line and feeds the second signal to said measuring means, said switching means having a second switching position in which it feeds said second signal to said time delay line and in which it bypasses said first signal around said delay line and feeds the first signal to said measuring means, means for varying the delay of said delay line to delay the signal fed to the delay line by said switching means, and said measuring means being effective to produce a further signal which is a function of the extent of phase correlation between the delayed signal from said delay line and the other signal which is bypassed around said delay line by said switching means.

18. In an apparatus for locating a [fluid] leak *of a liquid, such as water, from a buried* [in an underground or unexposed] pipe *lying in contact with the earth in which it is buried*, first and second circuits each having (a) a *selectively positionable* microphone for intercepting the vibration produced by the leak to produce an a.c. signal, and (b) a polarity detector for detecting each alternation of one preselected polarity of said signal to produce a pulse wave form, *the microphone of each of said first and second circuits being located in contact with a portion of the pipeline system containing said pipe to pick up the leak-produced vibration propagated through said liquid*, at least one of said first and second circuits having a time delay line for delaying the pulse wave form developed by the polarity detector in one of said circuits relative to the pulse wave form developed by the polarity detector in the other of said first and second circuits, means for varying the delay of said delay line over a preselected range, and phase correlation measuring means electrically connected to said first and second circuits for producing a signal which is a function of the phase difference between the pulse wave form which is delayed by said delay line and the pulse wave form developed in said other of said first and second circuits.

21. The apparatus defined in claim [19] *113* wherein said means for time delaying said one of said signals comprises a variable length time delay line and means for incrementally and progressively varying the length of said delay line.

29. The apparatus defined in claim [28] *115* wherein said scanning means scans spaced apart locations of said pipe portion for said leak, and wherein means are provided for selectively adjusting the scanning resolution of said scanning means.

*109. In an apparatus for locating a leak of a liquid, such as water, from a buried pipe or conduit in which said leak produces a noise vibration wherein said pipe is lying in contact with the earth in which it is buried, first means for intercepting the leak-produced noise vibration at a point lying along the path of the pipe and effective upon receipt of said vibration for producing an electrical digital signal corresponding in phase and frequency to the received vibration, second means for intercepting the leak-produced noise vibration at another point lying along the path of the pipe and effective upon receipt of the vibration for producing a further electrical digital signal corresponding in phase and frequency to the received vibration, electrical time delay circuit means electrically connected to said first means for variably time delaying one of said electrical signals relative to the other to cause maximum mutual time correlation between the two signals, said first means comprising a selectively positionable microphone located to contact a portion of the pipeline system containing said pipe for picking up the leak-produced noise vibration propagated* through said liquid, and said second means also comprising a selectively positionable microphone located to contact a further portion of said pipeline system for picking up the leak-produced noise vibration propagated through said liquid, and further means providing an indication of the time correlation between just the time delayed one of said signals and the other of said electrical signals, said further means enabling the leak to be located from the time delay required to establish maximum mutual time correlation between the two signals and from the speed of sound in said liquid.

110. In an apparatus for locating a leak of a liquid, such as water, from a buried pipe lying in contact with the material in which it is buried, first means for intercepting the noise vibration produced by the leak at two spaced apart points lying along said pipe on opposite sides of the suspected site of the leak and for converting the vibration intercepted at each of said points into an electrical signal to provide just two electrical signals that are miscorrelated in time to an extent determined by the location of the leak from said points, an electrical circuit electrically connected to said first means and including time delay means for variably time delaying at least samples of one of said signals relative to samples of the other of said signals to thereby vary the extent of time correlation between at least samples of said two signals to cause maximum time correlation therebetween, the extent of the variable time delay determining the point on said pipe being scanned for the site of the leak, means providing a display of the variation of the extent of time correlation between the samples, and means for indicating the location of the point being scanned on the pipe where said maximum time correlation occurs to enable the leak's location to be determined from the occurrence of the maximum time correlation and from the speed of sound in said liquid without requiring the leak-produced vibration to be intercepted at any points other than said two spaced apart vibration-interception points where the leak is in a pipe region lying between said two spaced apart vibration-interception points and extending at least part of the distance between said two spaced apart vibration-interception points, said first means comprising a pair of selectively positionable transducers located to contact different portions of a pipeline system containing said pipe to pick up the leak-produced noise vibration propagated through said liquid.

111. In an apparatus for locating a leak of a liquid, such as water, from a buried pipe lying in contact with the earth in which it is buried, first means for intercepting a sound wave produced by the leak at two separate points spaced apart along the path of the pipe and for producing two electrical signals having a phase difference which is related to the difference in time required for the wave to propagate to the interception points, said first means having a pair of selectively positionable microphones located one at each of said interception points in contact with different portions of a pipeline system containing said pipe to pick up the leak-produced sound wave which is propagated through said liquid, an electrical circuit connected to said first means and including time delay means for variably time delaying one of said signals relative to the other to progressively phase shift at least one of said signals to cause at least momentarily maximum mutual phase correlation between the two signals, means providing an indication which is a function of the degree of mutual phase correlation between the phase shifted signal and the other of said signals as said one of said signals is progressively phase shifted to indicate the occurrence of maximum mutual phase correlation between the two signals, and means providing a measurement of the distance of the leak from a known predetermined point at the time maximum mutual phase correlation occurs when the leak is located between the two microphones or at either one of the microphones, said predetermined point lying along the path of the pipe, and the leak-produced sound wave being intercepted for conversion into signals at no more than two points at any given time.

112. In an apparatus for locating a leak of a liquid, such as water, from a buried pipe lying in contact with the earth in which it is buried, first and second transducers adapted to be positioned at spaced apart regions along the path of the pipe at locations where they contact different portions of a pipeline system containing said pipe to intercept the noise vibration produced by the leak and propagating through said liquid, each of said transducers being effective to convert the intercepted vibration into an electric wave, a circuit for modifying the electric waves produced by said transducers into first and second one-bit pulse signals having a phase difference which is related to the location of the leak from said transducers, means in said circuit for variably time delaying one of said first and second signals relative to the other for progressively phase shifting one of said pulse signals relative to the other pulse signal to cause at least momentarily maximum mutual phase correlation between said first and second pulse signals, means electrically connected to said circuit for producing a further one-bit pulse signal which is a measure of the degree of mutual phase correlation between the phase shifted pulse signal and other pulse signal, and means controlled by said further pulse signal for providing an indication which is a function of the degree of mutual phase correlation between the phase shifted pulse signal and said other pulse signal to indicate the occurrence of maximum mutual phase correlation between the phase shifted pulse signal and the other pulse signal, there being means indicating the location of the leak based on the time delay required to establish maximum mutual correlation between said signals and speed of sound in said liquid.

113. In an apparatus for locating a leak of a liquid, such as water, from a buried pipe lying in contact with the earth in which it is buried, means for intercepting the noise vibration produced by the leak at two selected points that are spaced apart along the path of said pipe and for converting the vibration intercepted at each of said points into an electrical digital signal to provide two signals that are miscorrelated to an extent determined by the location of the leak from said points, said intercepting means comprising a pair of selectively positionable microphones located in contact with different portions of a pipeline system containing said pipe to pick up the leak-produced noise vibration transmitted through said liquid, means variably time delaying one of the signals relative to the other of said signals for varying the extent of correlation between said signals to achieve maximum correlation between the signals, and means for displaying the variations of the extent of correlation just between the time delayed signal and the other of said signals to enable the location of the leak to be determined from the place at which maximum correlation occurs and from the speed of sound in said liquid, and means related to the point at which said maximum correlation occurs for indicating the distance of the leak from a known predetermined point as measured along the path of the pipe, the leak-produced vibration being intercepted for conversion into said signals at no more than two points at any given time.

114. In an apparatus for locating a leak of a liquid, such as water, from a buried pipe lying in contact with the earth in which it is buried, means for intercepting the noise vibration produced by the leak at just two selected points that are spaced apart along the path of said pipe on opposite sides of the suspected site of the leak and for converting the vibration intercepted at said points into two digital signals that are related to the location of the leak from said interception points, said intercepting means comprising a pair of selectively positionable microphones located in contact with different portions of a pipeline system containing said pipe to pick up the leak-produced noise vibration transmitted through said liquid, means for variably time delaying one of said signals relative to the other to vary the extent of correlation between the two signals, and means for indicating the varied extent of correlation to provide an indication of the location of the leak just from the interception of the leak-produced vibration at said two points where the leak lies between said two selected points, the indication of the location of the leak being based on the speed of sound in said liquid.

115. An apparatus for locating a leak of a liquid, such as water, from a buried pipe lying in contact with the earth in which it is buried, comprising means for intercepting the noise vibration produced by the leak at two selected points that are spaced apart along the path of the pipe on opposite sides of the leak and for converting the vibration intercepted at said points into two digital signals that are related in phase to the location of the leak from said points, said intercepting means comprising a pair of selectively positionable microphones located in contact with different portions of a pipeline system containing said pipe to pick up the leak-produced noise vibration transmitted through said liquid, and means for scanning at least a portion of said pipe between said points for the location of said leak by variably time delaying samples of one of said signals relative to samples of the other of said signals to provide an indication of the distance of the leak from a known predetermined point as measured along the path of the pipe.

116. A method of locating a leak of a liquid, such as water, from a buried pipe lying in contact with the earth in which it is buried, comprising the steps of selecting two spaced apart points which lie along said pipe and which are on opposite sides of the suspected site of the leak, intercepting the noise vibration produced by the leak at said two spaced apart points and converting the vibration intercepted at each of said points into an electrical signal to provide two electrical signals that are miscorrelated in time to an extent determined by the location of the leak from said points, electrically processing at least one of said signals by varying the extent of time correlation between said two signals to cause maximum mutual time correlation between the two signals, the extent of time correlation between said two signals being varied by variably time delaying one of said signals relative to the other, the leak-produced noise vibration being intercepted at said two points by placing microphones at said points in contact with portions of the pipeline system containing said pipe to pick up the leak-produced noise vibration travelling through said liquid, and determining the location of the leak from the speed of sound in said liquid and the time delay required to establish said maximum correlation without requiring the leak-produced noise vibration to be intercepted at any points other than said two spaced apart points where the leak is in a pipe region lying between said spaced apart points and extending at least part of the distance between said two spaced apart vibration-interception points.

117. A method of locating a leak of a liquid, such as water, from a buried pipe lying in contact with the earth in which it is buried, comprising the steps of intercepting the noise vibration produced by the leak at just two selected points at any given time, said points being spaced apart and lying along the path of the pipe, the leak-produced noise vibration being intercepted at said two points by placing microphones at said points in contact with portions of the pipeline system containing said pipe to pick up the leak-produced noise vibration travelling through said liquid, converting the vibration intercepted at each of said points into an electrical signal to provide two electrical signals that are miscorrelated in time to an extent determined by the location of the leak from said points, electrically processing at least one of said two signals by variably time delaying one of said signals relative to the other without changing the selected points at which the vibration is intercepted to vary the extent of time correlation between the signals, and determining the location of the leak from the speed of sound in said liquid and from the vibration of the extent of time correlation between the signals regardless of the location of the leak and without requiring the leak-produced vibration to be intercepted at any point other than said two selected points where the leak is located between said two selected points.

118. The method defined in claim 117 comprising the step of scanning the pipe for the leak throughout the full pipe length between said microphones by time delaying the other of said signals by a fixed selected amount during the course of variably time delaying said one of said signals.

119. The method defined in claim 118 wherein said selected amount is the time required for the leak-produced vibration to be propagated through said liquid from one of said selected points to the other.

120. An apparatus for locating a leak of a liquid, such as water, from a buried pipe or conduit where the leak produces a noise vibration, and where said pipe is in contact with the earth in which it is buried, said apparatus comprising first means for intercepting the leak-produced vibration at a point lying along the path of the pipe and effective upon receipt of the vibration caused by the leak for producing an electrical digital signal corresponding in phase and frequency to the received vibration, second means for intercepting the leak-produced vibration at another point lying along the path of the pipe and effective upon receipt of the vibration for producing a further electrical digital signal corresponding in phase and frequency to the received vibration, said first means comprising a selectively positionable microphone located to contact a portion of the pipeline system containing said pipe for picking up the leak-produced noise vibration propagated through said liquid, and said second means also comprising a selectively positionable microphone located to contact a further portion of said pipeline system for picking up the leak-produced noise vibration propagated through said liquid, electrical circuit means for variably time delaying one of said electrical signals relative to the other to cause maximum mutual correlation between the two signals, means providing an indication of the correlation between the time delayed signal and the other signal, and means enabling the location of the leak to be determined from the time delay required to establish maximum mutual time correlation between the two signals and from the speed of sound in said liquid, said electrical circuit means comprising a variable length, non-recirculating time delay line.

121. An apparatus for locating a leak of a liquid, such as water, from a buried pipe lying in contact with the earth in which it is buried, comprising first and second electrical circuits each having (a) a selectively positionable microphone for intercepting the vibration produced by the leak and (b) means connected to the microphone for producing an electrical digital signal related in phase and frequency to the vibration received by the microphone, said microphones being adapted to be located at two spaced apart points lying along the path of the pipe on opposite sides of the leak to cause said signals to be miscorrelated in time to an extent determined by the location of the leak between said points, said microphones being located at positions where they contact different portions of a pipeline system containing said pipe, at least one of said first and second circuits having a time delay line for variably time delaying one of said digital signals relative to the other to cause maximum mutual time correlation between the two signals, and means electrically connected to said first and second circuits and providing an indication of the extent of time correlation between said signals to enable the leak's location to be determined from the speed of sound in said liquid and from the time delay required to establish said maximum time correlation between the two signals and without requiring the leak-produced vibration to be intercepted on any point other than said two points where the site of the leak is actually between said spaced apart points.

122. The apparatus defined in claim 111 wherein each of the two electrical signals is a digital signal which corresponds in phase and frequency to the intercepted sound wave and wherein said indication providing means indicates the extent of mutual correlation between just the phase shifted one of said electrical signals and the other of said electrical signals.

123. The apparatus defined in claim 113 wherein each of the two digital signals corresponds in phase and frequency to the intercepted vibration, and wherein said displaying means indicates the extent of correlation between just the time delayed one of said electrical signals and the other of said electrical signals.

124. The apparatus defined in claim 123 wherein said means for converting the vibration intercepted at said points into said digital signals comprises first and second polarity detectors, one of said microphones converting the picked-up vibrtion into a first analog signal having positive and negative going alternations, the other of said microphones converting the picked-up vibration into a second analog signal having positive and negative going alternations, said first detector being electrically connected to detect the polarity of said first analog signal for producing one of the two digital signals, for providing said one of said digital signals with one pre-selected binary state whenever the polarity of said first analog signal is positive and for providing said one of said digital signals with the other of the binary states whenever the polarity of said first analog signal is negative, said second detector being electrically connected to detect the polarity of said second analog signal for producing the other of the two digital signals, for providing the other of said digital signals with one pre-selected binary state whenever the polarity of said second analog signal is positive and for providing the other of said digital signals with the other of the binary states whenever the polarity of said second analog signal is negative.

125. The apparatus defined in claim 114 wherein each of the two digital signals corresponds in phase and frequency to the intercepted vibration.

126. The apparatus defined in claim 114 including means for enabling the full length of the pipe between said microphones to be scanned for said leak, said means for indicating the extent of correlation comprises a device which provides a graphical display of said extent of correlation between just the two digital signals, there being a determinable, measurable distance on said display, which measurable distance is related to the distance of the leak from one of said spaced apart locations to enable the leak to be located by making a measurement from one of said spaced apart locations.

127. The method defined in claim 116 wherein each of the two electrical signals is a one-bit digital signal which corresponds in phase and frequency to the intercepted vibration.

128. The method defined in claim 117 wherein each of the two electrical signals is a one-bit binary digital signal which corresponds in phase and frequency to the intercepted vibration.

129. The method defined in claim 117 wherein the site of said leak is determined by graphically displaying said extent of time correlation between just the two signals to show a distance between a pre-determined point and the occurrence of maximum mutual time correlation between the two signals, and utilizing said distance on said display to compute a number which is indicative of the distance of said leak from one of said transducers positions as measured along the path of said pipe.

130. The apparatus defined in claim 114 wherein each of the two digital signals corresponds in phase and frequency to the intercepted vibration, and wherein said indicating means indicates the extent of correlation between just the time delayed one of said digital signals and the other of said digital signals.

131. The apparatus defined in claim 130 wherein each of the two digital signals is a one-bit signal.

132. In an apparatus for locating a leak of a liquid, such as water, from a buried pipe or conduit lying in contact with the earth in which it is buried, first means effective upon receipt of a noise vibration caused by the leak for producing a first electrical analog signal corresponding in phase and frequency to the received vibration, second means effective upon receipt of the vibration for producing a second electrical analog signal corresponding in phase and frequency to the received vibration, said first means comprising a first selectively positionable transducer located to contact a portion of the pipeline system containing said pipe for intercepting the leak-produced vibration transmitted through said liquid and for converting said vibration into said first analog signal, and said second means comprising a second selectively positionable transducer located to contact a portion of the pipeline system containing said pipe for intercepting the leak-produced vibration transmitted through said liquid and for converting the intercepted vibration into said second analog signal, third means electrically connected to said first means for detecting the polarity of said first analog signal to produce a first electrical digital signal which is indicative of the polarity of said first analog signal, fourth means electrically connected to said second means for detecting the polarity of said second analog signal to produce a second electrical digital signal which is indicative of the polarity of said second analog signal, electrical time delay circuit means electrically connected to said third means for variably time delaying one of said digital signals relative to the other of said digital signals to cause maximum mutual time correlation between the two digital signals, and further means providing an indication of the time correlation between just the time delayed one of said digital signals and the other of said digital signals to enable the location of the leak to be determined from the speed of sound in said liquid and time delay identified by the occurence of the maximum mutual time correlation between the two digital signals when said first and second transducers are located along the path of said pipe on opposite sides of said leak.

*133.* The apparatus defined in claim *132* wherein each of said digital signals is a one-bit signal.

*134.* In an apparatus for locating a leak of a liquid, such as water, from a buried pipe lying in contact with the earth in which it is buried, first means for intercepting a vibration produced by the leak at two spaced apart points and for converting the vibration intercepted at each of said points into an electrical signal to provide two electrical signals that are miscorrelated in time to an extent determined by the location of the leak from said points, said first means comprising a pair of selectively positionable transducers located to contact different portions of a pipeline system containing said pipe to pick up the leak-produced noise vibration propagated through said liquid, an electrical circuit electrically connected to said first means and including time delay means for varying the extent of time correlation between at least samples of said two signals to cause maximum time correlation therebetween, and means providing an indication of the variation of the extent of time correlation between the samples to enable the leak's location to be determined from the occurrence of the maximum time correlation and from the speed of sound in said liquid, said time delay means comprising a variable length delay line for variably delaying at least samples of one of said signals relative to the other, and means for progressively varying the length of said delay line to cause the variation in the extent of correlation between the signals, and said electrical circuit comprising a further delay line of fixed, pre-selected length for delaying at least samples of the other of said signals.

*135.* In an apparatus for locating a leak of a liquid, such as water, from a buried pipe lying in contact with the earth in which it is buried, first means for intercepting a sound wave produced by the leak at two separate points spaced apart along the path of the pipe and for producing two electrical signals having a phase difference which is related to the difference in time required for the wave to propagate to the interception points, said first means having a pair of microphones adapted to be positioned one at each of said interception points in contact with a pipeline system containing said pipe to intercept the sound wave propagated through said liquid, an electrical circuit connected to said first means and including time delay means for progressively phase shifting at least one of said signals to cause at least momentarily maximum mutual phase correlation between the two signals, means providing an indication which is a function of the degree of mutual phase correlation between the phase shifted signal and the other of said signals as said one of said signals is progressively phase shifted to indicate the occurrence of maximum mutual phase correlation between the two signals, and means providing a measurement which is a function of the distance of the leak from a known predetermined point at the time maximum mutual phase correlation occurs when the leak is located between said two points or at either one of said points, said electrical circuit further including selectively adjustable delay means for delaying the other of said signals by a fixed selected amount.

*136.* The method defined in claim *116* wherein the extent of the variable time delay of one of said signals relative to the other of said signals determines the location of the pipe being scanned for the site of the leak, and said method comprising the additional step of time delaying a pre-selected one of said signals by a fixed pre-selected amount to increase the length of the pipe which is capable of being scanned by variably time delaying one of the signals relative to the other to a distance exceeding one-half the length of the pipe lying between the two spaced apart vibration-interception points.

*137.* The method defined in claim *136* wherein the fixed time delay of said pre-selected one of said signals is sufficient to enable the entire length of the pipe between said two spaced apart points to be scanned for said leak just by variably time delaying only one of said signals and without changing the points at which the leak-produced vibration is intercepted.

*138.* The method defined in claim *116* comprising the steps of variably time delaying a pre-selected one of said signals without time delaying the other of said signals to scan a first predetermined portion of the pipe for the leak, and then variably time delaying the other of said signals without time delaying said pre-selected one of said signals to scan a second predetermined portion of the pipe for the leak, said first predetermined portion extending from the midpoint of the pipe between the two vibration-interception points to one of the two vibration-interception points, and said second predetermined portion extending from said midpoint to the other of said two vibration-interception points.

*139.* The method defined in claim *116* wherein the extent of the variable time delay of one of the signals relative to the other determines the location of the pipe being scanned for the site of the leak, and wherein said signals are electrically processed to enable the entire length of the pipe between said two spaced apart interception points to be scanned for the site of said leak without changing the points at which the leak-produced noise is intercepted.

*140.* A method of locating a leak of a liquid, such as water, from a buried pipe lying in contact with the earth in which it is buried, comprising the steps of intercepting the noise vibration produced by the leak at just two spaced apart points at any given time where the locations of said points are selected to lie along the path of the pipe on opposite sides of the suspected site of the leak, the leak-produced noise vibration being intercepted by placing selectively positionable microphones at said points in contact with portions of a pipeline containing said pipe to pick up the leak-produced noise vibration travelling through said liquid, converting the vibration intercepted at each of said points into an electrical signal to provide two electrical signals that are miscorrelated in time to an extent determined by the location of the leak from said points, electrically processing at least one of said signals by varying the extent of time correlation between the two signals to cause maximum mutual time correlation between the two signals, the extent of time correlation between said two signals being varied by variably time delaying one of said signals relative to the other, and determining the location of the leak from the speed of sound in said liquid and from the signal time delay required to establish said maximum correlation where the leak is in a region of said pipe lying between said two spaced apart vibration-interception points and extending at least part of the distance between said two spaced apart vibration-interception points.

*141.* The method defined in claim *140* wherein the extent of the variable time delay of one of said signals relative to the other of said signals determines the location of the pipe being scanned for the site of the leak, and said method comprising the additional step of time delaying a pre-selected one of said signals by a fixed pre-selected amount to increase the length of the pipe which is capable of being scanned to a distance exceeding one-half the length of the pipe lying between the two spaced apart vibration-interception points.

142. The method defined in claim 141 wherein the fixed time delay of said pre-selected one of said signals is sufficient to enable the entire length of the pipe between said two spaced apart points to be scanned for said leak just by variably time delaying only one of said signals and without changing the points at which the leak-produced vibration is intercepted.

143. The method defined in claim 140 comprising the steps of variably time delaying the other of said signals to scan a first predetermined portion of the pipe for the leak, and then variably time delaying the other of said signals without time delaying said pre-selected one of said signals to scan a second predetermined portion of the pipe for the leak, said first predetermined portion extending from the midpoint of the pipe between the two spaced apart vibration-interception points to one of the two vibration-interception points, and said second predetermined portion extending from said midpoint to the other of the two vibration-interception points.

144. The method defined in claim 140 wherein the extent of the variable time delay of one of the signals relative to the other determines the location of the pipe being scanned for the site of the leak, and wherein said signals are electrically processed to enable the entire length of the pipe between said two spaced apart interception points to be scanned for the site of said leak without changing the points at which the leak-produced noise is intercepted.

145. A method of locating a leak of a liquid, such as water, from a buried pipe lying in contact with the earth in which it is buried, comprising the steps of picking up the noise vibration produced by the leak and transmitted through said liquid at just two spaced part points at any given time where the locations of said points are selected to lie along the path of the pipe on opposite sides of the suspected site of the leak, converting the vibration picked up at each of said points into an electrical signal to provide two electrical signals that are miscorrelated in time to an extent determined by the location of the leak from said points, electrically processing at least one of said signals by varying the extent of time correlation between the two signals to cause maximum mutual time correlation between the two signals, the extent of time correlation between said two signals being varied by variably time delaying one of said signals relative to the other, and locating the leak from the signal time delay required to establish said maximum correlation by computing a value from the speed of sound in said liquid and from the signal time delay required to establish said maximum correlation, where said value is the distance of the leak from a known point lying on the path of the pipe.

146. A method of locating a leak of a liquid, such as water, from a buried pipe lying in contact with the earth in which it is buried, comprising the steps of intercepting the leak-produced noise vibration transmitted through said liquid at just two spaced apart points at any given time where the locations of said points are selected to lie along the path of the pipe on opposite sides of the suspected site of the leak, converting the vibration intercepted at each of said points into an electrical signal to provide two electrical signals that are miscorrelated in time to an extent determined by the location of the leak from said points, electrically processing at least one of said signals by varying the extent of time correlation between the two signals to cause maximum mutual time correlation between the two signals, the extent of time correlation between said two signals being varied by variably time delaying one of said signals relative to the other, and locating the leak from the signal time delay required to establish said maximum correlation by computing a value from the signal time delay required to establish said maximum correlation and from the speed of sound in said liquid, said value being the distance of the leak from a known point lying on the path of the pipe.

147. A method of locating a fluid leak from a pipe in contact with the earth, comprising the steps of intercepting the leak-produced noise vibration at just two spaced apart points at any given time where the locations of said points are selected to lie along the path of the pipe on opposite sides of the suspected site of the leak, converting the vibration intercepted at each of said points into an electrical signal to provide two electrical signals that are miscorrelated in time to an extent determined by the location of the leak from said points, said leak-produced vibration being intercepted at said points and converted into electrical signals by placing transducers in contact with different portions of a pipeline containing said pipe, electrically processing at least one of said signals by varying the extent of time correlation between the two signals to cause maximum mutual time correlation between the two signals, the extent of time correlation between said two signals being varied by variably time delaying one of said signals relative to the other, and locating the leak from the speed of sound in fluid conveyed by said pipe and from the signal time delay required to establish said maximum correlation where the actual site of the leak lies between the two spaced apart vibration-interception points.

148. The apparatus defined in claim 110 comprising means for time delaying one of said signals by a fixed pre-selected amount for enabling more than one-half the length of the pipe between said two spaced apart vibration-interception points to be scanned for the site of the leak by variably time delaying just one of said signals and without intercepting the leak-produced vibration at any points other than said two spaced apart vibration-interception points.

149. The apparatus defined in claim 110 comprising means separate from said time delay means for time delaying one of said signals by a fixed pre-selected amount.

150. The apparatus defined in claim 110 comprising means for selectively enabling a pre-selected one of said signals to be variably time delayed by said time delay means without variably time delaying the other of said signals and for selectively enabling said other of said signals to be variably time delayed by said time delay means without variably time delaying said pre-selected one of said signals.

151. In an apparatus for locating a leak of fluid from a buried pipe which is in contact with the material in which it is buried, first means for intercepting the noise vibration produced by the leak at two spaced apart points lying along said pipe on opposite sides of the suspected site of the leak and for converting the vibration intercepted at each of said points into an electrical signal to provide two electrical signals that are miscorrelated in time to an extent determined by the location of the leak from said points, said first means comprising a pair of transducers located to contact different portions of the pipeline system containing said pipe to pick up the leak-produced noise vibration transmitted through said fluid, an electrical circuit electrically connected to said first means and including time delay means for variably time delaying at least samples of one of said signals relative to samples of the other of said signals to thereby vary the extent of time correlation between at least samples of said two signals to cause maximum time correlation therebetween, and means providing an indication of the variation of the extent of time correlation between the samples to enable the leak's location to be determined from the time delay required to establish said maximum time correlation.

152. The apparatus defined in claim 151 wherein the variable extent of time delay of one of said signals relative to the other is indicative of the point on said pipe being scanned for the site of the leak, and there being means separate from said time delay means for time delaying a pre-selected one of said signals by a fixed pre-selected amount to increase the length of the pipe capable of being scanned by variably time delaying just one of said signals.

153. The apparatus defined in claim 151 comprising means for selectively enabling a pre-selected one of said signals to be variably time delayed by said time delay means without variably time delaying the other of said signals and for selectively enabling said other of said signals to be variably time delayed by said time delay means without variably time delaying said pre-selected one of said signals.

154. The apparatus defined in claim 151 wherein the extent of the time delay imparted to at least samples of one of said signals by said time delay means determines the point being scanned on the pipe for the site of the leak, there being means for enabling the entire length of the pipe between said two spaced apart points to be scanned for the site of the leak without changing the points at which the leak-produced vibration is intercepted.

155. The apparatus defined in claim 151 including means for indicating a value which is a function of the speed of sound in said fluid and the time delay required to establish said maximum correlation, said value being the distance of the leak from a known point as measured along the path of said pipe.

156. In an apparatus for locating a leak of fluid from a buried pipe which is in contact with the material in which it is buried, first means for intercepting the noise vibration produced by the leak at two spaced apart points lying along said pipe on opposite sides of the suspected site of the leak and for converting the vibration intercepted at each of said points into an electrical signal to provided two electrical signals that are miscorrelated in time to an extent determined by the location of the leak from said points, said first means comprising a pair of transducers located to contact different portions of a pipeline system containing said pipe, an electrical circuit electrically connected to said first means and including time delay means for variably time delaying one of said signals relative to the other of said signals to thereby vary the extent of time correlation between said two signals to cause maximum time correlation therebetween, the extent of the variable time delay determining the point on said pipe being scanned for the site of the leak, means providing an indication of the variation of the extent of time correlation between the signals to enable the leak's location to be determined from the speed of sound in said fluid and from the time delay required to establish said maximum time correlation without requiring the leak-produced vibration to be intercepted at any points other than said two spaced apart vibration-interception points where the leak is in a region of said pipe lying between said two spaced apart vibration-interception points and extending at least part of the distance between said two spaced apart vibration-interception points.

157. The apparatus defined in claim 156 there being means separate from said time delay means for time delaying a pre-selected one of said signals by a fixed pre-selected amount to increase the length of the pipe capable of being scanned by variably time delaying just one of said signals.

158. The apparatus defined in claim 156 comprising means for selectively enabling a pre-selected one of said signals to be variably time delayed by said time delay means without variably time delaying the other of said signals and for selectively enabling said other of said signals to be variably time delayed by said time delay means without variably time delaying said pre-selected one of the signals.

159. The apparatus defined in claim 156 including means indicating a value which is a function of the speed of sound in said fluid and a function of the time delay required to establish said maximum correlation, said value being the distance of the leak from a known point as measured along the path of said pipe.

160. The apparatus defined in claim 159 wherein said transducers are selectively positionable at different points along said pipeline system, and wherein said fluid is a liquid which is conveyed by said pipe.

161. The apparatus defined in claim 156 wherein said transducers are selectively positionable at different points along said pipeline system, and wherein said fluid is a liquid, such as water, which is conveyed by said pipe.

162. In an apparatus for locating a leak of fluid from a buried pipe which is in contact with the material in which it is buried, where said leak produces a noise vibration, first means including a transducer in contact with a portion of the pipeline system containing said pipe for intercepting the leak-produced noise vibration at a first point lying along the path of the pipe and effective upon receipt of said vibration for producing a first electrical analog signal corresponding in phase and frequecy to the received vibration, second means including a further transducer in contact with a further portion of said pipeline system for intercepting the leak-produced noise vibration at a second point lying along the path of the pipe in spaced relation to said first point and effective upon receipt of the vibration for producing a second electrical analog signal corresponding in phase and frequency to the received vibration, said first means including a circuit for converting said first signal into a digital form, said second means including a circuit for converting said second signal into a digital form, electrical time delay circuit means electrically connected to said first means for variably time delaying the digital form of said first electrical signal relative to the digital form of said second electrical signal to cause maximum time correlation between the digital forms of the two signals, means providing an indication of the time correlation between the time delayed one of said digital forms and the other of said digital forms, and means providing an indication of the location of the leak from the time delay required to establish said maximum correlation and from the speed of sound in said fluid without requiring the leak-produced vibration to be intercepted at any points other than said first and second points where the site of the leak is in a region of the pipe lying between said first and second points and extending at least part of the distance between said first and second points.

163. The apparatus defined in claim 162 wherein the variable extent of time delay of one of said digital forms relative to the other determines the point on said pipe being scanned for the site of the leak, and there being means separate from said time delay circuit means for time delaying a pre-selected one of said digital forms by a fixed pre-selected amount to increase the length of the pipe capable of being scanned by variably time delaying just one of said digital forms.

164. The apparatus defined in claim 162 wherein the extent of time delay imparted to one of the digital forms of said signals by said time delay circuit means determines the point being scanned on the pipe for the site of the leak,

*there being means for enabling the entire length of the pipe between said first and second points to be scanned for the site of the leak without changing the points at which the leak-produced vibration is intercepted.*

165. The apparatus defined in claim 162 wherein said means providing an indication of the location of the leak comprises means for indicating a value which is a function of the speed of sound in said fluid and a function of the time delay required to establish said maximum correlation, said value being the distance of the leak from a known point as measured along the path of said pipe, said known point lying on the path of said pipe.

166. The apparatus defined in claim 165 wherein said transducers are selectively positionable, and wherein said fluid is a liquid conveyed by said pipe.

167. The apparatus defined in claim 162 wherein said transducers are selectively positionable, and wherein said fluid is a liquid, such as water, which is conveyed by said pipe.

168. In an apparatus for locating a leak of fluid from a buried pipe which is in contact with the material in which it is buried, where said leak produces a noise vibration, first means including a transducer in contact with a portion of the pipeline system containing said pipe for intercepting the leak-produced noise vibration at a first point lying along the path of the pipe and effective upon receipt of said vibration for producing a first electrical analog signal corresponding in phase and frequency to the received vibration, second means including a further transducer in contact with a further portion of said pipeline system for intercepting the leak-produced noise vibration at a second point lying along the path of the pipe in spaced relation to said first point and effective upon receipt of the vibration for producing a second electrical analog signal corresponding in phase and frequency to the received vibration, said first means including a circuit for converting said first signal into a digital form, said second means including a circuit for converting said second signal into a digital form, electrical time delay circuit means electrically connected to said first means for variably time delaying the digital form of said first electrical signal relative to the digital form of said second electrical signal to cause maximum mutual time correlation between the digital forms of the two signals, means providing an indication of the time correlation between the time delayed one of said digital forms and the other of said digital forms, and means for indicating a value which is a function of the speed of sound in said fluid and a function of the time delay required to establish said maximum correlation, said value being the distance of the leak from a known point as measured along the path of the pipe.

169. In an apparatus for locating a leak of fluid from a buried pipe which is in contact with the material in which it is buried, where said leak produces a noise vibration, first means including a transducer in contact with a portion of the pipeline system containing said pipe for intercepting the leak-produced noise vibration at a first point lying along the path of the pipe and effective upon receipt of said vibration for producing a first electrical signal corresponding in phase and frequency to the received vibration, second means including a further transducer in contact with a further portion of said pipeline system for intercepting the leak-produced noise vibration at a second point lying along the path of the pipe in spaced relation to said first point and effective upon receipt of the vibration for producing a second electrical signal corresponding in phase and frequency to the received vibration, electrical time delay circuit means electrically connected to said first means for variably time delaying said first electrical signal relative to said second electrical signal to cause maximum mutual time correlation between the two signals, means providing an indication of the time correlation between the time delayed one of said signals and the other of said signals, and means providing an indication of the location of the leak from the speed of sound in said fluid and the time delay required to establish said maximum correlation without requiring the leak-produced vibration to be intercepted at any points other than said first and second points where the leak is in a region of the pipe lying between said first and second points.

170. The apparatus defined in claim 169 wherein said fluid is a liquid, such as water, which is conveyed by said pipe, and wherein said means providing an indication of the locaton of the leak comprises a device for indicating a value which is a function of the speed of sound in said liquid and a function of the time delay required to establish said maximum correlation, said value being the distance of the leak from a known point as measured along the path of said pipe, where said known point lies on the path of said pipe.

171. In an apparatus for locating a fluid leak in an underground or unexposed pipe or conduit in which said leak produces a noise vibration, first means for intercepting the leak-produced noise vibration at a point lying along the path of the pipe and effective upon receipt of said vibration for producing an electrical digital signal corresponding in phase and frequency to the received vibration, second means for intercepting the leak-produced noise vibration at another point lying along the path of the pipe and effective upon receipt of the vibration for producing a further electrical digital signal corresponding in phase and frequency to the received vibration, electrical time delay circuit means electrically connected to said first means for variably time delaying one of said electrical signals relative to the other to cause maximum mutual time correlation between the two signals, and means providing an indication of the time correlation between just the time delayed one of said signals and the other of said electrical signals, said electrical time delay circuit means comprising a recirculating time delay line.

172. In an apparatus for locating a fluid leak in an underground or unexposed pipe, first means for intercepting the noise vibration produced by the leak at two spaced apart points lying along said pipe on opposite sides of the suspected site of the leak and for converting the vibration intercepted at each of said points into an electrical signal to provide just two electrical signals that are miscorrelated in time to an extent determined by the location of the leak from said points, an electrical circuit electrically connected to said first means and including time delay means for variably time delaying at least samples of one of said signals relative to samples of the other of said signals to thereby vary the extent of time correlation between at least samples of said two signals to cause maximum time correlation therebetween, the extent of the variable time delay determining the point on said pipe being scanned for the site of the leak, means providing a display of the vibration of the extent of time correlation between the samples, and means for indicating the location of the point being scanned on the pipe where said maximum time correlation occurs to enable the leak's location to be determined from the occurrence of the maximum time correlation without requiring the leak-produced vibration to be intercepted at any points other than said two spaced apart vibration-interception points where the leak is in a pipe region lying between said two spaced apart vibration-interception points and extending at least part of the distance between said two spaced apart vibration-interception points, said time delay means comprising a recirculating time delay line for variably time delaying at least samples of one of said signals relative to the other.

173. In an apparatus for locating a fluid leak in an underground or unexposed pipe, means for intercepting the noise vibration produced by the leak at two selected points that are spaced apart along the path of said pipe and for converting the vibration intercepted at each of said points into an electrical digital signal to provide two signals that are miscorrelated to an extent determined by the location of the leak from said points, means variably time delaying one of the signals relative to the other of said signals for varying the extent of correlation between said signals to achieve maximum correlation between the signals, and means for displaying the variations of the extent of correlation just between the time delayed signal and the other of said signals to enable the location of the leak to be determined from the place at which maximum correlation occurs, and means related to the point at which said maximum correlating occurs for indicating the distance of the leak from a known predetermined point as measured along the path of the pipe, the leak-produced noise vibration being intercepted for conversion into said signals at no more than two points at any given time, said means for time delaying said one of said signals comprising a recirculating delay line.

174. In an apparatus for locating a leak of fluid from a buried fluid-conveying pipe which is in contact with the material in which it is buried, first means for intercepting the noise vibration produced by the leak at two spaced apart points lying along said pipe on opposite sides of the suspected site of the leak and for converting the vibration intercepted at each of said points into an electrical signal to provide just two electrical signals that are miscorrelated in time to an extent determined by the location of the leak from said points, said first means comprising a pair of transducers located to contact different portions of the pipeline system containing said pipe to pick up the leak-produced noise vibration transmitted through said fluid, an electrical circuit electrically connected to said first means and including time delay means for variably time delaying at least samples of one of said signals relative to samples of the other of said signals to thereby vary the extent of time correlation between at least samples of said two signals to cause maximum time correlation therebetween, the extent of the variable time delay determining the point on said pipe being scanned for the site of the leak, means providing a display of the variation of the extent of time correlation between the samples, and means for indicating the location of the point being scanned on the pipe where said maximum time correlation occurs to enable the leak's location to be determined from the occurrence of the maximum time correlation without requiring the leak-produced vibration to be intercepted at any points other than points along the path of the pipe where the leak is in a pipe region lying between said two spaced apart vibration-interception points and extending at least part of the distance between said two spaced apart vibration-interception points.

175. The apparatus defined in claim 168 wherein said fluid is water which is conveyed by said pipline system, and wherein said transducers are selectively positionable to contact different accessible portions of said pipeline system such as hydrants which form a part of said pipeline system.

176. A method of locating a leak of fluid from a buried fluid-conveying pipe which is in contact with the material in which it is buried, comprising the steps of intercepting the noise vibration produced by the leak at just two spaced apart points at any given time where the locations of said points are selected to lie along the path of the pipe on opposite sides of the suspected site of the leak, converting the vibration intercepted at each of said points into an electrical signal to provide two electrical signals that are miscorrelated in time to an extent determined by the locaton of the leak from said points, electrically processing at least one of said signals by varying the extent of time correlation between the two signals to cause maximum mutual time correlation between the two signals, the extent of time correlation between said two signals being varied by variably time delaying one of said signals relative to the other, and said leak-produced noise vibration being intercepted at said two spaced apart points by placing selectively positionable transducers in contact with different portions of a pipeline system containing said pipe, and determining the location of the leak from the speed of sound in said fluid and from the signal time delay required to establish said maximum correlation where the leak is in a region of said pipe lying between said two spaced apart vibration-interception points and extending at least part of the distance between said two spaced apart vibration-interception points.

177. The method defined in claim 176 wherein said fluid is water, and wherein said pipeline system is an underground system for conveying the water, and wherein said transducers are positionable to contact selected, accessible portions of said pipeline system such as hydrants which form a part of said pipeline system.

178. The apparatus defined in claim 168, including means for scanning the full length of the pipe between said transducers for the location of said leak without requiring said transducers to be relocated to intercept the leak-produced vibration at any points other than said first and second points.

* * * * *

REEXAMINATION CERTIFICATE (1318th)
United States Patent [19]
Anway

[11] B3 4,083,229
[45] Certificate Issued  Jul. 3, 1990

[54] METHOD AND APPARATUS FOR DETECTING AND LOCATING FLUID LEAKS

[75] Inventor: Allen R. Anway, Superior, Wis.

[73] Assignee: Plaunt & Anderson Co., Duluth, Minn.

Reexamination Request:
No. 90/001,865, Oct. 13, 1989

Reexamination Certificate for:
Patent No.: 4,083,229
Issued: Apr. 11, 1978
Appl. No.: 727,359
Filed: Sep. 28, 1976

Reexamination Certificate B2 4,083,229 issued Sep. 11, 1984.
Reexamination Certificate B1 4,083,229 issued Feb. 1, 1983.

Related U.S. Application Data

[63] Continuation-in-part of Ser. No. 650,842, Jan. 20, 1976, abandoned.

[51] Int. Cl.⁵ .............................................. G01M 3/00
[52] U.S. Cl. ................................. 73/40.5 A; 73/592
[58] Field of Search ............... 73/40.5 A, 40.5 R, 71.2

[56] References Cited
U.S. PATENT DOCUMENTS

| | | | |
|---|---|---|---|
| 3,249,911 | 5/1966 | Gustafsson | 340/6 |
| 3,744,298 | 7/1978 | Flourney et al. | 73/40.5 |
| 3,878,381 | 4/1975 | Broder et al. | 235/181 |

FOREIGN PATENT DOCUMENTS 4318600  8/1968  Japan.

OTHER PUBLICATIONS

Signal Analysis Operation Test Instruments Division, Honeywell Inc., "Correlation and Probability Analyzer, Model SAI-42", Nov. 1972, pp. 1-1 to 4-29.
Hewlett-Packard Limited, "Operating Manual Model 3721A Correlator", Apr. 1971, p. 3-12.
Hewlett-Packard Limited, "Service Manual (vol. 1), Model 3721A Correlator", May 1971, pp. 1-2 to 1-7.
Hewlett-Packard Limited, "The Model 3721A Correlator Field Training Manual", May 1970, pp. 3-6 to 3-13 and FIG. 4-9.
Hewlett-Packard Journal, vol. 21, No. 3, Nov. 1969, The Hewlett-Packard Co., Palo Alto, Calif., p. 2.
Schwartz, M., "Information, transmission, Modulation, and Noise", McGraw-Hill, New York, 1959, p. 108.

*Primary Examiner*—Donald O. Woodiel

[57] ABSTRACT

An apparatus and method for detecting and locating a fluid leak in an underground pipe or the like in which the vibration produced by the leak in intercepted at selected spaced apart points by microphones or other transducers, in which the vibration intercepted at each of the two points is converted into an electrical signal, and in which the extent of correlation of the two resulting signals is varied by variably time delaying one signal relative to the other to determine the leak's location from the occurrence of maximum correlation between the signals. In one embodiment, the variable time delay of one signal relative to the other is accomplished by a variable length time delay line and a means for progressively varying the length of the delay line. In another embodiment the variable time delay is accomplished by a recirculating delay line analyzer that does more data age comparisons with the same delays in the same time than the variable length delay line.

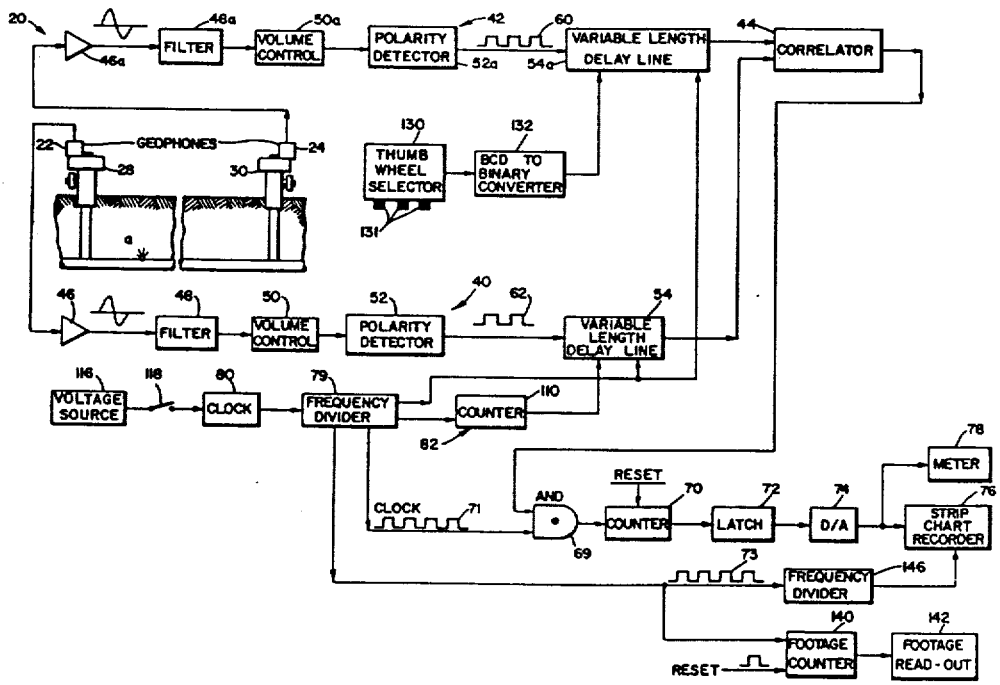

REEXAMINATION CERTIFICATE ISSUED UNDER 35 U.S.C. 307

THE PATENT AS AMENDED IN THE LAST PRIOR REEXAMINATION CERTIFICATE IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentablity of claims 38, 68, 134 and 135 are confirmed.

Claims 1, 2, 4–10, 12–16, 19, 20, 23–28, 30–35, 42–44, 46–60, 65, 66, 69, 70 and 74–108 were previously cancelled.

Claims 3, 11, 17, 18, 21, 22, 29, 36, 37, 41, 45, 61–64, 67, 71–73, 109–117, 120–133, 138–140, 143–147, 150, 151, 153–156, 158–162 and 164–178 are cancelled.

Claims 39, 118, 136, 141, 148, 149, 152, 157 and 163 are determined to be patentable as amended.

Claims 40, 119, 137 and 142, dependent on an amended claim, are determined to be patentable.

39. A data analyzing and storage apparatus comprising a logic gate having an output and a plurality of inputs, means providing a first data channel for feeding binary data bits in order of their relative ages to a first input of said gate, means providing a second data channel for supplying binary data bits to a second input of said gate, means including a circulating delay line in said second channel for variably time delaying the data bits in *said* second channel relative to the data bits fed through said first channel to scramble the relative ages of the data bits that are fed from said second channel to said second input of said gate, the binary state of the output of said gate being determined by the states of the binary bits fed to said first and second inputs, a memory having a multiplicity of addressable locations for storing binary data, and means for addressing said locations in a first predetermined order for writing in binary data that is determined by the output of said logic gate and further for addressing said locations in said second predetermined order for reading out the stored data, said second predetermined order being different from said first predetermined order and providing for a read-out of the stored data in an order [than] *that* has *a* preselected relationship to the age differences between the binary bits fed to the inputs of said gate.

118. [The method defined in claim 117 comprising the step of] *A method of locating a leak of a liquid, such as water, from a buried pipe lying in contact with the earth in which it is buried, comprising the steps of intercepting the noise vibration produced by the leak at just two selected points at any given time, said points being spaced apart and lying along the path of the pipe, the leak-produced noise vibration being intercepted at said two points by placing microphones at said points in contact with portions of the pipeline system containing said pipe to pick up the leak-produced noise vibration travelling through said liquid, converting the vibration intercepted at each of said points into an electrical signal to provide two electrical signals that are miscorrelated in time to an extent determined by the location of the leak from said points, electrically processing at least one of said two signals by variably time delaying one of said signals relative to the other without changing the selected points at which the vibration is intercepted to vary the extent of time correlation between the signals, scanning the pipe for the leak throughout the full pipe length between said microphones by time delaying the other of said signals by a fixed selected amount during the course of variably time delaying said one of said signals, and determining the location of the leak from the speed of sound in said liquid and from the variation of the extent of time correlation between the signals regardless of the location of the leak and without requiring the leak-produced vibration to be intercepted at any point other than said two selected points where the leak is located between said two selected points.*

136. [The method defined in claim 116] *A method of locating a leak of a liquid, such as water, from a buried pipe lying in contact with the earth in which it is buried, comprising the steps of selecting two spaced apart points which lie along said pipe and which are on opposite sides of the suspected site of the leak, intercepting the noise vibration produced by the leak at said two spaced apart points and converting the vibration intercepted at each of said points into an electrical signal to provide two electrical signals that are miscorrelated in time to an extent determined by the location of the leak from said points, electrically processing at least one of said signals by varying the extent of time correlation between said two signals to cause maximum mutual time correlation between the two signals, the extent of time correlation between said two signals being varied by variably time delaying one of said signals relative to the other, the leak-produced noise vibration being intercepted at said two points by placing microphones at said points in contact with portions of the pipeline system containing said pipe to pick up the leak-produced noise vibration travelling through said liquid,* wherein the extent of the variable time delay of one of said signals relative to the other of said signals determines the location of the *leak site in the* pipe being scanned for the site of the leak, and said method comprising the additional step of time delaying a pre-selected one of said signals by a fixed pre-selected amount to increase the length of the pipe which is capable of being scanned by variably time delaying one of the signals relative to the other to a distance exceeding one-half the length of the pipe lying between the two spaced apart vibration-interception points, *and determining the location of the leak from the speed of sound in said liquid and the time delay required to establish said maximum correlation without requiring the leak-produced noise vibration to be intercepted at any points other than said two spaced apart points where the leak is in a pipe region lying between said spaced apart points and extending at least part of the distance between said two spaced apart vibration-interception points.*

141. [The method defined in claim 140] *A method of locating a leak of a liquid, such as water, from a buried pipe lying in contact with the earth in which it is buried, comprising the steps of intercepting the noise vibration produced by the leak at just two spaced apart points at any given time where the locations of said points are selected to lie along the path of the pipe on opposite sides of the suspected site of the leak, the leak-produced noise vibration* being intercepted by placing selectively positionable microphones at said points in contact with portions of a pipeline containing said pipe to pick up the leak-produced noise vibration travelling through said liquid, converting the vibration intercepted at each of said points into an electrical signal to provide two electrical signals that are miscorrelated in time to an extent determined by the location of the leak from said points, electrically processing at least one of said signals by varying the extent of time correlation between the two signals to cause maximum mutual time correlation between the two signals, the extent of time correlation between said two signals being varied by variably time delaying one of said signals relative to the other, wherein the extent of the variable time delay of one of said signals relative to the other of said signals determines the location of the *leak site in the* pipe being scanned for the site of the leak, and said method comprising the additional step of time delaying a preselected one of said signals by a fixed pre-selected amount to increase the length of the pipe which is capable of being scanned to a distance exceeding one-half the length of the pipe lying between the two spaced apart vibration-interception points *and determining the location of the leak from the speed of sound in said liquid and from the signal time delay required to establish said maximum correlation where the leak is in a region of said pipe lying between said two spaced apart vibration-interception points and extending at least part of the distance between said two spaced apart vibration-interception points.*

148. [The apparatus defined in claim 110 comprising] *In an apparatus for locating a leak of a liquid, such as water, from a buried pipe lying in contact with the material in which it is buried, first means for intercepting the noise vibration produced by the leak at two spaced apart points lying along said pipe on opposite sides of the suspected site of the leak and for converting the vibration intercepted at each of said points into an electrical signal to provide just two electrical signals that are miscorrelated in time to an extent determined by the location of the leak from said points, an electrical circuit electrically connected to said first means and including time delay means for variably time delaying at least samples of one of said signals relative to samples of the other of said signals to thereby vary the extent of time correlation between at least samples of said two signals to cause maximum time correlation therebetween, the extent of the variable time delay determining the point on said pipe being scanned for the site of the leak, means providing a display of the variation of the extent of time correlation between the samples, and means for indicating the location of the point being scanned on the pipe where said maximum time correlation occurs to enable the leak's location to be determined from the occurrence of the maximum time correlation and from the speed of sound in said liquid without requiring the leak-produced vibration to be intercepted at any points other than said two spaced apart vibration-interception points where the leak is in a pipe region lying between said two spaced apart vibration-interception points and extending at least part of the distance between said two spaced apart vibration-interception points, said first means comprising a pair of selectively positionable transducers located to contact different portions of a pipeline system containing said pipe to pick up the leak-produced noise vibration propagated through said liquid, and means for time delaying one of said samples by a fixed pre-selected amount for enabling more than one-half the length of the pipe between said two spaced apart vibration-interception points to be scanned for the site of the leak by variably time delaying just one of said signals and without intercepting the leak-produced vibration at any points other than said two spaced apart vibration-interception points.*

149. [The apparatus defined in claim 110 comprising] *In an apparatus for locating a leak of a liquid, such as water, from a buried pipe lying in contact with the material in which it is buried, first means for intercepting the noise vibration produced by the leak at two spaced apart points lying along said pipe on opposite sides of the suspected site of the leak and for converting the vibration intercepted at each of said points into an electrical signal to provide just two electrical signals that are miscorrelated in time to an extent determined by the location of the leak from said points, an electrical circuit electrically connected to said first means and including time delay means for variably time delaying at least samples of one of said signals relative to samples of the other of said signals to thereby vary the extent of time correlation between at least samples of said two signals to cause maximum time correlation therebetween, the extent of the variable time delay determining the point on said pipe being scanned for the site of the leak, means providing a display of the variation of the extent of time correlation between the samples, and means for indicating the location of the point being scanned on the pipe where said maximum time correlation occurs to enable the leak's location to be determined from the occurrence of the maximum time correlation and from the speed of sound in said liquid without requiring the leak-produced vibration to be intercepted at any points other than said two spaced apart vibration-interception points where the leak is in a pipe region lying between said two spaced apart vibration-interception points and extending at least part of the distance between said two spaced apart vibration-interception points, said first means comprising a pair of selectively positionable transducers located to contact different portions of a pipeline system containing said pipe to pick up the leak-produced noise vibration propagated through said liquid, and means separate from said time delay means for time delaying one of said signals by a fixed pre-selected amount.*

152. [The apparatus defined in claim 151] *In an apparatus for locating a leak of fluid from a buried pipe which is in contact with the material in which it is buried, first means for intercepting the noise vibration produced by the leak at two spaced apart points lying along said pipe on opposite sides of the suspected site of the leak and for converting the vibration intercepted at each of said points into an electrical signal to provide two electrical signals that are miscorrelated in time to an extent determined by the location of the leak from said points, said first means comprising a pair of transducers located to contact different portions of the pipeline system containing said pipe to pick up the leak-produced noise vibration transmitted through said fluid, an electrical circuit electrically connected to said first means and including time delay means for variably time delaying at least samples of one of said signals relative to samples of the other of said signals to thereby vary the extent of time correlation between at least samples of said two signals to cause maximum time correlation therebetween, means providing an indication of the variation of the extent of time correlation between the samples to enable the leak's location to be determined from the time delay required to establish said maximum time correlation, wherein the variable extent of time delay of one of said signals relative to the other is indicative of the point on said pipe being scanned for the site of the leak, and there being means separate from said time delay means for* time delaying a pre-selected one of said signals by a fixed pre-selected amount to increase the length of the pipe capable of being scanned by variably time delaying just one of said signals.

157. [The apparatus defined in claim 156 there being] *In an apparatus for locating a leak of fluid from a buried pipe which is in contact with the material in which it is buried, first means for intercepting the noise vibration produced by the leak at two spaced apart points lying along said pipe on opposite sides of the suspected site of the leak and for converting the vibration intercepted at each of said points into an electrical signal to provide two electrical signals that are miscorrelated in time to an extent determined by the lcoation of the leak from said points, said first means comprising a pair of transducers located to contact different portions of a pipeline system containing said pipe, an electrical circuit electrically connected to said first means and including time delay means for variably time delaying one of said signals relative to the other of said signals to thereby vary the extent of time correlation between said two signals to cause maximum time correlation therebetween, the extent of the variable time delay determining the point on said pipe being scanned for the site of the leak, means providing an indication of the variation of the extent of time correlation between the signals to enable the leak's location to be determined from the speed of sound in said fluid and from the time delay required to establish said maximum time correlation without requiring the leak-produced vibration to be intercepted at any points other than said two spaced apart vibration-interception points where the leak is in a region of said pipe lying between said two spaced apart vibration-interception points and extending at least part of the distance between said two spaced apart vibration-interception points, and means separate from said time delay means for time delaying a pre-selected one of said signals by a fixed pre-selected amount to increase the length of the pipe capable of being scanned by variably time delaying just one of said signals.*

163. [The apparatus defined in claim 162] *In an apparatus for locating a leak of fluid from a buried pipe which is in contact with the material in which it is buried, where said leak produces a noise vibration, first means including a transducer in contact with a portion of the pipeline system containing said pipe for intercepting the leak-produced noise vibration at a first point lying along the path of the pipe and effective upon receipt of said vibration for producing a first electrical analog signal corresponding in phase and frequency to the received vibration, second means including a further transducer in contact with a further portion of said pipeline system for intercepting the leak-produced noise vibration at a second point lying along the path of the pipe in spaced relation to said first point and effective upon receipt of the vibration for producing a second electrical analog signal corresponding in phase and frequency to the received vibration, said first means including a circuit for converting said first signal into a digital form, said second means including a circuit for converting said second signal into a digital form, electrical time delay circuit means electrically connected to said first means for variably time delaying the digital form of said first electrical signal relative to the digital form of said second electrical signal to cause maximum mutual time correlation between the digital forms of the two signals, means providing an indication of the time correlation between the time delayed one of said digital forms and the other of said digital forms, and means providing an indication of the location of the leak from the time delay required to establish said maximum correlation and from the speed of sound in said fluid without requiring the leak-produced vibration to be intercepted at any points other than said first and second points where the site of the leak is in a region of the pipe lying between said first and second points and extending at least part of the distance between said first and second points, wherein the variable extent of time delay of one of said digital forms relative to the other determines the point on said pipe being scanned for the site of the leak, and there being means separate from said time delay circuit means for time delaying a pre-selected one of said digital forms by a fixed preselected amount to increase the length of the pipe capable of being scanned by variably time delaying just one of said digital forms.*

* * * * *